(12) United States Patent
Tiramani et al.

(10) Patent No.: US 12,031,317 B2
(45) Date of Patent: Jul. 9, 2024

(54) FOLDABLE BUILDING STRUCTURES WITH UTILITY CHANNELS AND LAMINATE ENCLOSURES

(71) Applicant: Build IP LLC, North Las Vegas, NV (US)

(72) Inventors: Paolo Tiramani, Las Vegas, NV (US); Galiano Tiramani, Las Vegas, NV (US); Kyle Denman, North Las Vegas, NV (US)

(73) Assignee: Boxabl Inc., North Las Vegas, NV (US)

( * ) Notice: Subject to any disclaimer, the term of this patent is extended or adjusted under 35 U.S.C. 154(b) by 0 days.

(21) Appl. No.: 18/071,905

(22) Filed: Nov. 30, 2022

(65) Prior Publication Data

US 2023/0093212 A1    Mar. 23, 2023

Related U.S. Application Data

(62) Division of application No. 17/245,187, filed on Apr. 30, 2021, now Pat. No. 11,591,789, which is a
(Continued)

(51) Int. Cl.
*E04B 1/34* (2006.01)
*B32B 5/02* (2006.01)
(Continued)

(52) U.S. Cl.
CPC .............. *E04B 1/344* (2013.01); *B32B 5/024* (2013.01); *B32B 5/18* (2013.01); *B32B 5/20* (2013.01);
(Continued)

(58) Field of Classification Search
CPC ...... E04B 1/344; E04B 1/343; E04B 1/34384; E04B 1/3442
See application file for complete search history.

(56) References Cited

U.S. PATENT DOCUMENTS

| 1,498,173 A | 6/1924 | Kelley |
| 2,063,052 A | 12/1936 | Washington |

(Continued)

FOREIGN PATENT DOCUMENTS

| AU | 2013200386 A1 | 2/2013 |
| CA | 2227003 A1 | 7/1999 |

(Continued)

OTHER PUBLICATIONS

European Office Action for Application No. 20755992.3, dated Feb. 3, 2023, 24 pages.
(Continued)

*Primary Examiner* — Patrick J Maestri
(74) *Attorney, Agent, or Firm* — McCarter & English, LLP

(57) ABSTRACT

A foldable building structure is provided that includes a fixed space portion including a first floor portion, a first ceiling portion, a first wall portion rigidly secured to the first floor portion and the first ceiling portion. The foldable building structure includes a second wall portion which is movable between a folded position and a deployed position, and a third wall portion which movable between a folded position and a deployed position. The second and third wall portions when in their deployed positions form with the first wall portion a first wall component of the foldable building structure. The second wall portion is capable of being moved between the folded position and the deployed position without moving the third wall portion between the folded position and the deployed position.

12 Claims, 27 Drawing Sheets

Related U.S. Application Data division of application No. 16/786,130, filed on Feb. 10, 2020, now Pat. No. 11,118,344.

(60) Provisional application No. 62/960,991, filed on Jan. 14, 2020, provisional application No. 62/805,710, filed on Feb. 14, 2019.

(51) Int. Cl.

| | | |
|---|---|---|
| *B32B 5/18* | (2006.01) | |
| *B32B 5/20* | (2006.01) | |
| *B32B 5/24* | (2006.01) | |
| *B32B 5/32* | (2006.01) | |
| *B32B 15/04* | (2006.01) | |
| *E04B 1/343* | (2006.01) | |
| *E04B 1/344* | (2006.01) | |
| *E04B 1/348* | (2006.01) | |
| *E04C 2/284* | (2006.01) | |

(52) U.S. Cl.
CPC ............... *B32B 5/245* (2013.01); *B32B 5/32* (2013.01); *B32B 15/046* (2013.01); *E04B 1/343* (2013.01); *E04B 1/34384* (2013.01); *E04B 1/3442* (2013.01); *E04B 1/34853* (2013.01); *E04C 2/284* (2013.01); *B32B 2262/101* (2013.01); *B32B 2419/00* (2013.01); *E04B 1/34317* (2023.08)

(56) References Cited

U.S. PATENT DOCUMENTS

| | | |
|---|---|---|
| 2,070,924 A | 2/1937 | Derman |
| 2,126,511 A | 8/1938 | Soule |
| 2,302,101 A | 11/1942 | Boydstun |
| 2,644,203 A | 7/1953 | Donahue |
| 2,704,223 A | 3/1955 | Houdart |
| 2,780,843 A | 2/1957 | Sherbinin |
| 2,832,637 A | 4/1958 | Decosse |
| 2,883,713 A | 4/1959 | Zug |
| 2,904,849 A | 9/1959 | Bergstrom |
| 2,904,850 A | 9/1959 | Whitman et al. |
| 2,920,920 A | 1/1960 | Whitman et al. |
| 2,933,055 A | 4/1960 | Whitman et al. |
| 3,044,129 A | 7/1962 | Bigelow |
| 3,097,400 A | 7/1963 | Davis et al. |
| 3,107,116 A | 10/1963 | Meaker |
| 3,147,024 A | 9/1964 | Brockman |
| 3,206,903 A | 9/1965 | Johnson |
| 3,280,796 A | 10/1966 | Hatcher |
| 3,292,331 A | 12/1966 | Sams |
| 3,305,993 A | 2/1967 | Nels |
| 3,315,974 A | 4/1967 | Weaver et al. |
| 3,324,831 A | 6/1967 | St. Onge |
| 3,341,987 A | 9/1967 | Ragnhill |
| 3,378,276 A | 4/1968 | Fulmer |
| 3,465,488 A | 9/1969 | Miller |
| 3,468,081 A | 9/1969 | Aulis |
| 3,469,356 A | 9/1969 | White |
| 3,497,231 A | 2/1970 | Fulmer et al. |
| 3,500,596 A | 3/1970 | Evald |
| 3,550,334 A | 12/1970 | Van Der Lely |
| 3,611,659 A | 10/1971 | Greenlaugh |
| 3,624,786 A | 11/1971 | Lundahl |
| 3,631,999 A | 1/1972 | Walerowski |
| 3,694,977 A | 10/1972 | Verman |
| 3,711,363 A | 1/1973 | Jarema et al. |
| 3,712,007 A | 1/1973 | Kump |
| 3,720,022 A | 3/1973 | Dattner |
| 3,722,168 A | 3/1973 | Comm |
| 3,750,366 A | 8/1973 | Rich, Jr. et al. |
| 3,793,796 A | 2/1974 | Hughes |
| 3,828,502 A | 8/1974 | Carlsson |
| 3,844,063 A | 10/1974 | Jackson |
| 3,863,404 A | 2/1975 | Wahlquist |
| 3,866,365 A | 2/1975 | Honigman |
| 3,866,672 A | 2/1975 | Rich, Jr. et al. |
| RE28,367 E | 3/1975 | Rich, Jr. et al. |
| 3,983,665 A | 10/1976 | Burton |
| 3,984,949 A | 10/1976 | Wahlquist |
| 3,990,193 A | 11/1976 | Ray et al. |
| 4,035,964 A | 7/1977 | Robinson |
| 4,050,215 A | 9/1977 | Fisher |
| 4,068,434 A | 1/1978 | Day et al. |
| 4,074,475 A | 2/1978 | Wahlquist |
| 4,118,901 A | 10/1978 | Johnson |
| 4,155,204 A | 5/1979 | Prozinski |
| 4,165,591 A | 8/1979 | Fitzgibbon |
| 4,186,539 A | 2/1980 | Harmon et al. |
| 4,235,054 A | 11/1980 | Cable et al. |
| 4,360,553 A | 11/1982 | Landheer |
| 4,376,593 A | 3/1983 | Schaefer |
| 4,415,184 A | 11/1983 | Stephenson et al. |
| 4,423,913 A | 1/1984 | Lee |
| 4,441,286 A | 4/1984 | Skvaril |
| 4,464,877 A | 8/1984 | Gebhardt et al. |
| 4,534,141 A | 8/1985 | Fagnoni |
| 4,567,699 A | 2/1986 | McClellan |
| 4,570,959 A | 2/1986 | Grinwald |
| 4,592,175 A | 6/1986 | Werner |
| 4,599,829 A | 7/1986 | DiMartino, Sr. |
| 4,603,518 A | 8/1986 | Fennes |
| 4,603,658 A | 8/1986 | Garnsey |
| 4,633,626 A | 1/1987 | Freeman et al. |
| 4,635,412 A | 1/1987 | Le Poittevin |
| 4,641,468 A | 2/1987 | Slater |
| 4,644,708 A | 2/1987 | Baudot et al. |
| 4,674,250 A | 6/1987 | Altizer |
| 4,689,924 A | 9/1987 | Jurgensen |
| 4,744,182 A | 5/1988 | Shacket et al. |
| 4,766,708 A | 8/1988 | Sing |
| 4,779,514 A | 10/1988 | Prigmore et al. |
| 4,780,996 A | 11/1988 | Julien, Jr. |
| 4,856,244 A | 8/1989 | Clapp |
| 4,890,437 A | 1/1990 | Quaile |
| 4,891,919 A | 1/1990 | Palibroda |
| 4,958,874 A | 9/1990 | Hegedus |
| 4,958,974 A | 9/1990 | Schenk |
| 4,989,379 A | 2/1991 | Suzuki |
| 5,070,667 A | 12/1991 | Schulte |
| 5,107,639 A | 4/1992 | Morin et al. |
| 5,160,567 A | 11/1992 | Konicek et al. |
| 5,185,973 A | 2/1993 | Oldani et al. |
| 5,185,981 A | 2/1993 | Martinez |
| 5,218,803 A | 6/1993 | Wright |
| 5,265,394 A | 11/1993 | Gardner |
| 5,345,730 A | 9/1994 | Jurgensen |
| 5,461,832 A | 10/1995 | Smith |
| 5,491,934 A | 2/1996 | Bigelow, Jr. et al. |
| 5,497,593 A | 3/1996 | Riesberg |
| 5,596,844 A * | 1/1997 | Kalinowski ............ E04B 1/3442 52/79.5 |
| 5,657,606 A | 8/1997 | Ressel et al. |
| 5,664,388 A | 9/1997 | Chapman et al. |
| 5,732,839 A | 3/1998 | Schimmang et al. |
| 5,755,063 A | 5/1998 | Ohnishi et al. |
| 5,761,854 A | 6/1998 | Johnson et al. |
| 5,765,330 A | 6/1998 | Richard |
| 5,775,046 A | 7/1998 | Fanger et al. |
| 5,845,441 A | 12/1998 | Swartz |
| 5,867,963 A | 2/1999 | Hershey |
| 5,899,037 A | 5/1999 | Josey |
| 5,906,075 A | 5/1999 | Sowers |
| 5,930,962 A | 8/1999 | Sokolean |
| 5,950,373 A | 9/1999 | von Hoff et al. |
| 5,966,956 A | 10/1999 | Morris et al. |
| 6,003,278 A | 12/1999 | Weaver et al. |
| 6,003,919 A | 12/1999 | Shook |
| 6,047,519 A | 4/2000 | Bagn |
| 6,054,194 A | 4/2000 | Kane |
| 6,073,413 A | 6/2000 | Tongiatama |
| 6,158,184 A | 12/2000 | Timmerman, Sr. et al. |
| 6,185,898 B1 | 2/2001 | Pratt |

(56) References Cited

U.S. PATENT DOCUMENTS

| | | |
|---|---|---|
| 6,195,950 B1 | 3/2001 | Harris |
| 6,223,479 B1 | 5/2001 | Stockli |
| 6,231,706 B1 | 5/2001 | Higaki et al. |
| 6,244,016 B1 | 6/2001 | Wolf |
| 6,279,284 B1 | 8/2001 | Moras |
| 6,308,469 B1 | 10/2001 | Leung |
| 6,385,942 B1 | 5/2002 | Grossman et al. |
| 6,481,165 B1 | 11/2002 | Romary et al. |
| 6,481,172 B1 | 11/2002 | Porter |
| 6,625,937 B1 | 9/2003 | Parker et al. |
| 6,663,740 B2 | 12/2003 | Yamasaki |
| 6,745,531 B1 | 6/2004 | Egan |
| 6,925,761 B1 | 8/2005 | De La Marche |
| 6,941,718 B1 | 9/2005 | diGirolamo et al. |
| 6,959,514 B1 | 11/2005 | Pingel |
| 6,959,515 B1 | 11/2005 | Beighton |
| 6,983,567 B2 | 1/2006 | Ciotti |
| 6,996,947 B2 | 2/2006 | Albora |
| 6,997,495 B1 | 2/2006 | Groezinger |
| 7,299,596 B2 | 11/2007 | Hildreth |
| 7,326,022 B2 | 2/2008 | Brown et al. |
| 7,444,953 B1 | 11/2008 | Player |
| 7,740,257 B2 | 6/2010 | Haire |
| 7,828,367 B2 | 11/2010 | Hickam et al. |
| 7,841,136 B2 | 11/2010 | Czyznikiewicz |
| 7,882,659 B2 | 2/2011 | Gyory et al. |
| 7,930,857 B2 | 4/2011 | Pope |
| 8,141,304 B2 | 3/2012 | Shen et al. |
| 8,166,715 B2 | 5/2012 | De Azambuja |
| 8,186,109 B2 | 5/2012 | Warminsky |
| 8,201,362 B2 | 6/2012 | Alford et al. |
| 8,276,328 B2 | 10/2012 | Pepin |
| 8,347,560 B2 | 1/2013 | Gyory et al. |
| 8,365,473 B2 | 2/2013 | Bjerre |
| 8,474,194 B2 | 7/2013 | Tiramani |
| 8,516,778 B1 | 8/2013 | Wilkens |
| 8,733,029 B2 | 5/2014 | Tiramani |
| 8,925,270 B2 | 1/2015 | Grisolia et al. |
| 9,617,739 B2 | 4/2017 | Krause |
| D820,469 S | 6/2018 | Watson |
| 10,196,173 B2 | 2/2019 | Tiramani |
| 10,661,835 B2 | 5/2020 | Tiramani |
| 10,688,906 B2 | 6/2020 | Tiramani et al. |
| 10,829,029 B2 | 11/2020 | Tiramani et al. |
| 10,926,689 B2 | 2/2021 | Tiramani et al. |
| 10,961,016 B2 | 3/2021 | Tiramani |
| 11,007,921 B2 | 5/2021 | Tiramani et al. |
| 11,066,832 B2 | 7/2021 | Krause |
| 11,118,344 B2 | 9/2021 | Tiramani et al. |
| 11,220,816 B2 | 1/2022 | Tiramani et al. |
| 11,525,256 B2 | 12/2022 | Tiramani et al. |
| 11,554,898 B2 | 1/2023 | Brunner et al. |
| 2001/0004820 A1 | 6/2001 | Poliquin |
| 2002/0046514 A1 | 4/2002 | Leung |
| 2002/0095896 A1 | 7/2002 | Commins et al. |
| 2002/0179598 A1 | 12/2002 | Kuhn |
| 2003/0009964 A1 | 1/2003 | Trarup et al. |
| 2003/0051314 A1 | 3/2003 | Jenks |
| 2003/0071426 A1 | 4/2003 | Larouche |
| 2004/0108750 A1 | 6/2004 | Park |
| 2004/0128930 A1 | 7/2004 | Ohnishi |
| 2004/0139674 A1 | 7/2004 | DiLorenzo |
| 2004/0148889 A1 | 8/2004 | Bibee et al. |
| 2004/0177581 A1 | 9/2004 | Starke |
| 2005/0055973 A1 | 3/2005 | Hagen et al. |
| 2005/0066620 A1 | 3/2005 | Albora |
| 2005/0076600 A1 | 4/2005 | Moody et al. |
| 2005/0122014 A1 | 6/2005 | Bucher et al. |
| 2005/0283371 A1 | 12/2005 | Tiramani |
| 2006/0037256 A1 | 2/2006 | Pryor |
| 2006/0070306 A1 | 4/2006 | Lin |
| 2006/0137269 A1 | 6/2006 | Di Lorenzo |
| 2006/0150573 A1 | 7/2006 | Elliott et al. |
| 2006/0251851 A1 | 11/2006 | Bowman |
| 2006/0260268 A1 | 11/2006 | Ritchie |
| 2007/0051069 A1 | 3/2007 | Grimes |
| 2007/0079573 A1 | 4/2007 | Sarine et al. |
| 2007/0096473 A1 | 5/2007 | Ortega |
| 2007/0144078 A1 | 6/2007 | Frondelius |
| 2007/0170740 A1 | 7/2007 | Di Franco |
| 2007/0209294 A1 | 9/2007 | Harvey |
| 2007/0271857 A1 | 11/2007 | Heather et al. |
| 2008/0047225 A1 | 2/2008 | Kawai et al. |
| 2008/0066417 A1 | 3/2008 | Orchard |
| 2008/0264463 A1 | 10/2008 | Kim et al. |
| 2009/0014044 A1 | 1/2009 | Hartman et al. |
| 2009/0139153 A1 | 6/2009 | Hudson |
| 2009/0193734 A1 | 8/2009 | Harig et al. |
| 2009/0205277 A1 | 8/2009 | Gibson |
| 2009/0217600 A1 | 9/2009 | De Azambuja |
| 2009/0266006 A1 | 10/2009 | Gyory et al. |
| 2009/0293395 A1 | 12/2009 | Porter |
| 2010/0012000 A1 | 1/2010 | Gordon |
| 2010/0018130 A1 | 1/2010 | Lopez et al. |
| 2010/0162636 A1 | 7/2010 | Bonebrake |
| 2010/0192481 A1 | 8/2010 | Shen et al. |
| 2010/0269419 A1 | 10/2010 | Gyory et al. |
| 2011/0094167 A1 | 4/2011 | Noiseux et al. |
| 2011/0126479 A1 | 6/2011 | Alford et al. |
| 2011/0268916 A1 | 11/2011 | Pardue, Jr. |
| 2011/0297675 A1 | 12/2011 | Johnson et al. |
| 2012/0006369 A1 | 1/2012 | Cantin et al. |
| 2012/0137610 A1 | 6/2012 | Knight et al. |
| 2012/0180404 A1 | 7/2012 | Scouten |
| 2012/0240501 A1 | 9/2012 | Spiegel |
| 2012/0255240 A1 | 10/2012 | Shen |
| 2012/0317902 A1 | 12/2012 | Kapteyn |
| 2013/0036688 A1 | 2/2013 | Gosain |
| 2013/0067841 A1 | 3/2013 | Grieco et al. |
| 2013/0081346 A1 | 4/2013 | Kulprathipanja et al. |
| 2013/0232902 A1 | 9/2013 | Mayer et al. |
| 2013/0263527 A1 | 10/2013 | Barrett et al. |
| 2013/0269267 A1 | 10/2013 | Tiramani |
| 2013/0283618 A1 | 10/2013 | Wiliams |
| 2013/0305626 A1 | 11/2013 | Strickland et al. |
| 2013/0326986 A1 | 12/2013 | Krivtsov et al. |
| 2014/0001786 A1 | 1/2014 | Cantin et al. |
| 2014/0033619 A1 | 2/2014 | Merchant |
| 2014/0115991 A1 | 5/2014 | Sievers et al. |
| 2014/0150352 A1 | 6/2014 | Lee |
| 2014/0157710 A1 | 6/2014 | Potter et al. |
| 2014/0202089 A1 | 7/2014 | Nakajima et al. |
| 2014/0311051 A1 | 10/2014 | Fagan |
| 2015/0007506 A1 | 1/2015 | Wallance |
| 2015/0034634 A1 | 2/2015 | Mullaney |
| 2015/0093535 A1 | 4/2015 | Lambach et al. |
| 2015/0121775 A1 | 5/2015 | Lippert |
| 2015/0135623 A1 | 5/2015 | Garrett et al. |
| 2015/0204068 A1 | 7/2015 | Miller |
| 2015/0239221 A1 | 8/2015 | Gillman |
| 2015/0322668 A1 | 11/2015 | Quinn et al. |
| 2015/0361653 A1 | 12/2015 | Grant et al. |
| 2016/0059104 A1 | 3/2016 | Monaco |
| 2016/0069062 A1 | 3/2016 | Dynon |
| 2016/0069067 A1 | 3/2016 | Ciuperca |
| 2016/0138258 A1 | 5/2016 | Schaffert et al. |
| 2016/0160501 A1 | 6/2016 | Taraba et al. |
| 2016/0208479 A1 | 7/2016 | Krause |
| 2016/0215508 A1 | 7/2016 | Kimel |
| 2017/0030071 A1 | 2/2017 | Sorensen et al. |
| 2017/0037637 A1 | 2/2017 | Grisolia et al. |
| 2017/0145692 A1 | 5/2017 | Zheng et al. |
| 2017/0146055 A1 | 5/2017 | Lowrey |
| 2017/0268232 A1 | 9/2017 | Renke et al. |
| 2017/0323780 A1 | 11/2017 | Koga et al. |
| 2017/0342723 A1 | 11/2017 | Krause |
| 2017/0350114 A1 | 12/2017 | Crozier |
| 2018/0016781 A1 | 1/2018 | Fox et al. |
| 2018/0112394 A1 | 4/2018 | Giles |
| 2018/0141134 A1 | 5/2018 | Brigham |
| 2018/0148923 A1 | 5/2018 | Bravo Valenzuela |
| 2018/0313074 A1 | 11/2018 | Brown et al. |
| 2019/0024364 A1 | 1/2019 | Lestini et al. |
| 2019/0056237 A1 | 2/2019 | White et al. |

(56) References Cited

U.S. PATENT DOCUMENTS

| | | |
|---|---|---|
| 2019/0100908 A1 | 4/2019 | Tiramani et al. |
| 2019/0128847 A1 | 5/2019 | Humfeld et al. |
| 2019/0161964 A1 | 5/2019 | Figueroa |
| 2019/0352515 A1 | 11/2019 | Zoitos et al. |
| 2020/0002552 A1 | 1/2020 | Song et al. |
| 2020/0123776 A1 | 4/2020 | Leatherman et al. |
| 2020/0263412 A1 | 8/2020 | Tiramani et al. |
| 2020/0263413 A1 | 8/2020 | Tiramani et al. |
| 2020/0317880 A1 | 10/2020 | Ruckdaeschel et al. |

FOREIGN PATENT DOCUMENTS

| | | |
|---|---|---|
| CA | 2442403 C | 12/2008 |
| CA | 2665960 A1 | 8/2009 |
| CH | 713912 A1 | 12/2018 |
| CN | 101249663 A | 8/2008 |
| CN | 205935221 U | 2/2017 |
| CN | 107012982 A | 8/2017 |
| CN | 206957136 U | 2/2018 |
| CN | 110000252 A | 7/2019 |
| CN | 110273517 B | 7/2020 |
| CN | 113423901 A | 9/2021 |
| CN | 113454302 A | 9/2021 |
| CN | 214994585 U | 12/2021 |
| DE | 1937440 A1 | 2/1971 |
| DE | 19800291 A1 | 7/1999 |
| DE | 19631647 C2 | 4/2000 |
| EP | 0205278 A1 | 12/1986 |
| EP | 2000611 A2 | 12/2008 |
| EP | 2636807 A2 | 9/2013 |
| EP | 3059357 A1 | 8/2016 |
| EP | 3239423 A1 | 11/2017 |
| FR | 1484291 A | 6/1967 |
| FR | 2652620 A1 | 4/1991 |
| GB | 1209160 A | 10/1970 |
| GB | 2290567 A | 1/1996 |
| WO | 86/04630 A1 | 8/1986 |
| WO | 1996013402 A1 | 5/1996 |
| WO | 1997013931 A1 | 4/1997 |
| WO | 2002066755 A1 | 8/2002 |
| WO | 2006056383 A1 | 1/2006 |
| WO | 2008067592 A1 | 6/2008 |
| WO | 2012154898 A1 | 11/2012 |
| WO | 2014/169320 A1 | 10/2014 |
| WO | 2015155438 A1 | 10/2015 |
| WO | 2016074116 A1 | 5/2016 |
| WO | 2017182471 A1 | 10/2017 |
| WO | 2019121958 A1 | 6/2019 |
| WO | 2020167671 A2 | 8/2020 |
| WO | 2020167673 A1 | 8/2020 |
| WO | 2020167674 A1 | 8/2020 |

OTHER PUBLICATIONS

Non-Final Office Action from related U.S. Appl. No. 17/675,646 dated Feb. 2, 2023.
International Search Report and Written Opinion from related International Patent Application No. PCT/US2020/017527 issued Jun. 4, 2020.
Thomas, Robert, MgO Board, igO Board, https://www.wconline.com/articles/85449-mgo-board, Oct. 31, 2007.
International Search Report and Written Opinion from related International Patent Application No. PCT/US2020/017528 issued May 1, 2020.
Moore, Tom, PE, "SIPs: An Engineer's Perspective," Powerpoint presented by the Structural Insulated Panel Association, 2018.
Video entitled, "Mega advanced Boxabl tech?", found at: https://www.facebook.com/boxabl/videos/660885174475648/ (May 8, 2020).
Video entitled, "Mega advanced Boxabl tech?", found at: https://www.tiktok.com/@boxabl/video/6824523989658930437?is_copy_url=1&is_from_webapp=v1 (May 8, 2020).
Video entitled, "Sneak peek of some Boxabl parts being made in a fully automated steel processing . . . ," found at: https://www.facebook.com/boxabl/videos/1113135289041201/ (Apr. 30, 2020).
APA Product Guide—Structural Insulated Panels, printed 2018.
International Search Report and Written Opinion from related Int'l Patent Appl'n No. PCT/US2020/017524 dated Jul. 30, 2020.
International Search Report and Written Opinion from related Int'l Patent Appl'n No. PCT/US2021/061343 dated Feb. 9, 2022.
International Search Report and Written Opinion from related Int'l Patent Appl'n No. PCT/US2021/056415 dated Feb. 25, 2022.
International Search Report and Written Opinion from related Int'l Patent Appl'n No. PCT/US2021/058912 dated Feb. 24, 2022.
Picture from https://microshowcase.com/microdwell/minim-house/, believed available as submitted herewith by Apr. 27, 2020.
Structural Insulated Panels Association, "Designing With SIP's: Design Considerations", printed 2018.
European Search Report from related European patent application No. 18864413.2 issued May 19, 2021.
European Search Report from related European patent application No. 18863822.5 issued Jun. 28, 2021.
//topsider.com/floorF.html—believed available as submitted herewith by May 13, 2008.
Ching, Building Construction Illustrated (3d edition), Wall Systems 5.03, believed available as submitted herewith by Oct. 3, 2006.
BOCA 1999 (14th edition), p. 267, believed available as submitted herewith by Oct. 3, 2006.
Portion of www.thisoldhouse.com, believed available as submitted herewith by Aug. 2, 2006.
Pages 1 and 2 of //www.taunton.com/finehomebuilding/pages/h00023.asp, believed available as submitted herewith by Aug. 2, 2006.
Affidavit of Robert Delorenzo dated Oct. 3, 2006.
Decision on Appeal, Ex Parte Paolo Tiramani, Appeal 2010-008385, U.S. Appl. No. 10/653,523, dated Aug. 28, 2012.
L1019-Genuine-Parts-Flyer, attached—Air Springs, 2014.
Hendrickson-Trailer Air Springs-Hendrickson Genuine Parts, attached, believed available as submitted herewith by Nov. 7, 2018.
International Search Report & Written Opinion, issued on Jan. 2, 2019, in PCT/US2018/053006. (15 Pages).
International Search Report & Written Opinion, issued on Jan. 29, 2019 in corresponding PCT application No. PCT/US2018/053015.
Teavy Timbers, Structural Insulated Panels, SIPS, http://heavytimbers.com/sips.html. last viewe Oct. 31, 2018.
International Search Report and Written Opinion from related Int'l Patent Appl'n No. PCT/US2021/059440 dated Mar. 16, 2022.
International Search Report and Written Opinion from related Int'l Patent Appl'n No. PCT/US2022/014224 dated Apr. 25, 2022.
International Search Report and Written Opinion from related Int'l Patent Appl'n No. PCT/US2021/063581 dated May 3, 2022.
International Search Report and Written Opinion from related Int'l Patent Appl'n No. PCT/US2022/011415 dated May 24, 2022.
First Examination Report from related Chinese Patent Application No. 202080014606.4 issued Apr. 20, 2022.
U.S. Non-Final Office Action from related U.S. Appl. No. 16/786,202 issued Apr. 22, 2022.
First Examination Report from related Chinese Patent Application No. 202080014607.9 issued Mar. 24, 2022.
International Search Report and Written Opinion from related Int'l Patent Appl'n No. PCT/US2022/01699 dated Jul. 7, 2022.
Search Report from related European Patent Application No. 20755992.3 issued Oct. 7, 2022.
Search Report from related European Patent Application No. 20755993.1 issued Nov. 17, 2022.
U.S. Appl. No. 17/527,520, filed Nov. 16, 2021, Paolo Tiramani et al.
U.S. Appl. No. 17/239,706, filed Dec. 1, 2021, Paolo Tiramani et al.
U.S. Appl. No. 17/539,706, filed Dec. 1, 2021, Paolo Tiramani et al.
U.S. Appl. No. 17/513,207, filed Oct. 28, 2021, Paolo Tiramani et al.
U.S. Appl. No. 17/513,266, filed Oct. 28, 2021, Paolo Tiramani et al.
U.S. Appl. No. 17/587,051, filed Jan. 28, 2022, Paolo Tiramani et al.

(56) References Cited

OTHER PUBLICATIONS

U.S. Appl. No. 17/504,883, filed Oct. 19, 2021, Paolo Tiramani et al.
U.S. Appl. No. 17/675,646, filed Feb. 18, 2022, Paolo Tiramani et al.
U.S. Appl. No. 17/675,653, filed Feb. 18, 2022, Paolo Tiramani et al.
U.S. Appl. No. 17/552,108, filed Dec. 15, 2021, Paolo Tiramani et al.
U.S. Appl. No. 17/569,962, filed Jan. 6, 2022, Paolo Tiramani et al.
U.S. Appl. No. 17/245,187, filed Apr. 30, 2021, Paolo Tiramani et al.
U.S. Appl. No. 18/071,902, filed Nov. 30, 2022, Paolo Tiramani et al.

* cited by examiner

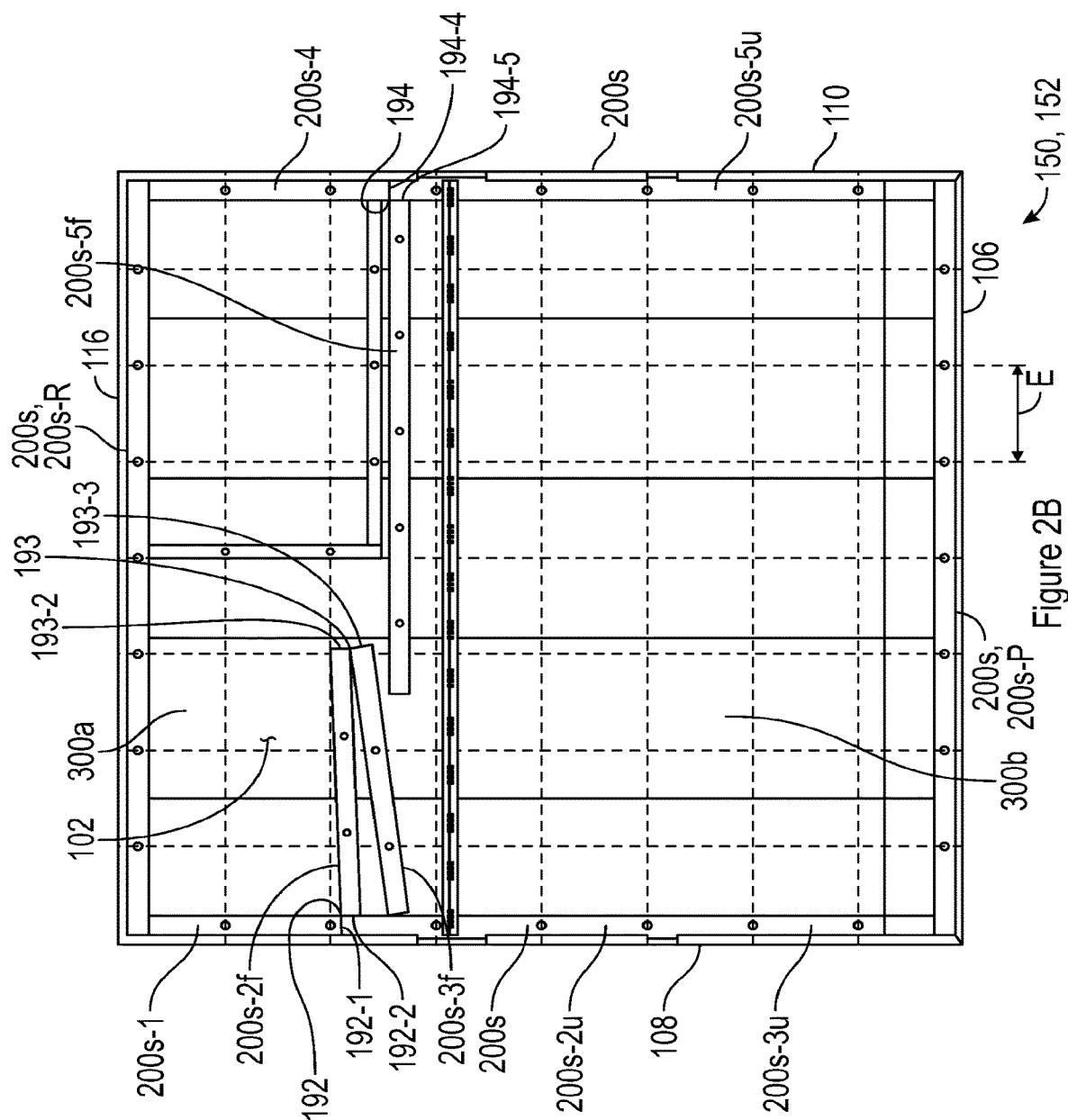

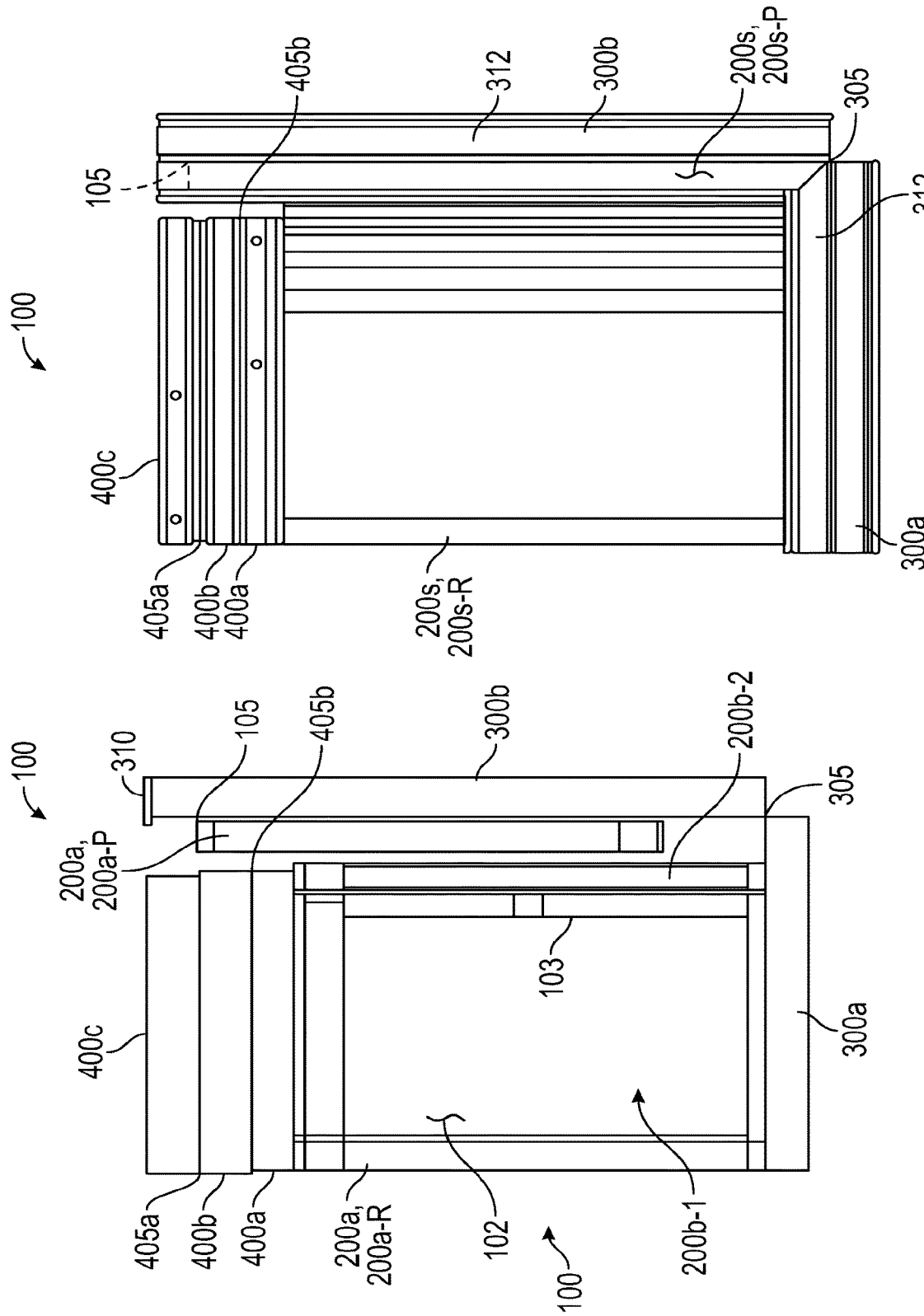

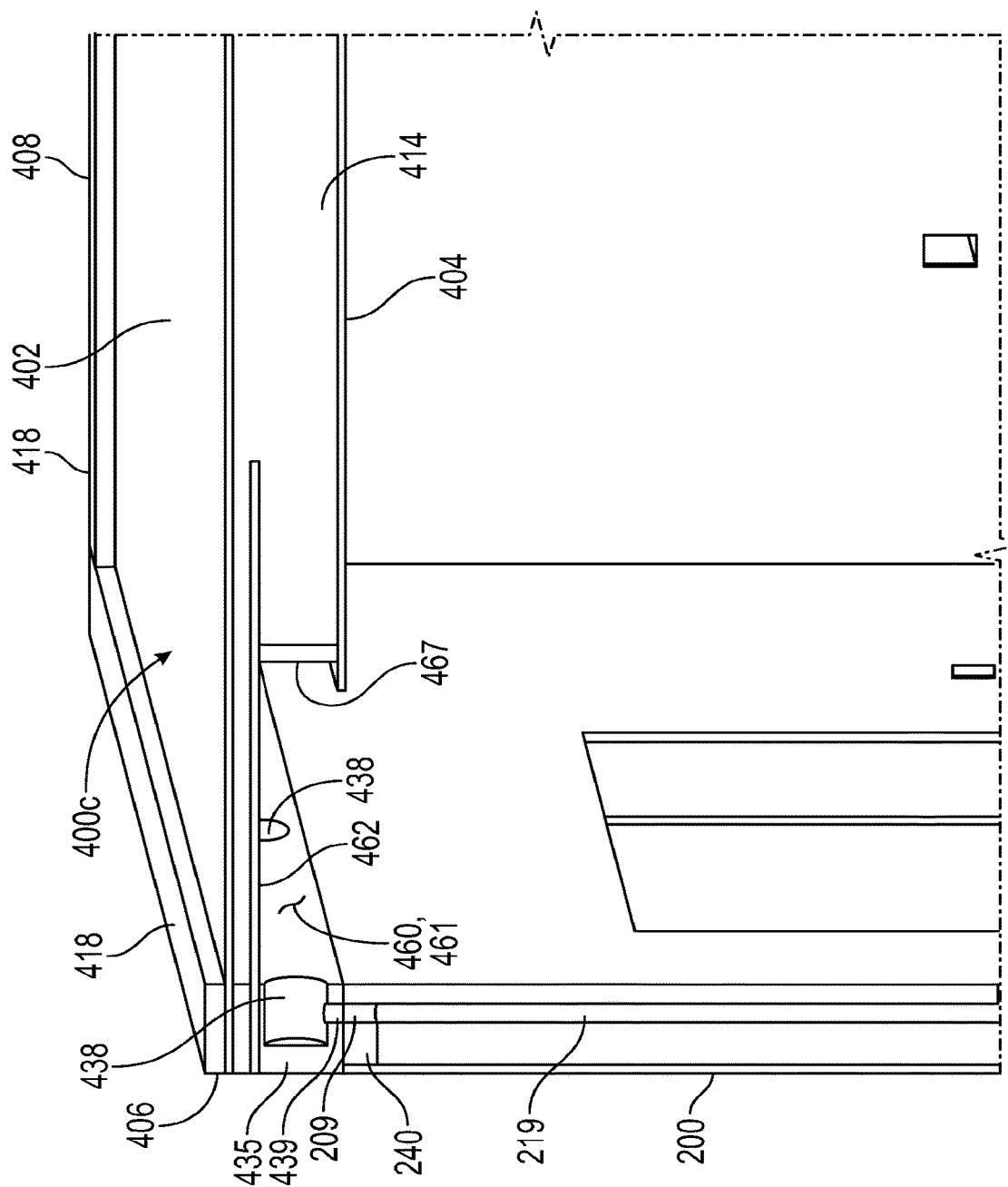

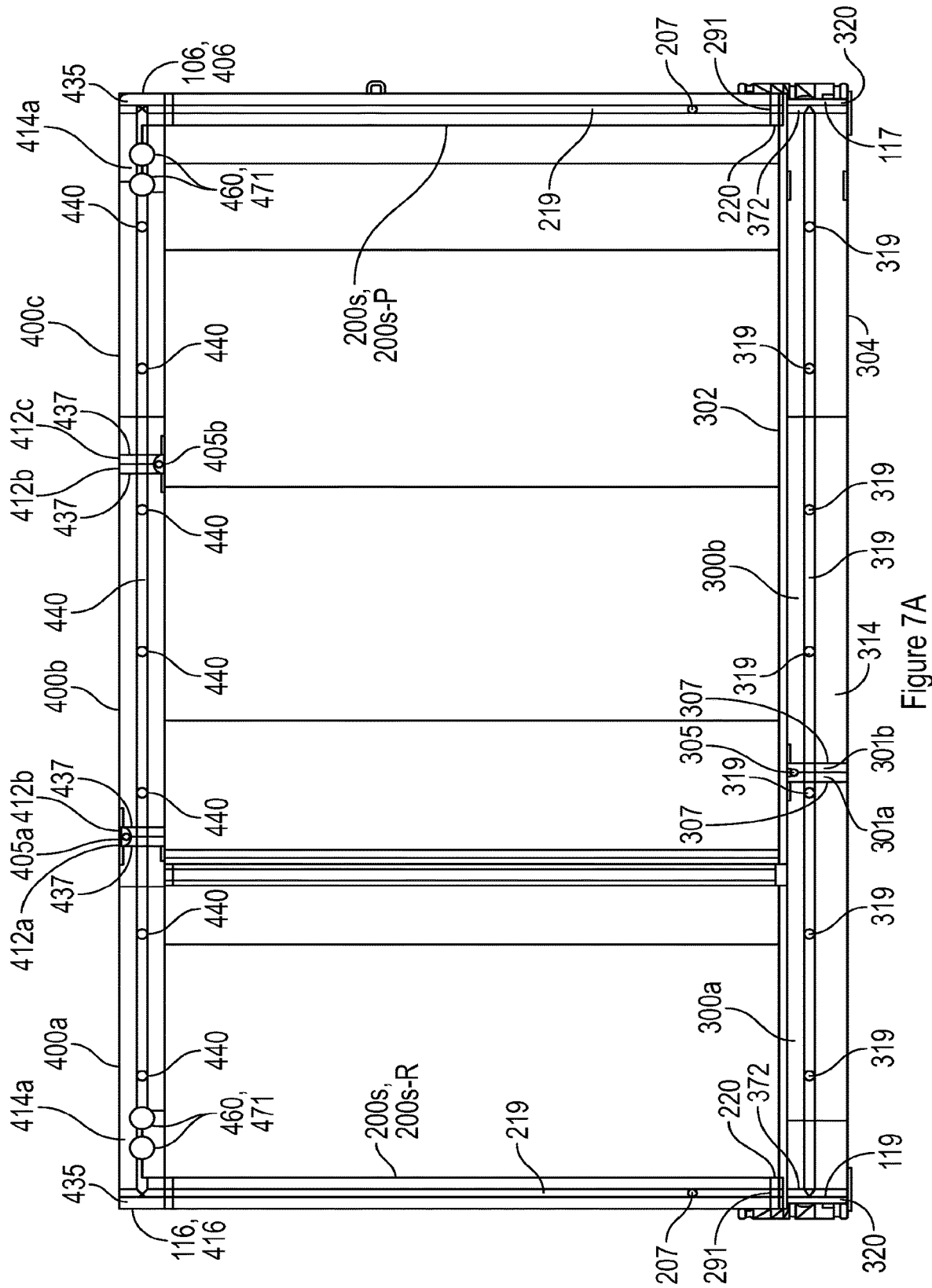

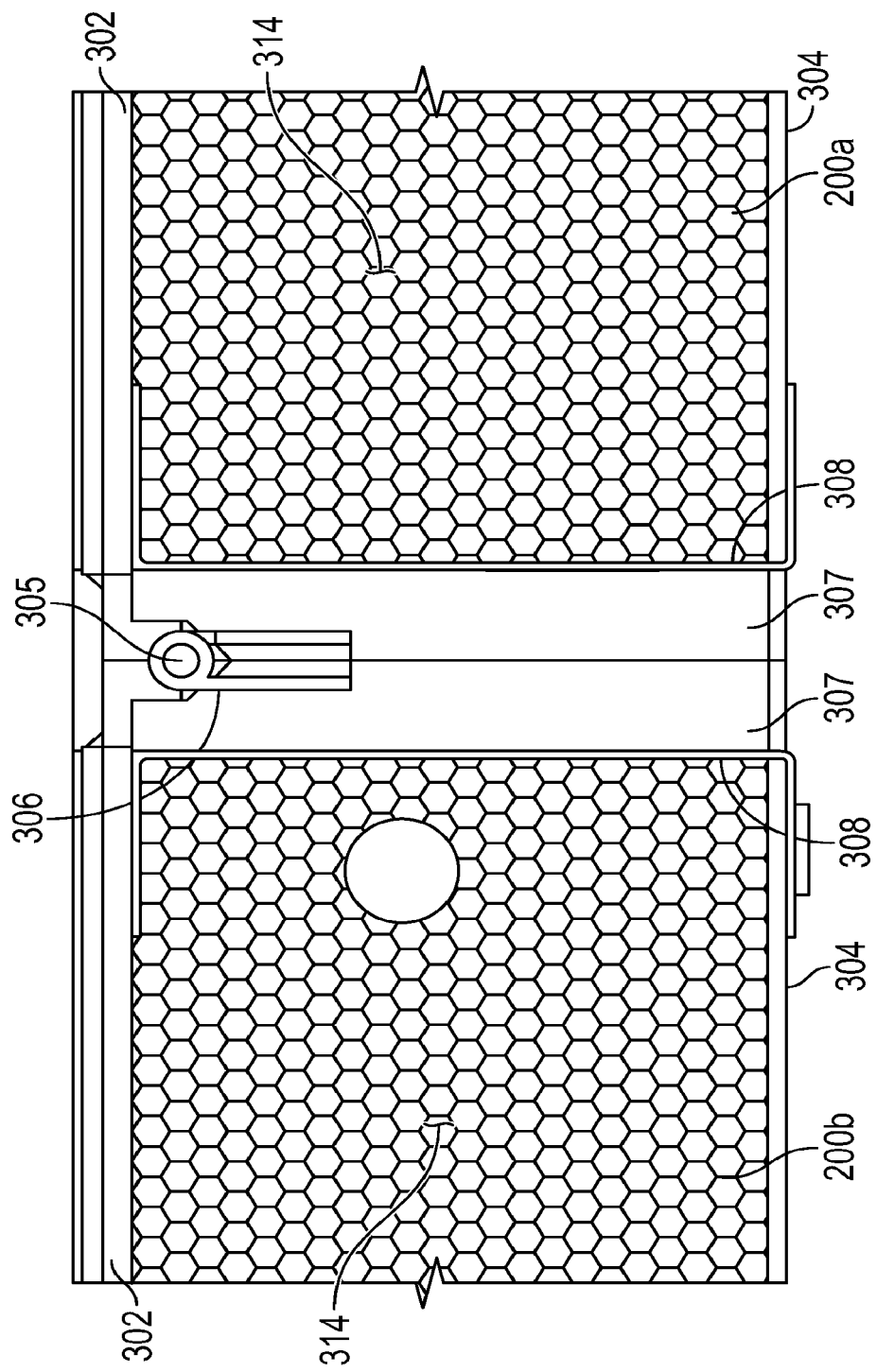

FOLDABLE BUILDING STRUCTURES WITH UTILITY CHANNELS AND LAMINATE ENCLOSURES

CROSS-REFERENCES TO RELATED APPLICATIONS

The present application is a divisional of U.S. Non-Provisional application Ser. No. 17/245,187, filed Apr. 30, 2021, which is a divisional of U.S. Non-Provisional application Ser. No. 16/786,130, filed Feb. 10, 2020 (issued as U.S. Pat. No. 11,118,344 on Sep. 14, 2021), which claims the benefit of U.S. Provisional Application No. 62/805,710, filed Feb. 14, 2019, and U.S. Provisional Application No. 62/960,991, filed Jan. 14, 2020. The entire content of each of the foregoing patent applications is incorporated herein by reference.

BACKGROUND OF THE INVENTION

Field of the Invention

The inventions herein relate to structures, such as dwellings and other buildings for residential occupancy, commercial occupancy and/or material storage, which are foldable for facilitating transport, and to components for such structures.

Description of the Related Art

In the field of residential housing, the traditional technique for building homes is referred to as "stick-built" construction, where a builder constructs housing at the intended location using in substantial part raw materials such as wooden boards, plywood panels, and steel Lally columns. The materials are assembled piece by piece over a previously prepared portion of ground, for example, a poured concrete slab or a poured concrete or cinder block foundation.

There have been a variety of efforts to depart from the conventional construction techniques used to create dwellings, as well as commercial spaces and like. One of the alternatives to stick-built construction is very generally referred to as modular housing. As opposed to stick-built construction, where the structure is built on-site, a modular house is constructed in a factory and then shipped to the site, often by means of a tractor-trailer. A drawback of modular housing is that the prospective buyer can customize the structure layout only to a relatively limited degree. That is, while certain features, for example a closet, may be added or subtracted from a room, the general shape and layout of the house cannot be changed or adapted to the customer's preference.

Additionally, modular housing often exceeds in size normally-permitted legal limits for road transport. For example, in the United States the maximum permitted dimensions for road transport are in general 102 inches (259.1 cm) in width, 13.5 feet (4.11 m) in height and 65 to 75 feet (19.81 to 22.86 m) in length. Thus, in many cases transporting a modular house from factory to site requires oversize load permits, which may impose restrictions on when transport can be undertaken and what routes can be utilized. Oversize road regulations may also require the use of an escort car and a trailing car as well. All of these requirements and restrictions inevitably increase the cost of the modular housing.

Another alternative to stick-built construction is what is commonly referred to as a mobile home or trailer home. Mobile and trailer homes, like modular housing, are constructed in a factory and then transported to the intended location. They can be configured as two or three separate pieces which are joined at the receiving location, in which case they are referred to in the United States as a double-wide or a triple wide. Mobile and trailer homes often require less on-site finishing prior to occupancy than modular housing. On the other hand, such homes generally are almost always single story, tend to have a limited floor plan essentially dictated by transport requirements, and often cannot be customized by the buyer to any substantial degree. Like modular houses, mobile and trailer homes often exceed oversize road regulations with the attendant drawbacks described above.

A still further alternative approach to stick-built construction is to utilize panels (not entire houses or rooms) which are fabricated in a factory and transported to a building site for assembly into a structure and finishing. In particular, such panels are referred to as structural insulated panels, or SIPs for short. A SIPs panel typically is a foam core panel faced on each side with a structural board, such as oriented strand board. Using SIPs in construction is often regarded as of limited benefit relative to stick-built construction, because the finishing of the house, as opposed to the framing, is generally the most expensive part of construction. Also, in the case where multiple SIPs are used to form for example a wall, the intersection between two adjacent SIPs will have a seam across the thickness of the wall, which can impact structural rigidity. In addition, when apertures are cut in or positioned on-site with SIPs for placement of windows and doors, the builder must insert a lintel or header across the top of each aperture to distribute vertical loads imposed from above each window and door to the load-bearing sides. This too increases the costs of using SIPs.

There are also temporary offices, or site trailers, which are similar in dimension to a trailer house. Temporary offices are typically rendered in steel, and are simply sheltered locations containing storage, office and meeting areas. They are not suitable for permanent residency or occupancy.

Significant advancements in the construction of dwellings and commercial space are described in U.S. Pat. Nos. 8,474,194, 8,733,029 and U.S. Patent Publication No. 2019/0100908. In one aspect, those patent documents pertain to fabricating wall, floor and ceiling components in a factory that are folded together into a compact shipping module, and which are then transported to the intended location and unfolded to yield a structure, where the folding and unfolding of the components can be facilitated by the use of hinges.

SUMMARY OF THE INVENTION

The present inventions provide a set of wall, floor and ceiling components that can be fabricated in a factory and delivered to a construction site, where they can be assembled into structures suitable for human or material occupancy, such as housing, offices, retail space, and warehouse use. The components described herein can be easily shipped from a factory to a construction site. Moreover, the wall components are structured to support all designed-for vertical loads in their as-delivered state, yet can be customized on-site with doors and windows in an open-ended variety of styles, notwithstanding their factory-built nature. Additionally, the finished structures made in accordance with the inventions disclosed herein can be assembled in a multitude of configurations. Thus these inventions advantageously accord the user both the advantages of individualized customized construction and the efficiency and economy of factory fabrication.

One aspect of one of the present inventions is directed to an enclosure component for a building structure, the enclosure component having a thickness and comprising an interior sheathing layer comprising paper; a first structural layer bonded to the interior sheathing layer, where the first structural layer comprises a first generally rectangular structural panel of magnesium oxide arranged in a side-by-side relationship with a second generally rectangular structural panel of magnesium oxide to define a first structural panel seam between the first and second structural panels, and where the first structural layer includes a first binding strip positioned over the first structural panel seam and fastened to form a lap joint with the first structural panel and with the second structural panel, so as to bond together the first and second structural panels. The enclosure component includes a first strengthening layer comprising woven fiber mat, the first strengthening layer is bonded to the first structural layer; and a foam layer with first and second opposing faces comprising a first generally rectangular foam panel and a second generally rectangular foam panel arranged in a side-by-side relationship to define a foam panel seam between the first and second foam panels; where the first and second structural panels are positioned relative to the first and second foam panels such that the first structural panel seam is offset from the foam panel seam a select distance in a direction generally perpendicular to the thickness; and the first strengthening layer is bonded to the first opposing face of the foam layer.

The foregoing enclosure component additionally includes a second structural layer comprising a third generally rectangular structural panel of magnesium oxide arranged in a side-by-side relationship with a fourth generally rectangular structural panel of magnesium oxide to define a second structural panel seam between the third and fourth structural panels, and where the second structural layer includes a second binding strip positioned over the second structural panel seam and fastened to form a lap joint with the third structural panel and with the fourth structural panel, so as to bond together the third and fourth structural panels. The third and fourth structural panels are positioned relative to the first and second foam panels such that the second structural panel seam is offset from the foam panel seam a select distance in a direction generally perpendicular to the thickness; and the second structural layer is bonded to the second opposing face of the foam layer.

Another aspect of one of the present inventions is directed to a foldable building structure that comprises a fixed space portion that includes a first floor portion having a thickness to define an interior portion of the first floor portion, a first ceiling portion having a thickness to define an interior portion of the first ceiling portion, and a first wall portion having a thickness to define an interior portion of the first wall portion. The foldable building structure further comprises a second ceiling portion having a thickness to define an interior portion of the second ceiling portion, the second ceiling portion movable between a folded position that is proximate to the fixed space portion and a deployed position, and a third ceiling portion having a thickness to define an interior portion of the third ceiling portion, the third ceiling portion movable between a folded position that is proximate to the fixed space portion and a deployed position. The second and third ceiling portions are movable from their respective folded positions to their respective deployed positions to form a ceiling component of the building structure when deployed, where the ceiling component has a periphery. The first, second and third ceiling portions each define sections of a utility channel in the interior portions of the first, second and third ceiling portions, which sections are configured to form a closed loop utility channel in the interior portions of the ceiling component when the second and third ceiling portions are in their deployed positions, the utility channel being located proximate the periphery of the ceiling component and adapted for containing utility lines.

These and other aspects of the present inventions are described in the drawings annexed hereto, and in the description of the preferred embodiments and claims set forth below.

BRIEF DESCRIPTION OF THE DRAWINGS

FIGS. 2A and 2B are top schematic views of finished structures prepared in accordance with the present inventions.

FIGS. 3A and 3B are end views of shipping modules from which are formed the finished structures respectively shown in FIGS. 1A and 1B.

FIGS. 6C and 6D are partial cutaway views of a finished structure in accordance with the present inventions, depicting in greater detail the built-up utility channel embodiment of the utility service system of the present inventions.

FIGS. 7A and 7B are partial cutaway views of a finished structure in accordance with the present inventions, depicting in greater detail aspects of the ceiling, wall and floor components of a second type of structure in accordance with the present inventions.

FIG. 8 is a schematic side view of an embodiment of a hinge structure joining two floor portions in accordance with the present inventions.

DETAILED DESCRIPTION OF THE PREFERRED EMBODIMENTS

Figure 1A:
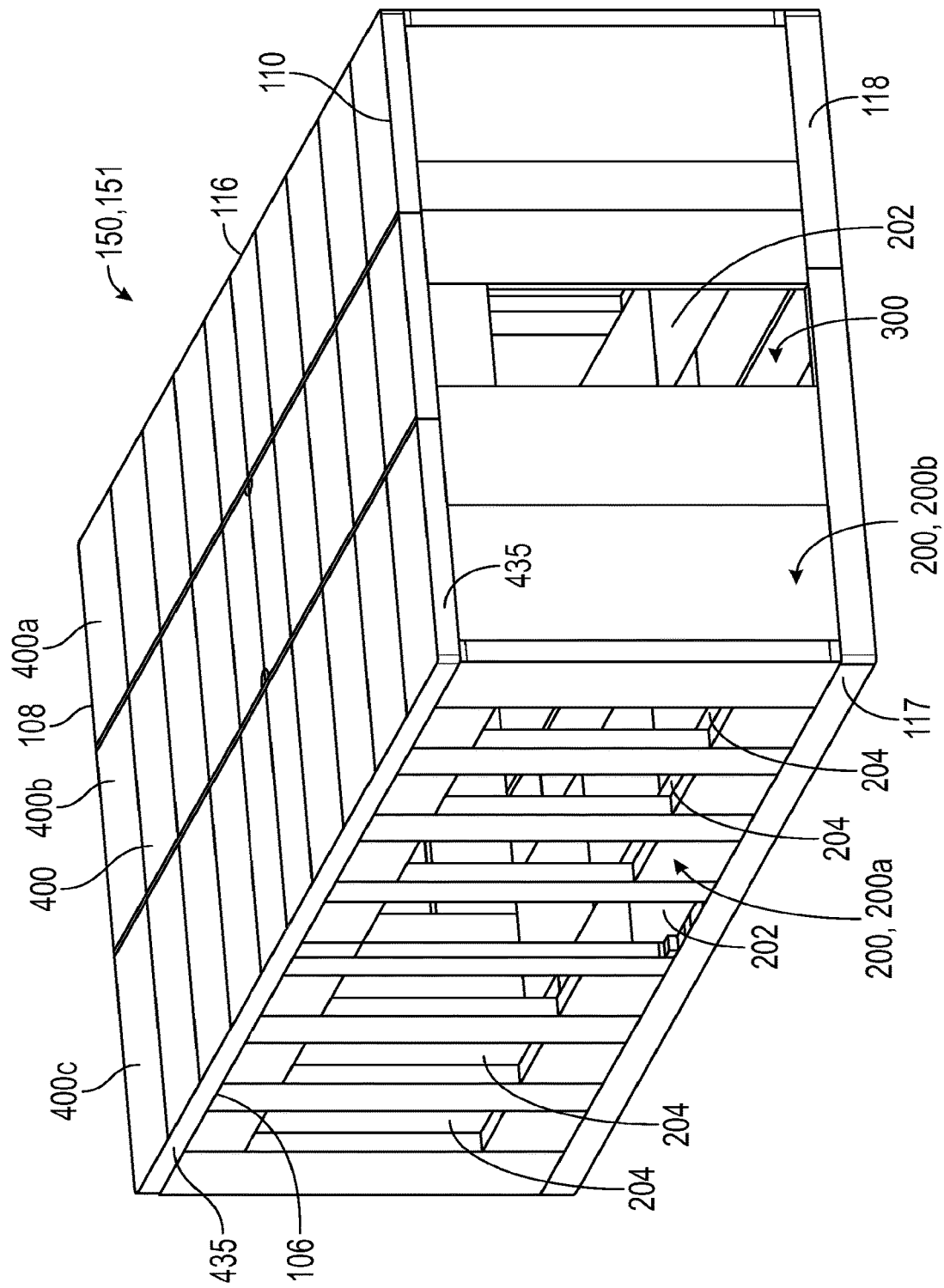
FIGS. 1A and 1B are perspective views of finished structures prepared in accordance with the present inventions.
Figure 1B:
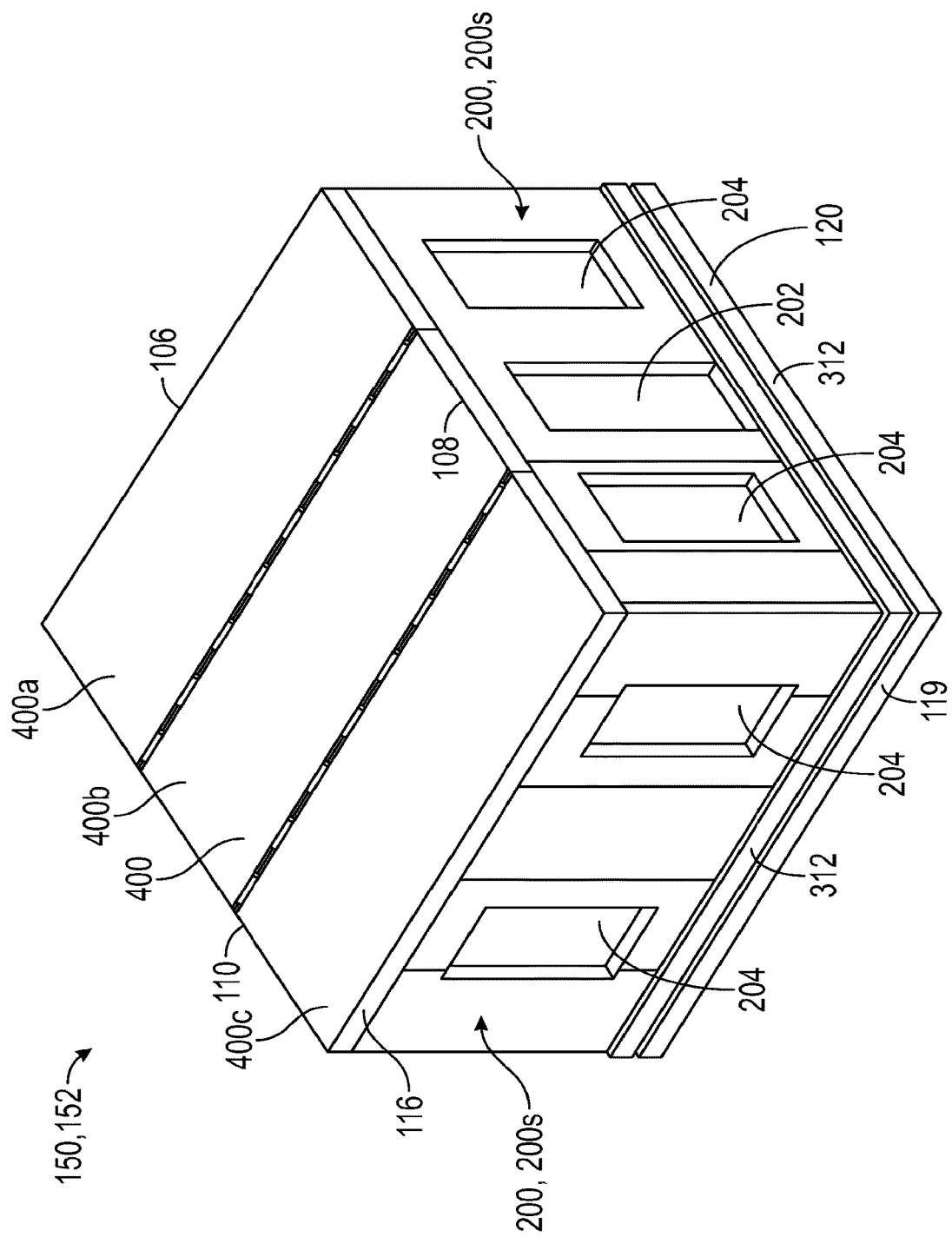

FIG. 1A depicts a finished structure 150 of a first type (sometimes referred to herein as type 1 structure 151) in accordance with the inventions disclosed herein, and FIG. 1B depicts a finished structure 150 of a second type (sometimes referred to herein as type 2 structure 152) in accordance with the inventions disclosed herein. Type 1 structure 151 is smaller than type 2 structure 152, but the inventions described herein are equally applicable to the fabrication and deployment of type 1 structure 151, type 2 structure 152, and to other structures of different dimensions as well. Accordingly, references herein to "structure 150" should be understood to generically denote type 1 structure 151 and type 2 structure 152 without distinction. Likewise, reference in this disclosure to the same numerically identified component among different embodiments indicates that such component is the same among such different embodiments.

Structure 150 as depicted in FIGS. 1A and 1B has a rectangular shape made of three types of generally planar and rectangular enclosure components 155, the three types of enclosure components 155 consisting of a wall component 200, a floor component 300, and a ceiling component 400. Structure 150 has one floor component 300, one ceiling component 400 and four wall components 200. As shown in FIGS. 1A and 1B, the perimeter of finished structure 150 is defined by first longitudinal edge 106, first transverse edge 108, second longitudinal edge 116 and second transverse edge 110.

Enclosure components 155 (wall component 200, floor component 300, and ceiling component 400) can be fabricated and dimensioned as described herein and positioned together to form a shipping module 100, shown end-on in FIGS. 3A and 3B, with FIG. 3A depicting a shipping module 100 for a type 1 structure 151 and FIG. 3B depicting a shipping module 100 for a type 2 structure 152. The enclosure components 155 are dimensioned so that the shipping module 100 is within U.S. federal highway dimensional restrictions. As a result, shipping module 100 can be transported over a limited access highway more easily, and with appropriate trailering equipment, transported without the need for oversize permits. Thus, the basic components of finished structure 150 can be manufactured in a factory, positioned together to form the shipping module 100, and the modules 100 can be transported to the desired site for the structure, where they can be readily assembled and customized, as described herein.

Enclosure Component Laminate Design

A laminate multi-layer design can be used to fabricate the enclosure components 155 of the present inventions. FIGS. 4A-4D depict four embodiments of that multi-layer design, in exploded cross-section, for an exemplary enclosure component 155.

First and Second Embodiments

Interior Sheathing Layer (282). In the first and second embodiments of the laminate multi-layer design, shown in FIGS. 4A and 4B respectively, the surface of enclosure component 155 that will face toward the interior of structure 150 is optionally provided with an interior sheathing layer 282. It is preferred that interior sheathing layer 282 be fabricated of relatively thick paper, of a weight comparable to that used as the exterior surface of drywall (marketed for example under the trademark Sheetrock®). Interior sheathing layer 282 preferably is unrolled from a continuous roll of paper (the paper roll optionally having a width approximating the width of enclosure component 155) to yield a seamless interior finish for enclosure component 155. This advantageously compares to conventional construction techniques, whether stick-built, SIPs or steel construction, wherein sheets of drywall first must be secured to structural elements, and then the seams between adjacent sheets must be given a smooth transition by applying mortar such as spackling compound followed by sanding. These expensive and laborious steps of interior finishing can be avoided by employing, in accordance with the teachings of this disclosure, a continuous roll of paper to fabricate interior sheathing layer 282. Likewise, there is no need to use for example drywall for finishing.

First Structural Layer (210). A first structural layer 210 is provided in the first embodiment depicted in FIG. 4A and in the second embodiment depicted in FIG. 4B. If used, the interior sheathing layer 282 is bonded to this first structural layer 210 with a suitable adhesive, preferably a polyurethane based construction adhesive. First structural layer 210 in the embodiments shown comprises a plurality of rectangular structural building panels 211 principally comprising an inorganic composition of relatively high strength, such as magnesium oxide (MgO). Suitable structural building panels 211 can be MgO boards approximately four feet (1.22 m) wide by approximately eight feet (2.44 m) long. In a specific implementation of the first embodiment of the multi-layer design of FIG. 4A, the thickness of those structural building panels 211 using magnesium oxide board can be approximately 0.5 inch (1.27 cm); as an alternative, a thickness of approximately 0.25 inch (0.64 cm) can be employed.

To form first structural layer 210, a number of generally rectangular structural building panels 211 are laid adjacent to each other to generally cover the full area of the intended enclosure component 155. For example, for the wall component 200a shown in FIG. 5A, structural building panels 211 are arranged horizontally and vertically adjacent each other in a checkerboard relationship to generally cover the full area of wall component 200a. As another exemplary arrangement, a number of structural building panels 211 of sufficient length can be vertically positioned side-by-side to generally cover the full area of a wall component 200.

Figure 4A:
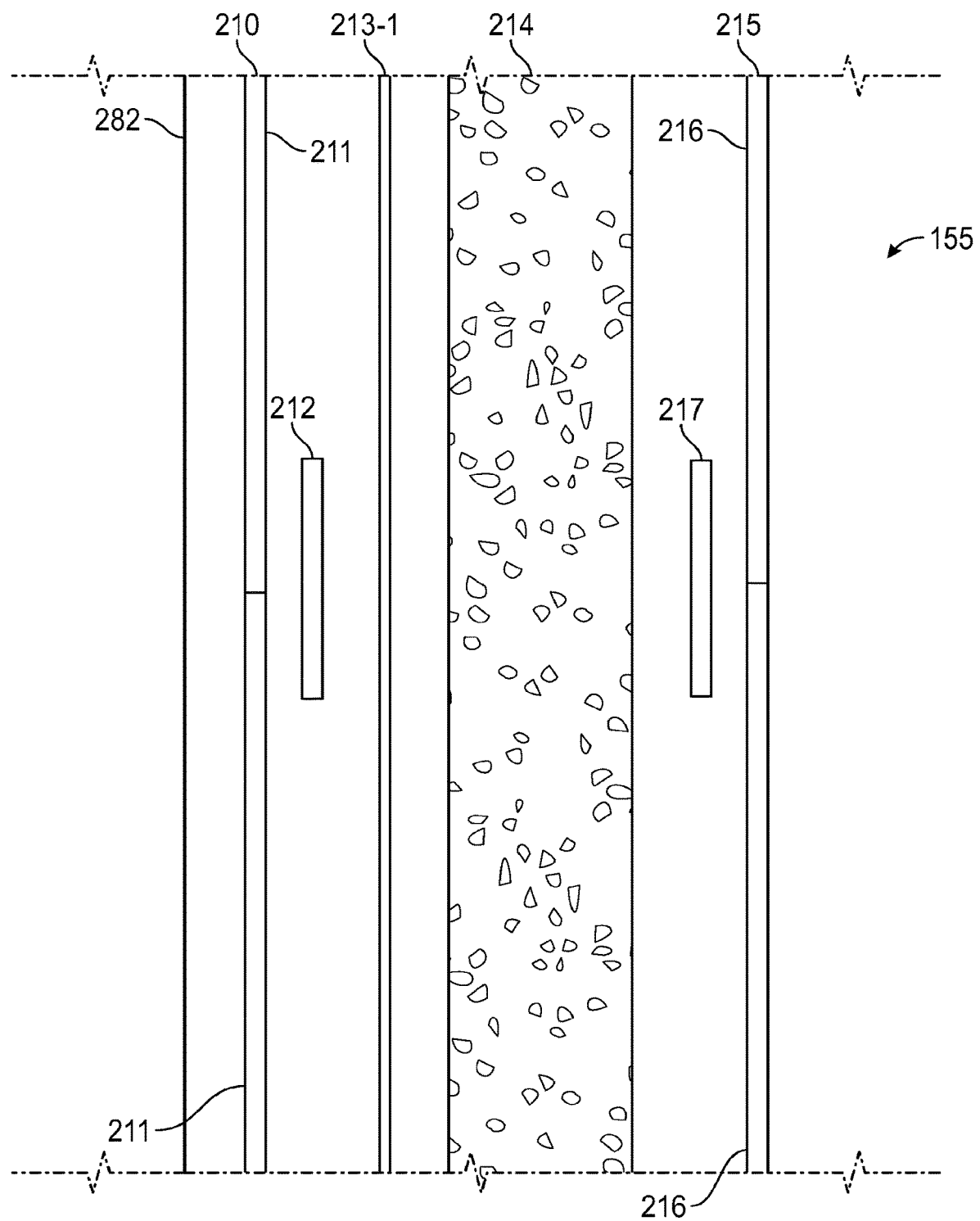
FIGS. 4A, 4B, 4C and 4D are exploded cross-sectional views of four embodiments of laminate multi-layer constructions for use in the enclosure components of the present inventions.
Figure 4B:
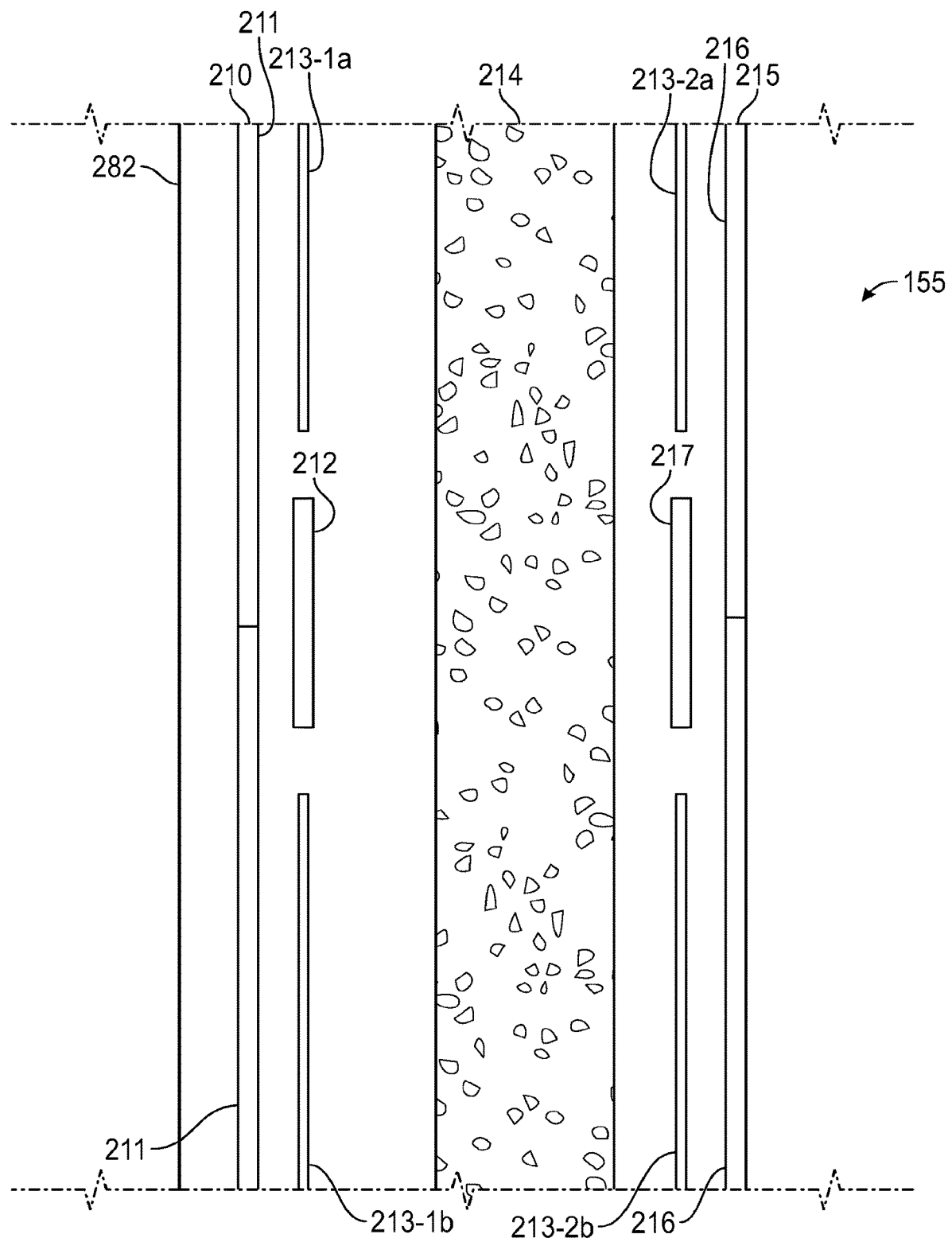

First structural layer 210 in the first and second embodiments, respectively shown in FIGS. 4A and 4B, additionally comprises multiple binding strips 212, made for example of magnesium oxide board, laid both horizontally and/or vertically as appropriate. In particular, binding strips 212 are positioned over the linear junctions between adjacent panels 211, and then are fastened to the regions of those panels bordering those junctions, using for example a suitable adhesive, preferably a polyurethane based construction adhesive, to form a lap joint between the adjacent building panels 211, thereby bonding together the panels 211 of first structural layer 210 to form a single unit. Binding strips 212 of magnesium oxide board can be for example approximately six inches (15.2 cm) wide and 0.25 inch (0.635 cm) or 0.5 inch (1.27 cm) thick.

First Strengthening Layer (213-1). As shown in the first and second embodiments depicted in FIGS. 4A and 4B respectively, there is next provided a first strengthening layer 213-1, made of woven fiber such as woven fiberglass. In the first embodiment, shown in FIG. 4A, first strengthening layer 213-1 preferably is unrolled from a continuous roll of mat (the mat roll optionally having a width approximating the width of enclosure component 155) to yield a seamless interior layer. In the second embodiment, shown in FIG. 4B, first strengthening 213-1 comprises multiple separate fiber layer segments, as exemplified by segments 213-1*a* and 213-1*b* shown in FIG. 4B, which are positioned between binding strips 212.

Foam Panels (214). Referring again to FIGS. 4A and 4B, there is next provided in the first and second embodiments a plurality of generally planar rectangular foam panels 214 collectively presenting a first face and a second opposing face. Foam panels 214 are made for example of expanded polystyrene (EPS) or polyurethane foam. A number of these foam panels 214 are laid adjacent to each other to generally cover the full area of the intended enclosure component 155. For example, for the wall component 200*a* shown in FIG. 5B, foam panels 214 are arranged horizontally and vertically adjacent each other in a checkerboard relationship to generally cover the full area of wall component 200*a*. As another exemplary arrangement, a number of foam panels 214 of sufficient length can be vertically positioned side-by-side to generally cover the full area of a wall component 200.

It is preferred that the seams between adjacent foam panels 214 not overlay or coincide with the seams between the structural building panels 211 of first structural layer 210, in reference to the direction across the thickness of the enclosure component 155. Rather, it is preferred that the seams between adjacent foam panels 214 be offset a distance from the seams between adjacent structural building panels 211 of first structural layer 210. For example, for foam panels 214 vertically positioned side-by-side and structural building panels 211 vertically positioned side-by-side, the seams between adjacent foam panels can be positioned at or as near the mid-line (the middle dividing line) of structural building panels 211 as design, manufacturing and other considerations permit. Correspondingly, for foam panels 214 arranged in a checkerboard relationship and building panels 211 arranged in a checkerboard relationship, each corner where four foam panels 214 meet can be positioned at or as near the center of a structural building panel 211 as design, manufacturing and other considerations permit.

First strengthening layer 213-1 preferably is sandwiched between and fastened to both first structural layer 210 and to the first face of foam panels 214 using a suitable adhesive, preferably a polyurethane based construction adhesive. If the woven fiber of first strengthening layer 213-1 has a relatively open weave, only one adhesive spread is required during manufacture to bond together the layers 210, 213-1 and 214 into a bonded laminate structure.

Foam panels 214 impart both thermal insulation and contribute to resistance of compressive loads imposed on enclosure component 155, such as those that may be borne by a wall from roof and upper floor loads. First strengthening layer 213-1 imparts strength to enclosure component 155, as well as acts as a burst barrier against weather-driven projectiles that would otherwise create a risk of wall penetration. Adjacent foam panels 214 optionally can be fastened to each other with a suitable adhesive applied between abutting panels, preferably a polyurethane based construction adhesive.

Second Strengthening Layer (213-2). In the first embodiment of the laminate multi-layer design shown in FIG. 4A, there is a strengthening layer of woven fiber, first strengthening layer 213-1, on one face of foam panels 214 only. In the second embodiment of the laminate multi-layer design, shown in FIG. 4B, there is a second strengthening layer 213-2, made of woven fiber such as woven fiberglass, on the second opposing face of foam panels 214. Second strengthening layer 213-2 can be continuous, like first strengthening layer 213-1 shown in FIG. 4A, or can comprise multiple separate fiber layer segments, as exemplified by segments 213-2*a* and 213-2*b* shown in FIG. 4B, which are positioned between binding strips 217, described further below.

Second Structural Layer (215). In the first embodiment of the laminate multi-layer design shown in FIG. 4A, there is provided a second structural layer 215, which is positioned on the second opposing face of foam panels 214 (the face distal from first structural layer 210). In the second embodiment of the laminate multi-layer design, shown in FIG. 4B, there is also provided a second structural layer 215, although in this second embodiment the second strengthening layer 213-2 is sandwiched between the second opposing face of foam panels 214 and second structural layer 215. Second structural layer 215 comprises a plurality of rectangular structural building panels 216, each principally comprising an inorganic composition of relatively high strength, such as magnesium oxide. Suitable building panels 216 can be magnesium oxide boards approximately four feet (1.22 m) wide by eight feet (2.44 m) long. In an exemplary embodiment of second structural layer 215, the thickness of those structural building panels 216 using magnesium oxide board can approximately 0.5 inch (1.27 cm) as an alternative, a thickness of approximately 0.25 inch (0.64 cm) can be employed.

To form second structural layer 215, a number of rectangular structural building panels 216 are laid adjacent to each other to generally cover the full area of the intended enclosure component 155. For example, for the wall component 200*a* shown in FIG. 5B, structural building panels 216 are arranged horizontally and vertically adjacent each other in a checkerboard relationship to generally cover the full area of wall component 200*a*. As another exemplary arrangement, a number of structural building panels 216 of sufficient length can be vertically positioned side-by-side to generally cover the full area of a wall component 200.

As is the case for first structural layer 210, it is preferred that the seams between adjacent foam panels 214 not overlay or coincide with the seams between the structural building panels 216 of second structural layer 215 in the direction across the thickness of the enclosure component 155. Rather, it is preferred that the seams between adjacent foam panels 214 be offset a distance from the seams between adjacent structural building panels 216 of second structural layer 215. For example, for foam panels 214 vertically positioned side-by-side and structural building panels 216 vertically positioned side-by-side, the seams between adjacent foam panels 214 can be positioned at or as near the mid-line of structural building panels 216 as design, manufacturing and other considerations permit. Correspondingly, for foam panels 214 arranged in a checkerboard relationship and structural building panels 216 arranged in a checkerboard relationship, each corner where four foam panels 214 meet can be positioned at or as near the center of a structural building panel 216 as design, manufacturing and other considerations permit. On the other hand, the seams between the structural building panels 211 of first structural layer 210 can coincide without preference in the direction across the thickness of the enclosure component 155 with the seams of structural building panels 216 of second structural layer 215.

The second structural layer 215 in the first and second embodiments, shown in FIGS. 4A and 4B respectively, additionally comprises multiple binding strips 217, made for example of magnesium oxide board, positioned between building panels 216 and foam panels 214. Binding strips 217 are positioned over the linear junctions between adjacent panels 216, and then are fastened to the regions of those panels bordering those junctions, using for example a suitable adhesive, preferably a polyurethane based construction adhesive, to form a lap joint between the adjacent building panels 216, thereby bonding together the panels 211 of first structural layer 210 to form a single unit. Binding strips 217 of magnesium oxide board can be for example approximately six inches (15.2 cm) wide and 0.25 inches (0.635 cm) or 0.5 inch (1.27 cm) thick.

If first strengthening layer 213-1 and/or second strengthening layer 213-2 are formed from a continuous roll, then foam panels 214 can be provided with suitable recesses (not shown) to accommodate such local thickness variations of the combination of layer 213-1/binding strips 212 and/or layer 213-2/binding strips 217 as may arise in the regions proximate the binding strips. If first strengthening layer 213-1 and/or second strengthening layer 213-2 are formed from separate segments, then foam panels 214 can be provided with suitable recesses (not shown) to receive binding strips 212 and/or 217.

In the first embodiment shown in FIG. 4A, second structural layer 215 is fastened to foam panels 214 using for example a suitable adhesive, preferably a polyurethane based construction adhesive. In the second embodiment shown in FIG. 4B, second strengthening layer 213-2 preferably is fastened to both second structural layer 215 and to foam panels 214 using for example a suitable adhesive, preferably a polyurethane based construction adhesive. If first strengthening layer 213-2 has a woven fiber having a relatively open weave, only one adhesive spread is required during manufacture to bond together the layers 214, 213-2 and 215 into a bonded laminate structure.

Figure 5A:
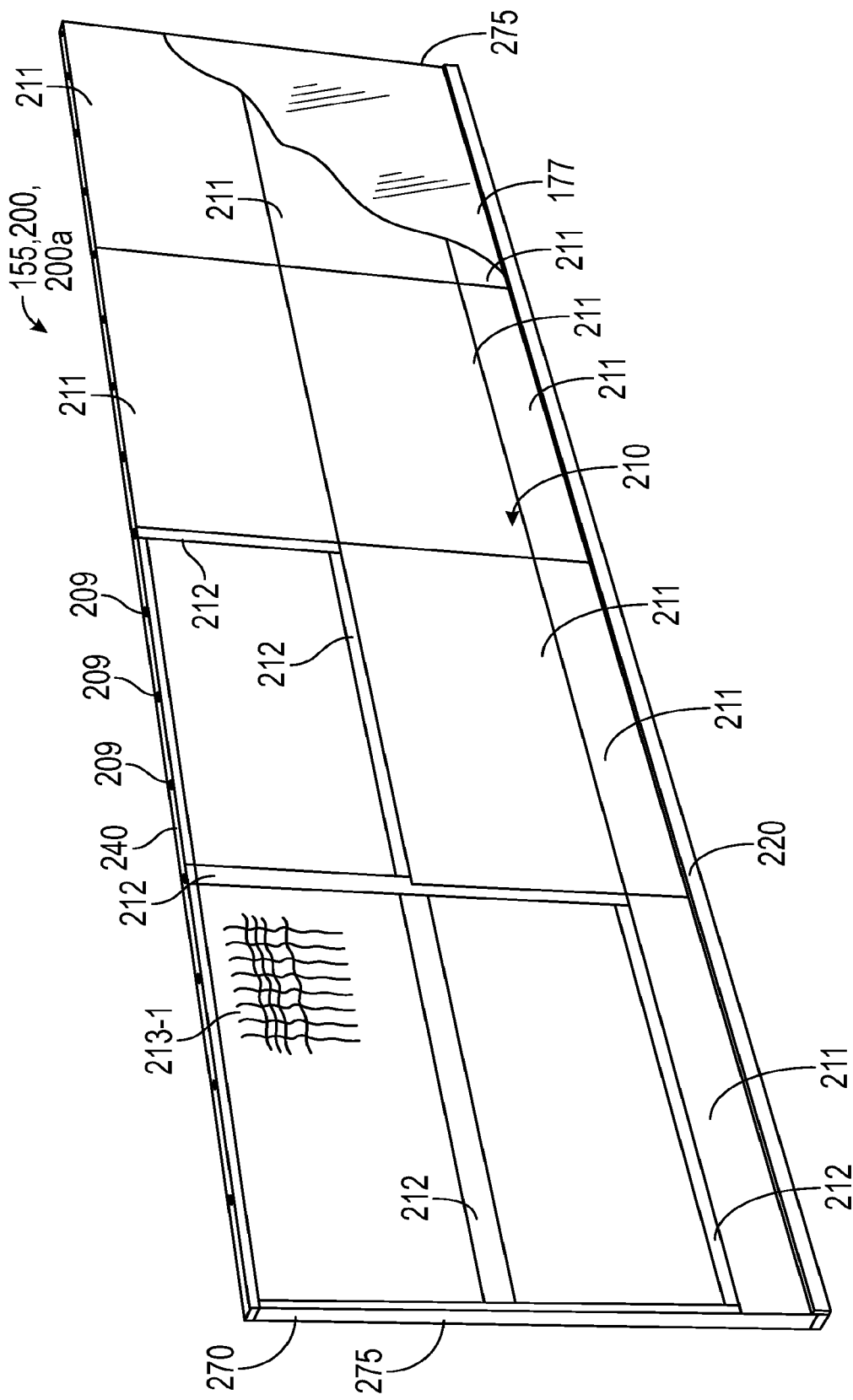
FIG. 5A is a cutaway perspective interior view of a wall component in accordance with the present inventions.
Figure 5B:
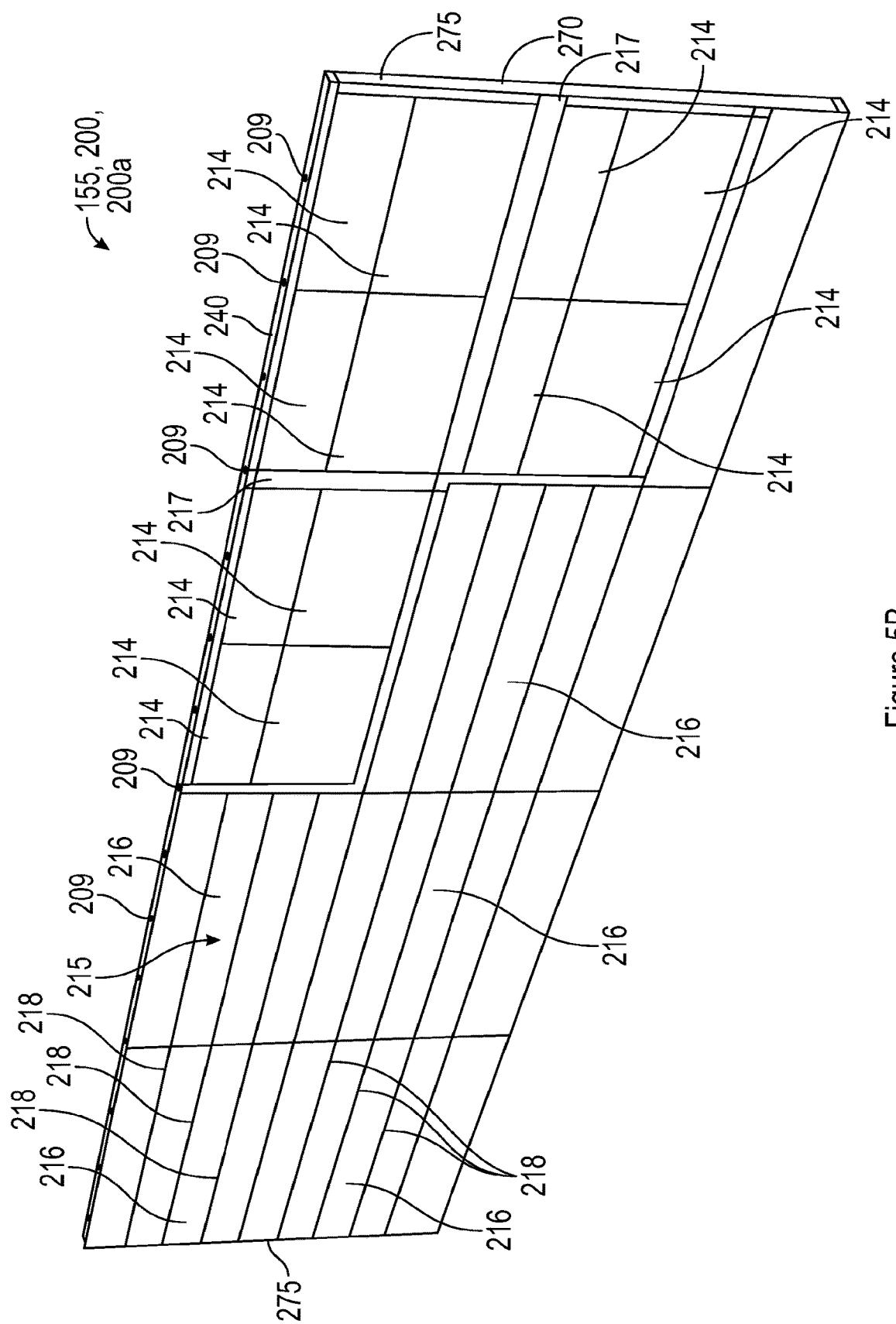
FIG. 5B is a cutaway perspective exterior view of a wall component in accordance with the present inventions.

In the embodiment of wall component 200 shown in FIG. 5B, the exterior of the structural building panels 216 of second structural layer 215 are provided with grooves 218 for aesthetic reasons, particularly to better conceal the presence of the seams between adjacent panels 216. Optionally, the exterior of panels 216 can be covered with additional protective material unrolled from a continuous roll.

The first embodiment of the laminate multi-layer design, shown in FIG. 4A, is particularly suitable where tensile loads (such as may arise from loads inducing flexing or bending) are experienced by the combination of first structural layer 210 and first strengthening layer 213-1, but not experienced to any significant degree by second structural layer 215. The second embodiment of the laminate multi-layer design, shown in FIG. 4B, is particularly suitable where tensile loads may be experienced by both the combination of first structural layer 210 and first strengthening layer 213-1, and also by the combination of second structural layer 215 and second strengthening 213-2. Strengthening layer 213-1 and/or strengthening layer 213-2 can be omitted in the absence of tensile loading in the applicable region. Further, although the interior sheathing layer 282 is shown bonded to first structural layer 210, it can with equal facility be bonded to second structural layer 215, where that structural layer faces the interior, inhabited portion of the structure. Interior sheathing layer 282 can also be omitted where not desired.

Third Embodiment

Figure 4C:
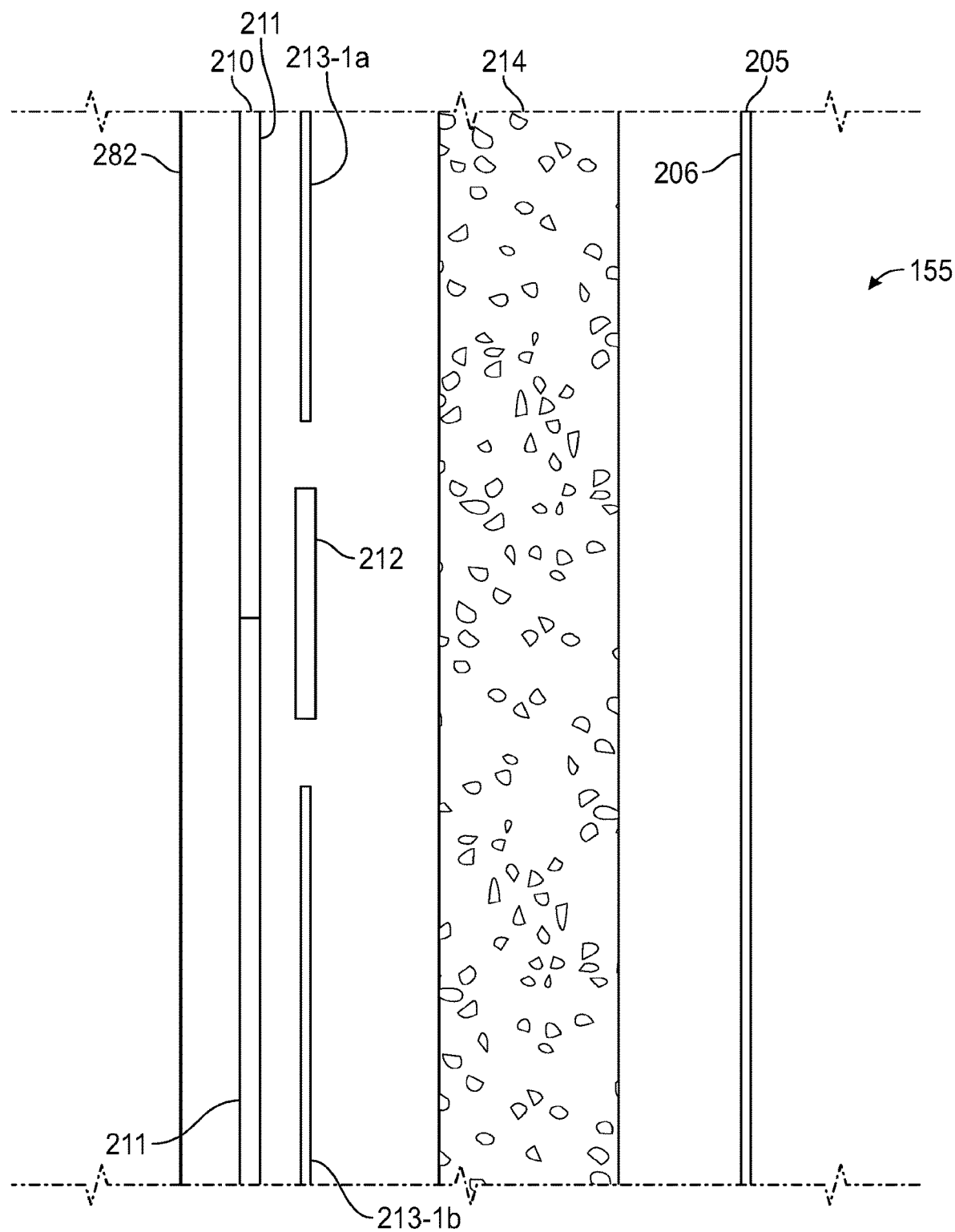

A third embodiment of the laminate multi-layer design is shown in FIG. 4C. As compared to the second embodiment shown in FIG. 4B, the third embodiment of FIG. 4C has a sheet metal layer 205 in lieu of second structural layer 215, but is otherwise identical in design to the second embodiment shown in FIG. 4B. Sheet metal layer 205, which can be steel or aluminum for example, is made from a plurality of generally planar rectangular metal sheets 206 positioned adjacent to each other to generally cover the full area of the intended enclosure component 155, and joined to each other, such as by riveting or welding. Following joining, the joined metal sheets 206 of sheet metal layer 205 are fastened with a suitable adhesive spread to the second opposing face of foam panels 214 (the face of foam panels 214 distal from structural layer 210).

It is preferred that the seams between adjacent foam panels 214 not overlay or coincide with the seams in the joined metal sheets 206 of sheet metal layer 205 in the direction across the thickness of the enclosure component 155. Rather, it is preferred that the seams between adjacent foam panels 214 be offset a distance from the seams in the joined metal sheets 206 of sheet metal layer 205. For example, for foam panels 214 vertically positioned side-by-side and joined metal sheets 206 vertically positioned side-by-side, the seams between adjacent foam panels can be positioned at or as near the mid-line (the middle dividing line) of joined metal sheets 206 as design, manufacturing and other considerations permit.

In this third embodiment, the metal sheets 206 of sheet metal layer 205 can be made of steel, optionally given a protective and/or decorative surface treatment, each having for example a thickness in the range of approximately 26 to 20 gauge (0.0179 inch (0.454 mm) to 0.0478 inch (1.214 mm)). Use of sheet metal layer 205 provides increased tensile strength as compared for example to a second structural layer 215 comprising structural building panels 216, particularly magnesium oxide boards. At the same time, the laminate multi-layer design shown in FIG. 4C exhibits substantial compressive strength in the region of a first structural layer 210 comprising structural building panels 211, particularly magnesium oxide boards.

Fourth Embodiment

Figure 4D:
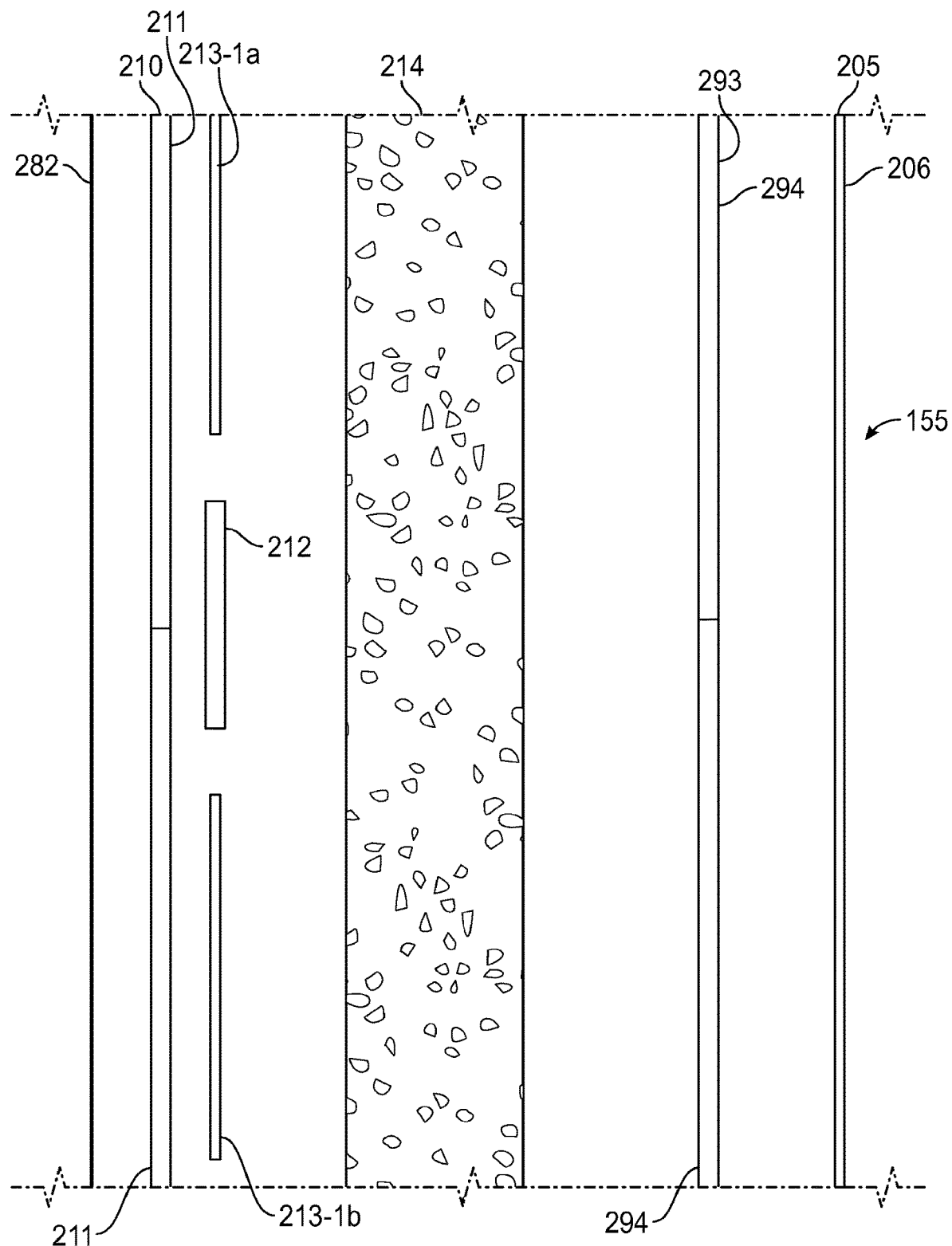

A fourth embodiment of the laminate multi-layer design is shown in FIG. 4D. As compared to the third embodiment shown in FIG. 4C, the fourth embodiment of FIG. 4D includes a protective layer 293 interposed between foam panels 214 and sheet metal layer 205, but is otherwise identical in design to the third embodiment shown in FIG. 4C. Protective layer 293 comprises a plurality of generally rectangular protective panels 294 arranged adjacent to each other to generally cover the full area of the intended enclosure component 155. The protective panels 294 of protective layer 293 can principally comprise a fire-resistant inorganic composition, such as magnesium oxide (MgO) or calcium sulfate dihydrate (also known as drywall and marketed for example under the trademark Sheetrock®). Suitable protective panels 294 for protective layer 293 can be magnesium oxide boards approximately four feet (1.22 m) wide by approximately eight feet (2.44 m) long.

The protective building panels 294 of protective layer 293 are bonded to both foam panels 214 and sheet metal layer 205 with a suitable adhesive spread applied between protective layer 293 and the second opposing face of foam panels 214, and between protective layer 293 and sheet metal layer 205. A suitable thickness for protective building panels 294 of protective layer 293, using magnesium oxide boards, can be 0.125 inch (3.18 mm). A principal function of protective layer 293 in the fourth embodiment of the laminated multi-layer construction shown in FIG. 4D is to impart fire resistance.

Enclosure Component Exterior Edge Reinforcement

The exterior edges defining the perimeter of each enclosure component 155 can be provided with edge reinforcement, as desired. Exterior edge reinforcement can protect foam panel material that would otherwise be exposed at the exterior edges of enclosure components 155. Exterior edge reinforcement can also serve other functions, as described below. Exterior edge reinforcement can be fabricated from one or more of laminated strand lumber board, wooden board, C-channel extruded aluminum or steel, or the like, and is generally secured to the exterior edges of enclosure component 155 with fasteners, such as screw or nail fasteners, and/or adhesive.

Enclosure Component Partitioning

Enclosure components 155 in certain instances are partitioned into enclosure component portions to facilitate forming a compact shipping module 100. In those instances where an enclosure component 155 is partitioned into enclosure component portions, any exterior edge reinforcement on the exterior edges defining the perimeter of the enclosure component is segmented as necessary between or among the portions.

Enclosure Component Interior Edge Reinforcement

An enclosure component 155 partitioned into enclosure component portions will have interior edges. There will be two adjacent interior edges for each adjacent pair of enclosure component portions. Such interior edges can be provided with interior edge reinforcement. Similar to exterior edge reinforcement, such interior edge reinforcement can protect foam panel material that would otherwise be exposed at the interior edges of enclosure components 155. Interior edge reinforcement can also serve other functions, as described below. Interior edge reinforcement can be fabricated from one or more of laminated strand lumber board, wooden board, C-channel extruded aluminum or steel, or the like, and is generally secured to the interior edges of enclosure component 155 with fasteners, such as screw or nail fasteners, and/or adhesive.

Further design details for finished structure 150, wall component 200, floor component 300, and ceiling component 400 are provided in the sections following.

Wall Component (200)

Typically, a finished structure 150 will utilize four wall components 200, with each wall component 200 corresponding to an entire wall of structure 150. Wall component 200 has a generally rectangular perimeter. The height and length of wall components 200 can vary in accordance with design preference, subject to the dimensional restrictions applicable to transport, described above. In this disclosure, where structure 150 is fashioned with two opposing sides longer than the other two sides (as is the case with type 1 structure 151), the two wall components 200 positioned along first and second longitudinal edges 106 and 116 are sometimes referred to as long wall components, with each being denominated 200a, and the two wall components 200 positioned along first and second transverse edges 108 and 110 are sometimes referred to as short wall components, with each being denominated 200b. Where structure 150 is fashioned with all sides of approximately equal length (as is the case with type 2 structure 152), the four wall components 200 are sometimes each denominated 200s. The basic structure and design of wall component 200 is the same for both type 1 structure 151 and type 2 structure 152, and are applicable to structures 150 generally.

Figure 2A:
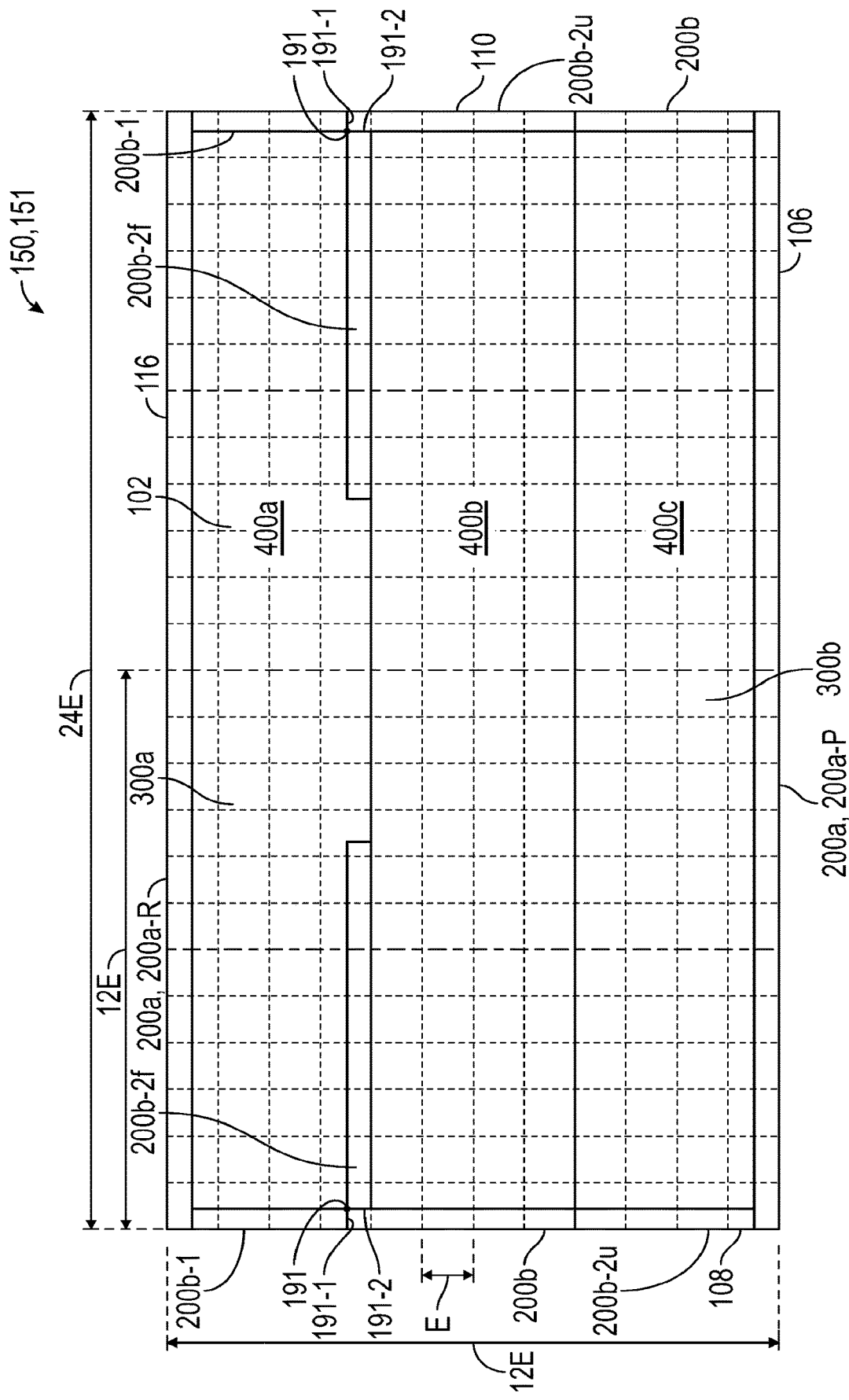

In a particular embodiment of the type 1 structure 151 depicted in FIGS. 1A and 2A, long wall component 200a is approximately thirty-nine feet (11.89 m) in length, and short wall component 200b is approximately 19.5 feet (5.94 m) in length; thus long wall components 200a positioned along first and second longitudinal edges 106 and 116 are approximately twice the length of short wall components 200b positioned along first and second transverse edges 108 and 110. Long wall components 200a and short wall components 200b are approximately 9.5 feet (2.9 m) in height and approximately six inches (15.24 cm) in thickness.

As indicated above, the type 2 structure 152 shown in FIGS. 1B and 2B has wall components 200, 200s of equal length (each denominated 200s)— i.e., type 2 structure 152 generally has a square shape. Thus in the case of type 2 structure 152, the first and second longitudinal edges 106 and 116, and the first and second transverse edges 108 and 110, are all of equal length. In a particular embodiment of the type 2 structure 152 shown in FIGS. 1B and 2B, wall components 200, 200s can be approximately 19 feet (5.79 m) in length, approximately 9.45 feet (2.88 m) in height and approximately six inches (15.24 cm) in thickness.

As indicated above, wall components 200 of the present inventions preferably utilize one of the laminate multi-layer designs described above in reference to FIGS. 4A-4D. For example, long wall component 200a, shown in FIGS. 5A and 5B, can utilize the second embodiment of the laminate multi-layer designs described with reference to FIG. 4B. The particular embodiment of wall component 200s of the type 2 structure 152 shown in FIGS. 1B and 2B referenced above can utilize the second multi-layer design (FIG. 4B) with 0.25 inch (0.635 cm) thick MgO board for structural building panels 211 of first structural layer 210 and also for structural building panels 216 of second structural layer 211, with binding strips 211, 217 of 0.25 inch (0.635 cm) thick MgO board six inches (15.24 cm) wide. The foam panels 214 can be 5.5 inches (13.97 cm) thick, yielding a wall component 200 approximately six inches (15.24 cm) thick.

The perimeter of each wall component 200 is generally provided with exterior edge reinforcement. As exemplified by long wall component 200a shown in FIG. 5A, the exterior edge reinforcement for wall component 200 is a floor plate 220 along the bottom horizontal edge, a ceiling plate 240 along the top horizontal edge and two end pieces 270 respectively fastened at each vertical edge 275 of wall component 200. In the case of a wall component 200, exterior edge reinforcement provides regions for fastening like regions of abutting wall components 200, ceiling component 400 and floor component 300, in addition to in addition to protecting the exterior edges of foam panel material.

The exterior edge reinforcement for wall component 200 provided by floor plate 220, ceiling plate 240, and end pieces 270 can be fabricated from one or more of laminated strand lumber board, wooden board, C-channel extruded aluminum or steel, or the like. Alternatively, appropriate enclosure component perimeter structures of a type disclosed in U.S. Non-Provisional patent application Ser. No. 16/786,202 entitled "Enclosure Component Perimeter Structures," having the same inventors and filed on the same date as the subject application, can be employed in addition to or in substitution for exterior edge reinforcement of the type just described for wall component 200. The contents of that U.S. Non-Provisional patent application Ser. No. 16/786,202 entitled "Enclosure Component Perimeter Structures," having the same inventors and filed on the same date as the subject application, are incorporated by reference as if fully set forth herein, particularly including the enclosure component perimeter structures described for example at paragraphs 110-124 and in FIGS. 10-12 thereof. Notably, those enclosure component perimeter structures can also perform a sealing function, to inhibit water ingress and environmental exposure.

Wall Partitioning

Partitioned Wall Portions of Type 1 Structure (151). Referring to FIG. 2A, the two short wall components 200*b* of type 1 structure 151 each comprises first wall portion 200*b*-1 and second wall portion 200*b*-2. Each of wall portions 200*b*-1 and 200*b*-2 is a generally rectangular planar structure. The interior vertical edge 191-1 of each of wall portions 200*b*-1 is proximate to a respective interior vertical edge 191-2 of wall portion 200*b*-2. Interior edge reinforcement can be provided at any one or more of vertical edges 191-1 and 191-2, examples of which include laminated strand lumber board, wooden board, C-channel extruded aluminum or steel.

Referring again to FIG. 2A, the two first wall portions 200*b*-1 are located at fixed positions, opposite each other on floor portion 300*a*, proximate first and second transverse edges 108, 110 of finished structure 150. Each first wall portion 200*b*-1 is joined to a second wall portion 200*b*-2 with a hinge structure. These hinge structures permit second wall portions 200*b*-2 to pivot about vertical axes 191 between a folded position and an unfolded position. FIG. 2A depicts second portions 200*b*-2 both in their unfolded positions, where they are denominated 200*b*-2*u*, and in their inwardly folded positions, where they are denominated 200*b*-2*f*. When second portions 200*b*-2 are in their folded positions, they facilitate forming a compact shipping module. When second portions 200*b*-2 are in their unfolded positions, with first portions 200*b*-1 they form the short wall components 200*b* of type 1 structure 151 shown in FIG. 2A.

Partitioned Wall Portions of Type 2 Structure (152). Referring to FIG. 2B, type 2 structure 152 has two opposing wall components 200*s*, where one of the opposing wall components 200*s* comprises first wall portion 200*s*-1, second wall portion 200*s*-2 and third wall portion 200*s*-3, and the other of the opposing wall components 200*s* comprises fourth wall portion 200*s*-4 and fifth wall portion 200*s*-5. Each of wall portions 200*s*-1, 200*s*-2, 200*s*-3, 200*s*-4 and 200*s*-5 has a generally rectangular planar structure. As shown in FIG. 2B, the interior vertical edge 192-1 of wall portion 200*s*-1 is proximate to a respective interior vertical edge 192-2 of wall portion 200*s*-2, and the interior vertical edge 193-2 of wall portion 200*s*-2 is proximate a respective interior vertical wall edge 193-3 of wall portion 200*s*-3. Also as shown in FIG. 2B, the interior vertical edge 194-4 of wall portion 200*s*-4 is proximate to a respective interior vertical edge 194-5 of wall portion 200*s*-5. Interior edge reinforcement can be provided at any one or more of vertical edges 192-1, 192-2, 193-2, 193-3, 194-4 and 194-5, examples of which include laminated strand lumber board, wooden board, C-channel extruded aluminum or steel.

Referring again to FIG. 2B, first wall portion 200*s*-1 is fixed in position on floor portion 300*a* proximate to first transverse edge 108, and fourth wall portion 200*s*-4 is fixed in position on floor portion 300*a*, opposite first wall portion 200*s*-1 and proximate to second transverse edge 110. First wall portion 200*s*-1 is joined to second wall portion 200*s*-2 with a hinge structure that permits wall portion 200*s*-2 to pivot about vertical axis 192 between a folded position and an unfolded position. Further, second wall portion 200*s*-2 is joined to third wall portion 200*s*-3 with a hinge structure to permit third wall portion 200*s*-3 to pivot about vertical axis 193 between a folded position and an unfolded position. For the opposing wall, fourth wall portion 200*s*-4 is joined to fifth wall portion 200*s*-5 with a hinge structure that permits first wall portion 200*s*-5 to pivot about vertical axis 194 between a folded position and an unfolded position. Notably, fifth wall portion 200*s*-5 is longer than either second wall portion 200*s*-2 or third wall portion 200*s*-3.

FIG. 2B depicts second wall portion 200*s*-2 and third wall portion 200*s*-3 both in their unfolded positions, where they are denominated by 200*s*-2*u* and 200*s*3-*u* respectively, and depicts fifth wall portion 200*s*-5 in its unfolded position, where it is denominated 200*s*-5*u*. FIG. 2B also depicts second wall portion 200*s*-2 and third wall portion 200*s*-3 both in their inwardly folded positions, where they are denominated by 200*s*-2*f* and 200*s*3-*f* respectively, and depicts fifth wall portion 200*s*-5 in its inwardly folded position, where it is denominated 200*s*-5*f*. When second wall portion 200*s*-2, third wall portion 200*s*-3 and fifth wall portion 200*s*-5 are in their inwardly folded positions, they facilitate forming a compact shipping module. When second wall portion 200*s*-2 and third wall portion 200*s*-3 are in their unfolded positions, with first wall portion 200*s*-1 they form the wall component 200*s* proximate first transverse edge 108. When fifth wall portion 200*s*-5 is in its unfolded position, with fourth wall portion 200*s*-4 they form the wall component 200*s* proximate second transverse edge 110.

The hinge structures described above (for securing each first wall portion 200*b*-1 to its second wall portion 200*b*-2, first wall portion 200*s*-1 to second wall portion 200*s*-2, second wall portion 200*s*-2 to third wall portion 200*s*-3, and fourth wall portion 200*s*-4 to fifth wall portion 200*s*-5), can be surface mounted or recessed, and of a temporary or permanent nature. The provision of interior edge reinforcement, as described above, can provide a region for securing hinge structures. Suitable hinge structures can be fabricated for example of metal, plastic, leather, ferrous or non-ferrous material. Alternatively, suitable hinge structures are disclosed in U.S. Non-Provisional patent application Ser. No. 16/786,202 entitled "Enclosure Component Perimeter Structures," having the same inventors and filed on the same date as the subject application. The contents of that U.S. Non-Provisional patent application Ser. No. 16/786,202 entitled "Enclosure Component Perimeter Structures," having the same inventors and filed on the same date as the subject application, are incorporated by reference as if fully set forth herein, particularly including the hinge structure described for example at paragraphs 147-157 and depicted in FIG. 15 thereof. These hinge structures can be utilized in addition to or in lieu of interior edge reinforcement, as described above, and can also perform a sealing function, to inhibit water ingress and environmental exposure.

Non-Partitioned Wall Components of Type 1 Structure (151). As compared to the two short wall components 200*b* of type 1 structure 151, which are each partitioned into two portions, the two long wall components 200*a* shown in FIG. 2A do not comprise plural wall portions, but rather each is a single piece structure. However, one of these long wall components 200a, which is located on floor portion 300b proximate to first longitudinal edge 106, and which is sometimes denominated as (long) wall component 200a-P in this disclosure, is pivotally secured to floor portion 300b to permit wall component 200a-P to pivot about horizontal axis 105 shown in FIG. 3A from a folded position to an unfolded position. Pivotally securing long wall component 200a-P also facilitates forming a compact shipping module 100. The remaining long wall component 200a, sometimes denominated 200a-R in this disclosure, is rigidly secured on floor portion 300a proximate second longitudinal edge 116 and abutting the vertical edges of the two first wall portions 200b-1 proximate second longitudinal edge 116, as shown in FIG. 2A.

Non-Partitioned Wall Components of Type 2 Structure (152). As compared to the two wall components 200s of type 2 structure 152, which are each partitioned into portions, the remaining two wall components 200s shown in FIG. 2B do not comprise plural wall portions, but rather are single piece structures. However, one of these wall components 200s, which is sometimes denominated 200s-P in this disclosure, and which is located on floor portion 300b proximate to first longitudinal edge 106, is pivotally secured to floor portion 300b to permit wall component 200s-P to pivot about horizontal axis 105 shown in FIG. 3B from a folded position to an unfolded position. Pivotally securing wall component 200s-P also facilitates forming a compact shipping module 100. The remaining wall component 200s, sometimes denominated 200s-R in this disclosure, is rigidly secured on floor portion 300a proximate second longitudinal edge 116 and abutting the vertical edges of first wall portion 200s-1 and fourth wall portion 200s-4 proximate to second longitudinal edge 116, as shown in FIG. 2B.

The hinge structures described above, for securing wall component 200a-P to floor portion 300b, and for securing wall component 200s-P to floor portion 300b, can be surface mounted or recessed, and of a temporary or permanent nature. The provision of exterior edge reinforcement, as described above, can provide a region for securing hinge structures. Suitable hinge structures can be fabricated for example of metal, plastic, leather, ferrous or non-ferrous material. Alternatively, suitable hinge structures are disclosed in U.S. Non-Provisional patent application Ser. No. 16/786,202 entitled "Enclosure Component Perimeter Structures," having the same inventors and filed on the same date as the subject application (with the utilized hinge structure altered as may be appropriate, given the 90 degree (90°) junction between floor component 300b and wall component 200a-P/200s-P when either of the latter is in an unfolded position). The contents of that U.S. Non-Provisional patent application Ser. No. 16/786,202 entitled "Enclosure Component Perimeter Structures," having the same inventors and filed on the same date as the subject application, are incorporated by reference as if fully set forth herein, particularly including the hinge structures described for example at paragraphs 125-157 and depicted in FIGS. 13A-15 thereof. These hinge structures can be utilized in addition to or in lieu of exterior edge reinforcement, as described above, and can also perform a sealing function, to inhibit water ingress and environmental exposure.

Wall Chases

Where wall component 200 utilizes one of the multilaminate designs described with respect to FIGS. 4A-4C, the foam panels 214 can be provided with a series of elongate, generally parallel, approximately vertically-oriented cylindrical passageways, spaced apart at regular intervals across the entire distance between end pieces 270, with each spanning the distance between floor plate 220 and ceiling plate 240. These vertical passageways are denominated wall chases 219 and can be seen in FIG. 6A in wall components 200a, 200b for a type 1 structure 151, and in FIGS. 5C and 7A for a wall component 200s for a type 2 structure 152. Wall chases 219 facilitate the installation of utility lines (such as for electrical power, lighting control, heating, ventilation, and air conditioning (HVAC), HVAC control, security systems, including energizing and communicating with smoke or heat sensors, etc.), in wall component 200. In the embodiment shown in FIG. 5C, wall chases 219 are spaced apart for example at uniform intervals of approximately twenty-nine inches (73.7 cm).

Figure 5C:
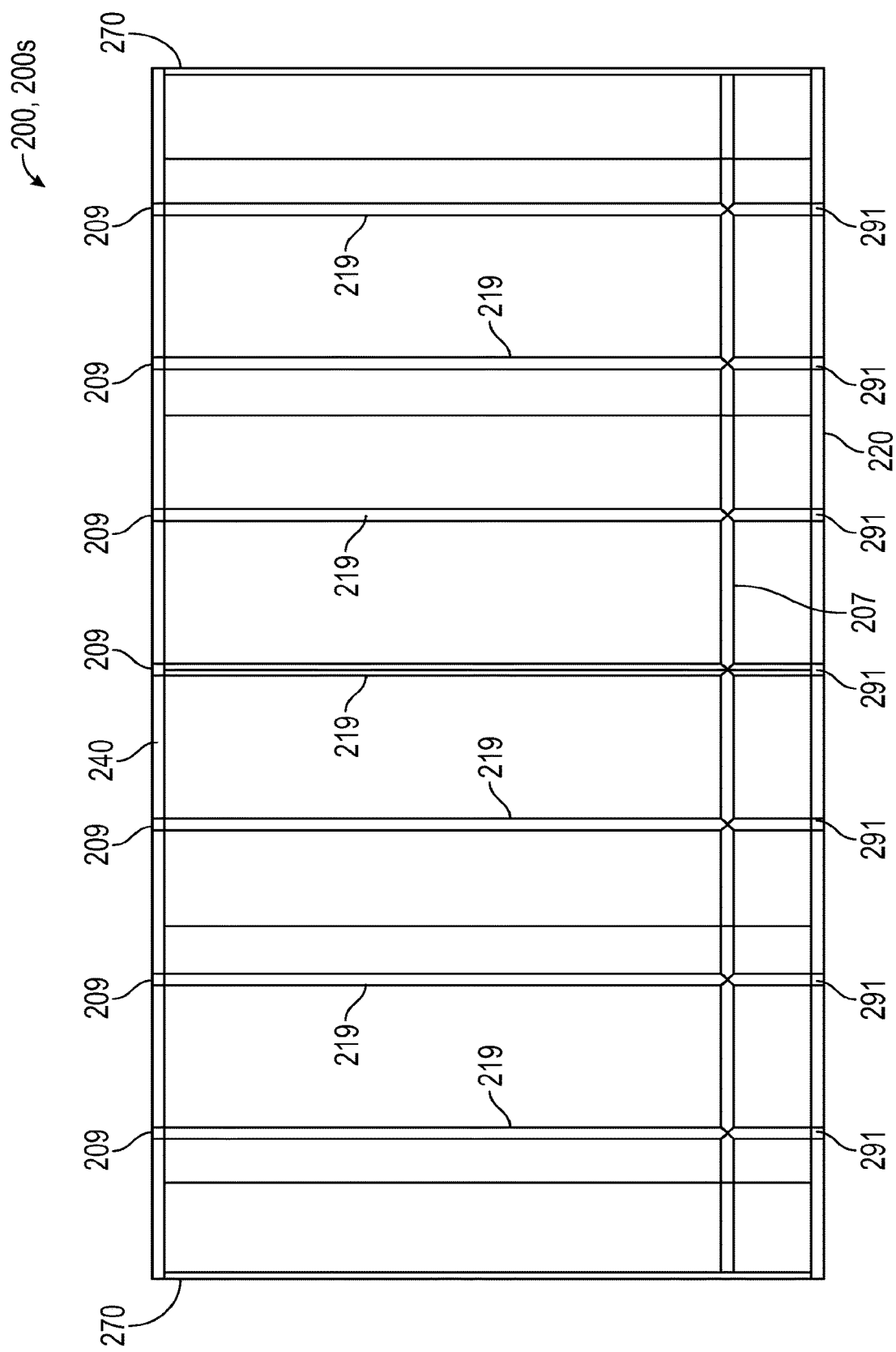
FIG. 5C is a cutaway view of a wall component depicting an arrangement of wall chases in accordance with the present inventions.

There optionally can be provided a horizontal passageway located above floor plate 220 and intersecting wall chases 219, as show in FIG. 5C. The purpose of this horizontal passageway, denominated connecting wall chase 207, is to facilitate wiring across wall component 200. Connecting wall chase 207 can be located for example approximately 16 inches (40.64 cm) above floor plate 220. Although only one horizontal connecting wall chase 207 is shown, one or more additional such wall chases 207 can be provided in wall component 200, for example at a height suitable for wall switches, to facilitate installation and connection of such wall switches. As appropriate, segments of connecting wall chase 207 running across plural wall portions are aligned to communicate with each other when such portions are deployed.

The vertical and horizontal passageways in foam panels 214 defining wall chases 207 and 219 preferably are formed prior to assembly of foam panels 214 into the laminate multi-layer structure of wall component 200. These passages can be formed for example by use of a hot wire positioned over a select foam panel 214 and oriented parallel along its length to a surface of the panel 214. The hot wire is then displaced into the panel foam 214 below the surface of the panel. Once an appropriate depth is reached, the axis of the hot wire is directed in a circular path, so that the length of the wire traces within the foam of the panel 214 a cylindrical shape, which results in forming a foam plug severed from the bulk foam. Removal of the foam plug yields the desired passageway defining a wall chase 219 or a connecting wall chase 207. Each chase 207, 219 preferably is provided with a diameter sufficient to permit the installation of utility lines; for example, approximately one to two inches (2.54 to 5.08 cm) in diameter.

Ceiling plate 240 is provided with a plurality of spaced apart cylindrical through-holes 209, shown in FIGS. 5A, 5B and 5C, which align with wall chases 219 to allow communication between the region above ceiling plate 240 and wall chases 219. Likewise, floor plate 220 is provided with a plurality of spaced-apart cylindrical through-holes 291, shown in FIG. 5C, which align with wall chases 219 to allow communication between the region below floor plate 220 and wall chases 219. In the event that wall component 200 is provided with enclosure component perimeter structures, of a type described in U.S. Non-Provisional patent application Ser. No. 16/786,202 entitled "Enclosure Component Perimeter Structures," having the same inventors and filed on the same date as the subject application, either bonded over or in place of either or both of floor plate 220 and ceiling plate 240, then those structures can be provided with suitable apertures at comparable locations to through-holes 209 and 291 to permit communication to the wall chases 219.

Wall chases 219 communicate with a utility service system 460 located in ceiling component 400, as described below.

Wall Customization Options

FIGS. 1A and 2A depicts wall components 200 having plural apertures, specifically door apertures 202, for receiving door frame and door assemblies, and window apertures 204, for receiving window frame and window assemblies. A feature of the present inventions is that the multi-laminate construction of wall component 200 lends itself to a high degree of customization in terms of type, size and location of doors, windows and the like, while the number of apertures 202, 204 can be varied in accordance with design preference.

For example, once erected at the intended location for the structure, the builder can cut door and window apertures 202, 204 in wall components 200 (as shown in FIG. 1A), in accordance with the purchaser's design choices. Window and door assemblies of any number, size and shape can thus be placed virtually anywhere, limited only by retaining enough wall laminate to insure the structural integrity of wall component 200 in the face of such vertical and shear loads as may arise from normal use and during transient events (such as storms and seismic activity). The monocoque laminate multi-layer structure of wall component 200 supports loads across its length and thus confers a great degree of design freedom, and without the need for adding on-site any load-distributing lintels or headers.

After apertures are cut to the appropriate size and shape, window assemblies and door assemblies can then be inserted and secured to wall component 200 with adhesive or by other suitable means. A wide variety of window and door assemblies are commercially available and suitable for use with the present inventions. As a non-limiting example, a door assembly can include all components for mounting the door and rendering it operative, such as two side jambs, a head jamb and a sill, together with a door hinged to one of the side jambs. Likewise as a non-limiting example, a window assembly can include all components for mounting the window and rendering it operative, such as a sill, side jambs, head jambs, window frames and glass, sash pulleys and the like.

Ceiling Component (400)

Figure 6A:
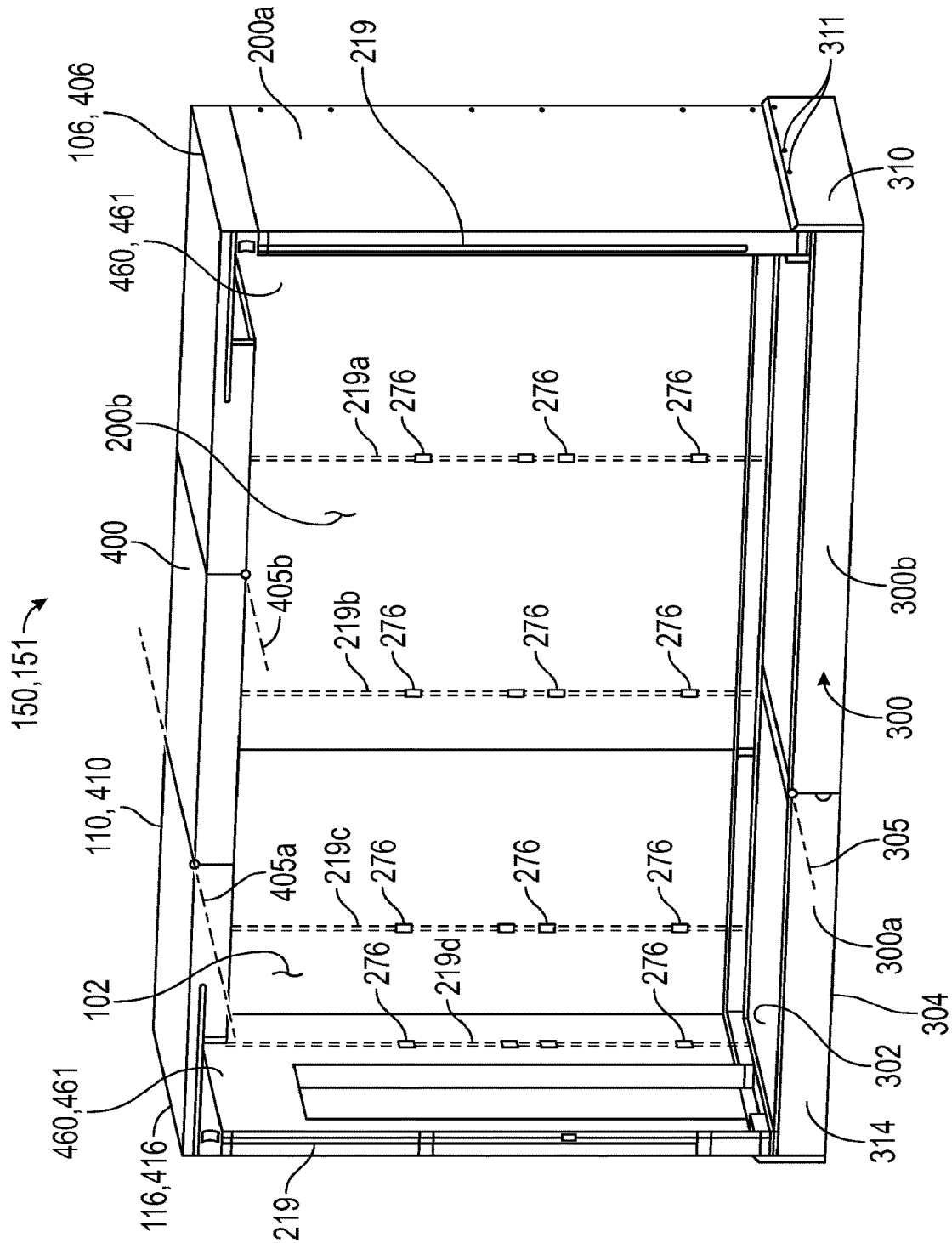
FIGS. 6A and 6B are partial cutaway perspective views of a finished structure in accordance with the present inventions, depicting in greater detail aspects of the ceiling, wall and floor components of a first type of structure in accordance with the present inventions.
Figure 6B:
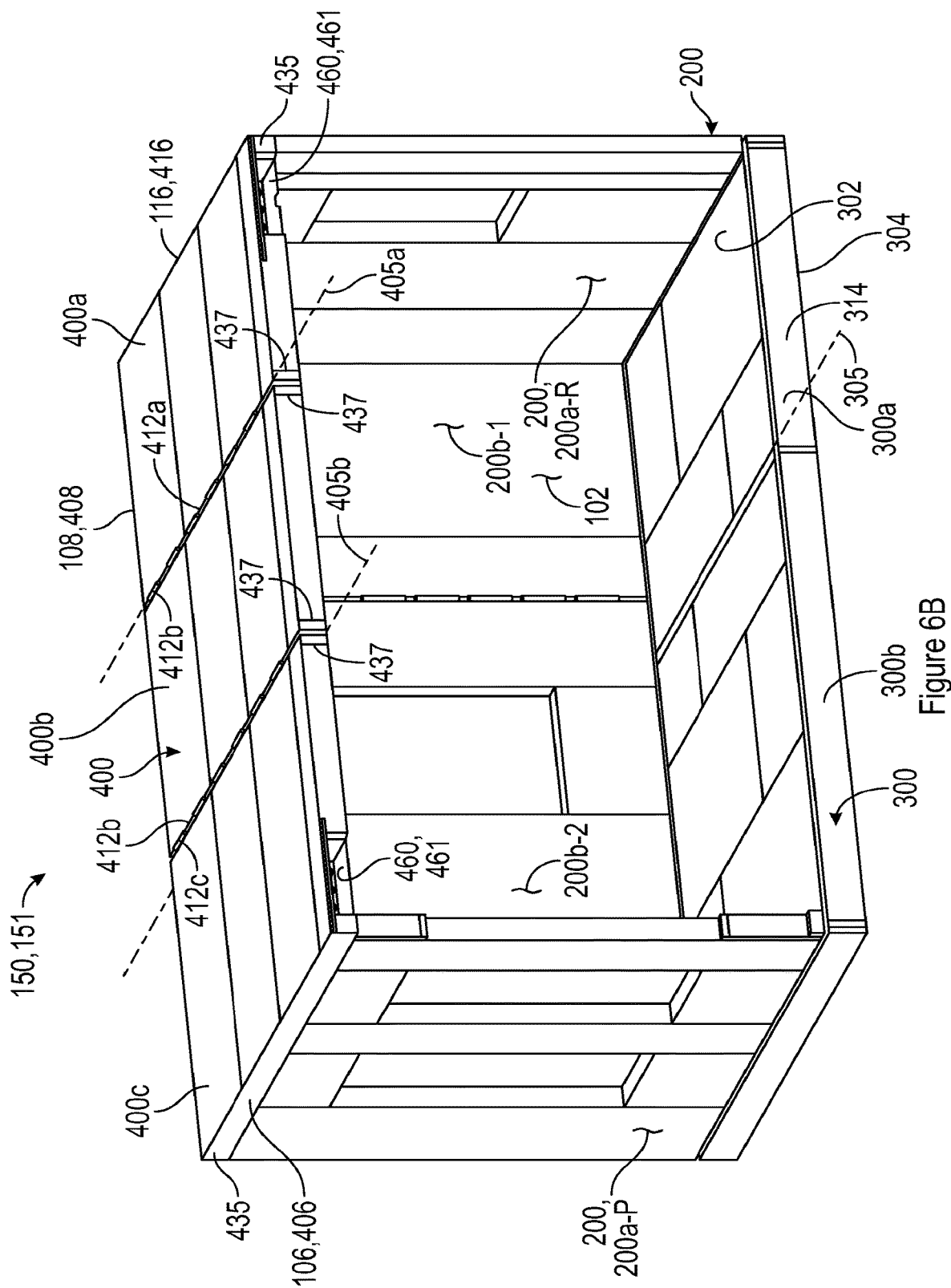
Figure 6D:
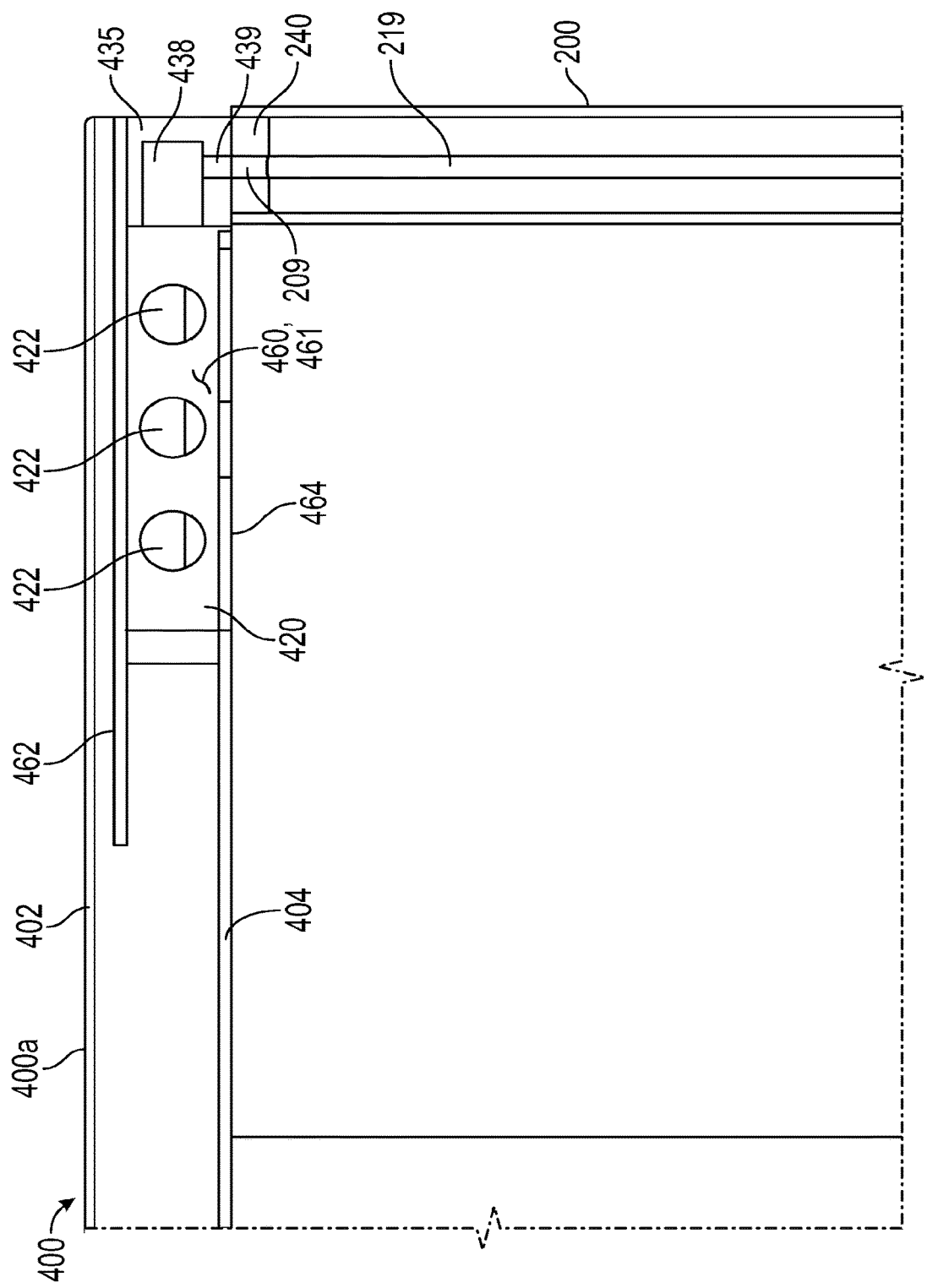

Typically, a finished structure 150 will utilize one ceiling component 400; thus ceiling component 400 generally is the full ceiling of finished structure 150. Ceiling component 400 has a generally rectangular perimeter. Among others, FIGS. 6A-7B depict ceiling component 400 in accordance with the present inventions. The perimeter of ceiling component 400 is defined by first longitudinal ceiling edge 406, first transverse ceiling edge 408, second longitudinal ceiling edge 416 and second transverse ceiling edge 410. In particular, (a) first longitudinal ceiling edge 406, (b) first transverse ceiling edge 408, (c) second longitudinal ceiling edge 416 and (d) second transverse ceiling edge 410 of ceiling component 400 generally coincide with (i.e., overlie) (w) first longitudinal edge 106, (x) first transverse edge 108, (y) second longitudinal edge 116 and (z) second transverse edge 110, respectively, of finished structure 150. FIGS. 6A and 6B depict the ceiling component 400 of a type 1 structure 151, and FIGS. 7A and 7B depict the ceiling component 400 of a type 2 structure 152. The basic structure and design of ceiling component 400 is the same for both type 1 structure 151 and type 2 structure 152, and are applicable to structures 150 generally, and is generally applicable to ceiling components 400 of structures 150 fabricated in accordance with this disclosure.

The length and width of ceiling component 400 can vary in accordance with design preference. In a particular embodiment of the type 1 structure 151 depicted in FIGS. 1A and 2A, ceiling component 400 (the dimension along first and second longitudinal edges 106, 116) is approximately thirty-nine feet (11.89 m) in length (the dimension along first and second longitudinal ceiling edges 406, 416) and approximately 19.5 feet (5.94 m) in width (the dimension along first and second transverse ceiling edges 408, 410). In a particular embodiment of the type 2 structure 152 depicted in FIGS. 1B and 2B, ceiling component 400 is approximately 19 feet (5.79 m) square.

It is preferred that ceiling component 400 utilize one of the multi-laminate designs described above in regard to FIGS. 4A-4D, as described below.

The perimeter of ceiling component 400 is generally provided with exterior edge reinforcement. As exterior edge reinforcement for the embodiments of ceiling component 400 shown for a type 1 structure 151 in FIG. 6B and for a type 2 structure 152 in FIG. 7A, a first shoulder beam 435 is positioned at the first longitudinal ceiling edge 406 of ceiling component 400, a second shoulder beam 435 (visible edge-on in FIG. 7B) is positioned at the second transverse ceiling edge 408 of ceiling component 400, a third shoulder beam 435 (visible edge-on in FIG. 7B) is positioned at the first transverse exterior ceiling edge 410 of ceiling component 400, and a fourth shoulder beam 435 is positioned at the second longitudinal ceiling edge 416 of ceiling component 400 (see FIG. 6B). In the case floor component 400, in addition to protecting the exterior edges of foam panel material, the exterior edge reinforcement provided by shoulder beams 435 assists in resisting vertical loads and transferring such loads to lower floors through underlying wall components 200 supporting ceiling component 400, and then to the foundation of the finished structure 150. Such exterior edge reinforcement can also provide a region for fastening like regions of abutting enclosure components 155 (underlying and any overlying).

The exterior edge reinforcement provided by shoulder beams 435 of ceiling component 400 can be fabricated from one or more of laminated strand lumber board, wooden board, C-channel extruded aluminum or steel, or the like. Alternatively, appropriate enclosure component perimeter structures of a type disclosed in U.S. Non-Provisional patent application Ser. No. 16/786,202 entitled "Enclosure Component Perimeter Structures," having the same inventors and filed on the same date as the subject application, can be employed in addition to or in substitution for exterior edge reinforcement of the type just described for ceiling component 400. The contents of that U.S. Non-Provisional patent application Ser. No. 16/786,202 entitled "Enclosure Component Perimeter Structures," having the same inventors and filed on the same date as the subject application, are incorporated by reference as if fully set forth herein, particularly including the enclosure component perimeter structures described for example at paragraphs 110-124 and in FIGS. 10-12 thereof. Notably, those enclosure component perimeter structures can also perform a sealing function, to inhibit water ingress and environmental exposure.

Ceiling Partitioning

The type 1 structure 151 and the type 2 structure 152 each includes ceiling portions 400a, 400b and 400c. Each of the ceiling portions 400a, 400b and 400c is a planar generally rectangular structure, with ceiling portion 400a adjoining ceiling portion 400b, and ceiling portion 400b adjoining ceiling portion 400c as exemplified by FIGS. 6A and 6B.

Ceiling Portion 400*c*. Ceiling portion 400*c* is generally exemplary of the construction of all ceiling portions 400*a*, 400*b* and 400*c*. Referring to the segment of ceiling portion 400*c* depicted in FIG. 6C, ceiling portion 400*c* utilizes a laminated multi-layer design according to the first embodiment thereof (depicted in FIG. 4A) or the second embodiment thereof (depicted in FIG. 4B). As relevant here, ceiling portion 400*c* includes a first structural layer 210 of structural building panels 211, denominated ceiling bottom surface 404, and a second structural layer 215 of structural building panels 216, denominated ceiling top surface 402. Between ceiling surfaces 402 and 404 there are foam panels 214, denominated ceiling foam panels 414. Interior edge 412*c* of ceiling component 400*c* abuts a first interior edge 412*b* of ceiling component 400*b*, as shown in FIGS. 6B and 7A. For interior edge reinforcement, a reinforcing board 437 is positioned adjacent interior edge 412*c*.

Ceiling Portion 400*a*. Ceiling portion 400*a* is shown for example in FIGS. 6B, 6D and 7A. It is a mirror image in design and construction of ceiling portion 400*c*. Interior edge 412*a* of ceiling portion 400*a* abuts a second interior edge 412*b* of ceiling portion 400*b*, as shown in FIGS. 6B and 7A. For interior edge reinforcement, a reinforcing board 437 is positioned adjacent interior edge 412*a*.

Ceiling Portion 400*b*. Ceiling portion 400*b* shown in FIGS. 6B and 7A is the same in general design and construction as ceiling portions 400*a* and 400*c*. First interior edge 412*b* of ceiling component 400*b* abuts interior edge 412*c* of ceiling component 400*c*, and second interior edge 412*b* of ceiling component 400*b* abuts interior edge 412*a* of ceiling portion 400*a*. For interior edge reinforcement, a reinforcing board 437 is positioned adjacent first interior edge 412*b* of ceiling portion 400*b*, and a reinforcing board 437 is positioned adjacent second interior edge 412*b* of ceiling portion 400*b*.

Ceiling component 400 and its constituent elements are generally dimensioned in thickness and otherwise to accommodate the particular loads to which ceiling component 400 may be subject. A particular embodiment of ceiling component 400 in the type 2 structure 152 shown for example in FIGS. 7A and 7B can utilize the second multi-layer design embodiment (see FIG. 4B) with 0.25 inch (0.635 cm) thick MgO board for structural building panels 211 of first structural layer 210/ceiling bottom surface 404 and also for structural building panels 216 of second structural layer 211/ceiling top surface 402, and with binding strips of 0.25 inch (0.635 cm) thick MgO board six inches (15.24 cm) wide. The foam panels 214/ceiling foam panels 414 can be 7.9 inches (20.07 cm) thick, yielding a roof component 400 approximately 8.4 inches (21.34 cm) thick. Additional structural members, such as joists 420 (a portion of a joist 420 is visible in FIG. 6D), can be utilized as is appropriate to the specific design of structure 150 to assist in the transfer of vertical loads to one or more shoulder beams 435.

Referring to the type 1 structure 151 shown in FIG. 6B, ceiling portion 400*a* is fixed in position relative to first portions 200*b*-1 of short wall components 200*b* and relative to long wall component 200*a*-R, and is joined with hinge structures along longitudinal interior edge 412*a* to the abutting longitudinal interior edge 412*b* of ceiling portion 400*b*. Such hinge structures are adapted to permit ceiling portion 400*b* to pivot through up to one hundred and eighty degrees (180°) of arc about a horizontal axis 405*a*, located proximate the top of ceiling component 400, between a folded position, where ceiling portion 400*b* lies flat against ceiling portion 400*a*, and the fully unfolded position shown in FIG. 6B.

In turn, ceiling portion 400*b* is joined with hinge structures to ceiling portion 400*c* at the longitudinal interior edge 412*b* of ceiling portion 400*b* abutting the longitudinal interior edge 412*c* of ceiling portion 400*c*. Such hinge structures are adapted to permit ceiling portion 400*c* to pivot through up to one hundred and eighty degrees (180°) of arc about a horizontal axis, located proximate the bottom of ceiling component 400, between a folded position, where ceiling portion 400*c* lies flat against ceiling portion 400*b* (when ceiling portion 400*b* is positioned to lie flat against ceiling portion 400*a*), and the fully unfolded position shown in FIG. 6B.

Likewise referring to the type 2 structure 152 shown in FIG. 7A, ceiling portion 400*a* is fixed in position relative to first wall portion 200*s*-1, fourth wall portion 200*s*-4 and wall component 200*s*-R. Ceiling portions 400*a*, 400*b* and 400*c* for type 2 structure 152 are joined with hinge structures in the same manner as described above in connection with type 1 structure 151.

The hinge structures joining ceiling portions 400*a*, 400*b* and 400*c* can be surface mounted or recessed, and of a temporary or permanent nature. Suitable hinge structures can be fabricated for example of metal, plastic, leather, ferrous or non-ferrous material. The interior edge reinforcement provided by reinforcing boards 437 of ceiling portions 400*a*, 400*b* and 400*c* provides structure for mounting hinge structures, in addition to protecting the edges of foam panel material. Reinforcing boards 437 can be fabricated for example from one or more of laminated strand lumber board, wooden board, C-channel extruded aluminum or steel, or the like.

Figure 9:
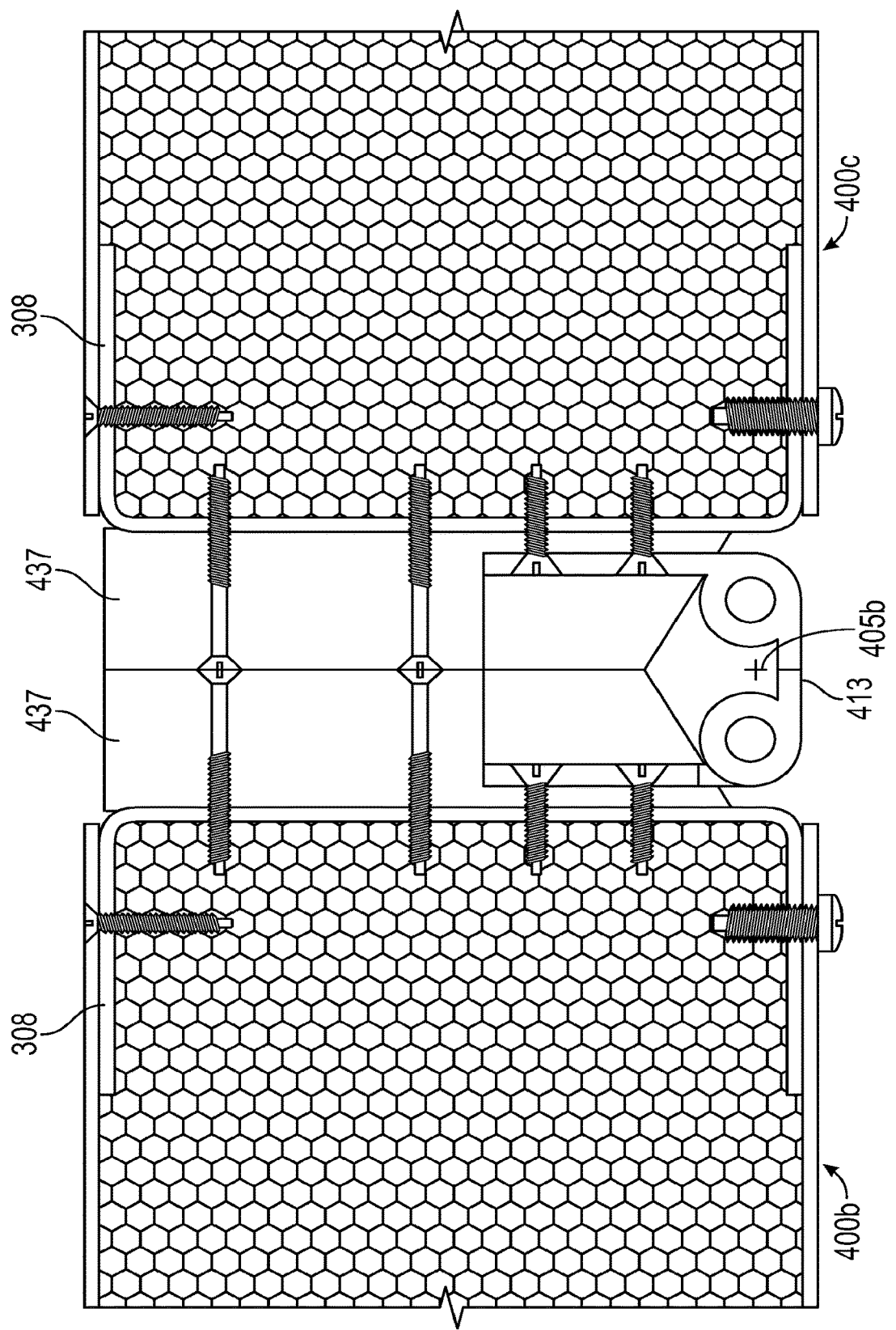
FIG. 9 is a schematic side view of an embodiment of a hinge structure joining two roof portions in accordance with the present inventions.

A suitable hinge structure and its associated members is shown in FIG. 9, which depicts an exemplary hinge structure joining ceiling portions 400*b* and 400*c*. In particular, a plurality of double hinges 413 are arranged in line along horizontal axis 405*b*. Double hinges are preferred to permit the hinges to be recessed below the surface, while retaining the ability to pivot through up to one hundred eighty degrees (180°) of arc, without causing interference crimping between adjacent ceiling portions. These double hinges can be fabricated by positioning together in an abutting relationship two single hinges, each along one of their respective leaves, and welding them to fashion one double hinge 413.

As shown in FIG. 9, each of the free leaves of double hinge 413 are respectively secured to a reinforcing board 437. Each reinforcing board 437 is positioned against the exterior of the web of a C-channel track 308 (fabricated from cold formed steel), each of which in turn is secured to the respective abutting edges of roof portions 400*b* and 400*c*, as shown in FIG. 9. The same hinge structure can be utilized to secure together ceiling portions 400*a* and 400*b*, although rotated 180 degrees and displaced to be arranged in line along horizontal axis 405*a*, so as to permit the ceiling portions 400*b* and 400*c* to fold in an accordion pattern, as shown in FIGS. 3A and 3B.

As further alternatives to the hinge structure depicted in FIG. 9, suitable hinge structures are disclosed in U.S. Non-Provisional patent application Ser. No. 16/786,202 entitled "Enclosure Component Perimeter Structures," having the same inventors and filed on the same date as the subject application. The contents of that U.S. Non-Provisional patent application Ser. No. 16/786,202 entitled "Enclosure Component Perimeter Structures," having the same inventors and filed on the same date as the subject application, are incorporated by reference as if fully set forth herein, particularly including the hinge structures described for example at paragraphs 125-157 and depicted in FIGS.

13A-15 thereof, and more particularly the hinged structure described at paragraphs 136-146 and depicted in FIGS. 14A-14F. These hinge structures can be employed in addition to or in substitution for the interior edge reinforcement provided by reinforcing boards 437 of ceiling portions 400a, 400b and 400c, and can also perform a sealing function, to inhibit water ingress and environmental exposure.

Ceiling Chases

Each of ceiling portions 400a, 400b and 400c can be provided with ceiling chases. As described below, the ceiling chases 219 communicate with utility service system 460 and wall chases 219.

Figure 7B:
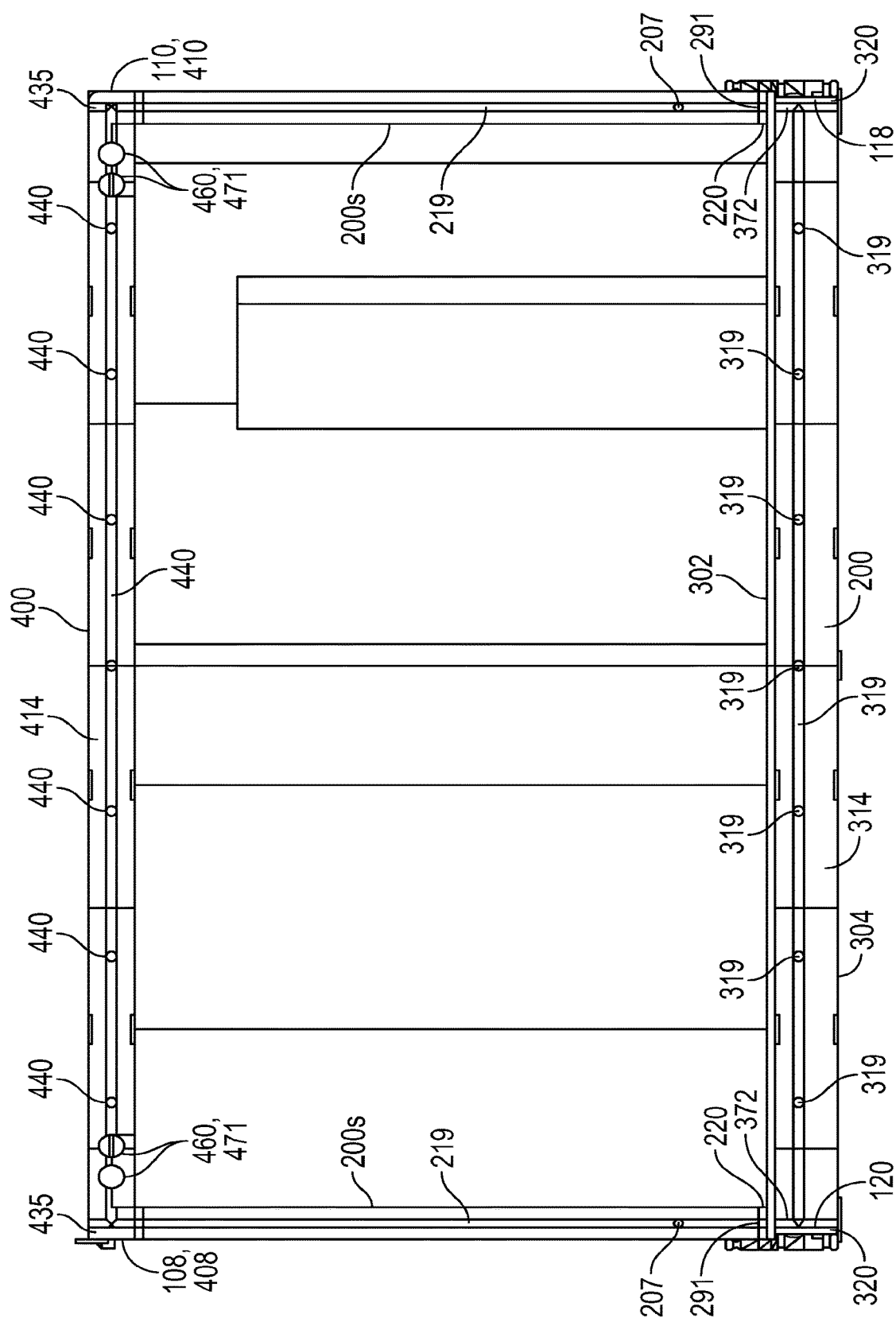
Figure 7C:
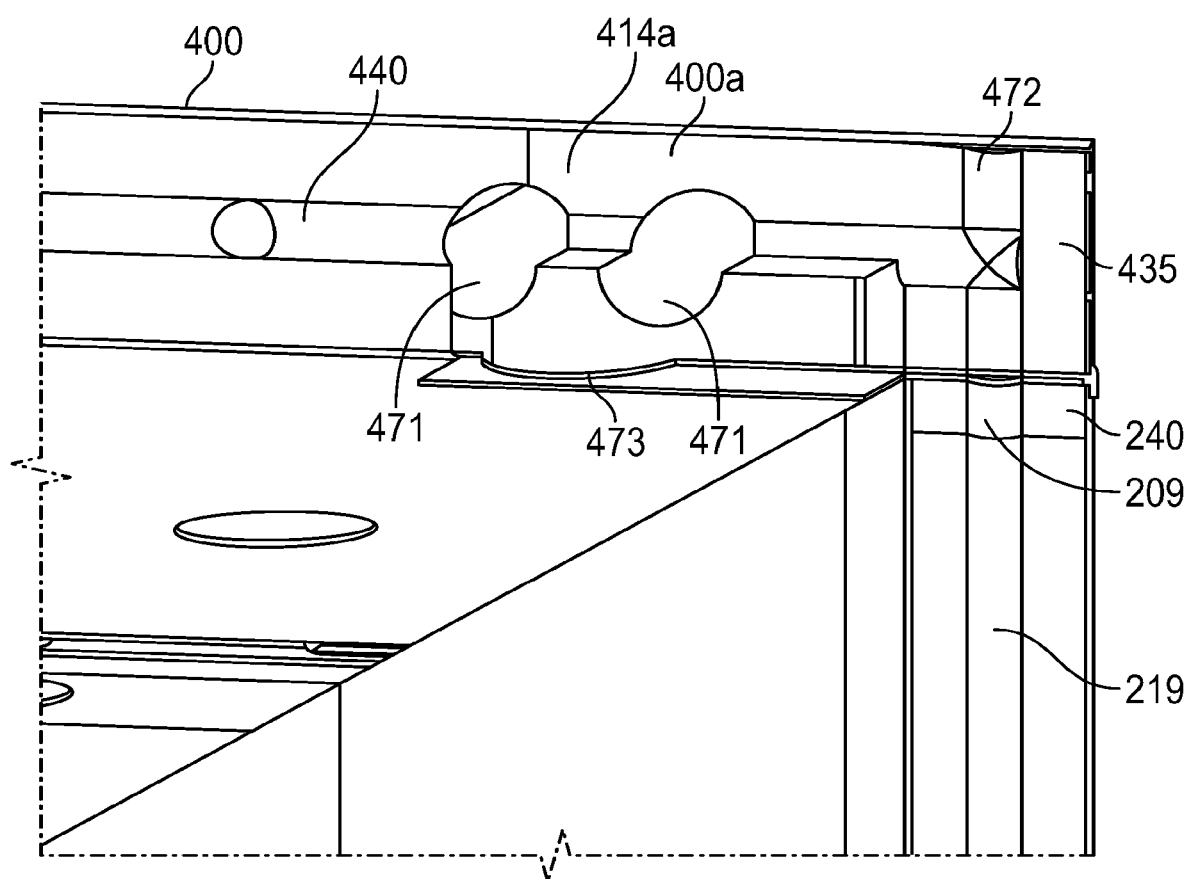
FIG. 7C is a partial cutaway perspective view of a finished structure in accordance with the present inventions, depicting in greater detail the construction of a ceiling component, which utilizes an in situ utility channels embodiment of the utility service system of the present invention, and depicting the juncture of the ceiling component with a wall component.
Figure 7D:
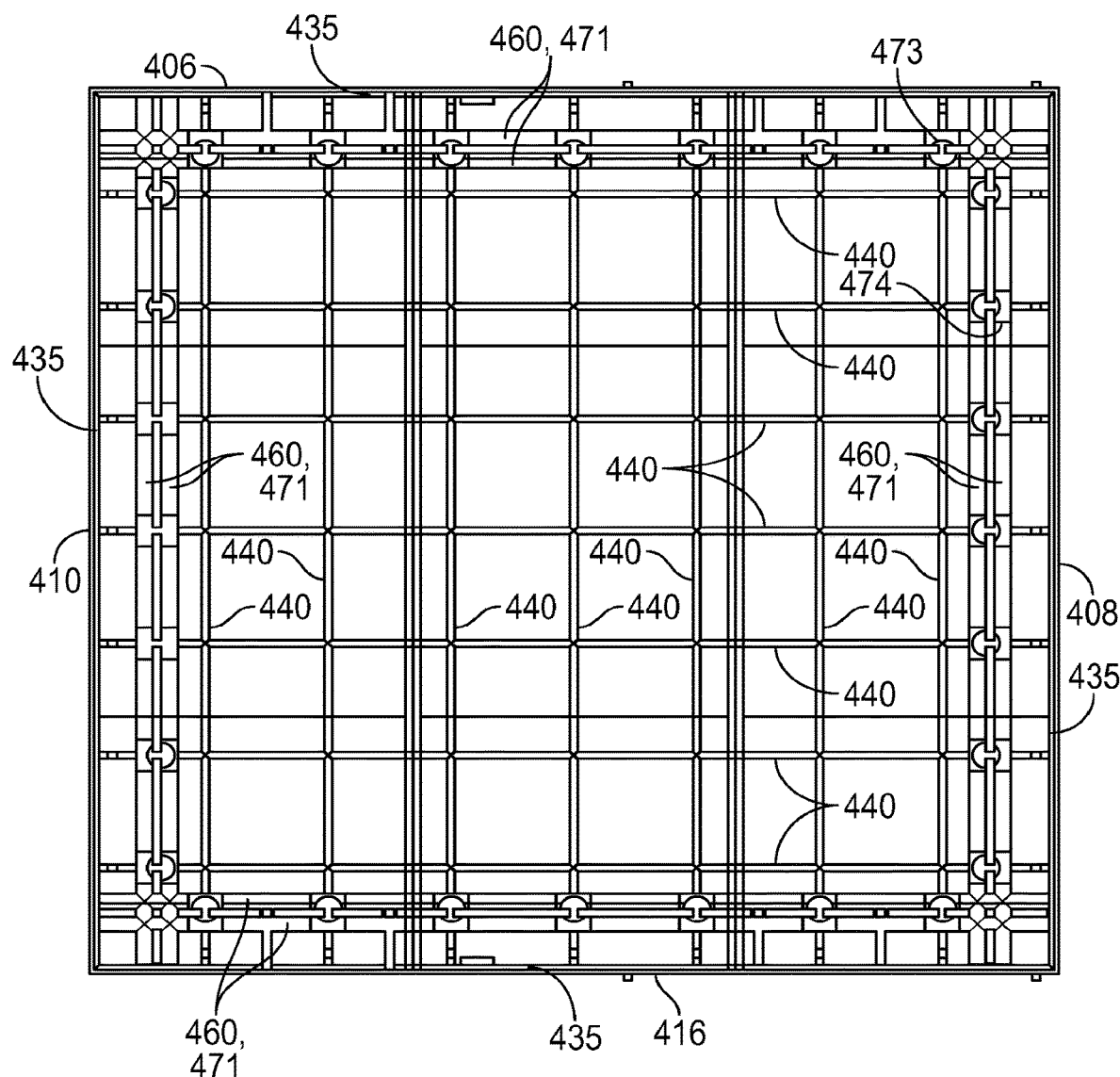
FIG. 7D is a cutaway plan view of a ceiling component of the present invention, which includes an in situ utility channels embodiment of the utility service system and the ceiling chases of the present inventions.

FIG. 7D is a plan view of ceiling 400 of type 2 structure 152 sectioned to reveal a particular embodiment of a ceiling chase configuration. While shown for a type 2 structure 152, ceiling chases 219 can also be utilized in a type 1 structure 151, or in any other structure 150 fabricated in accordance with this disclosure.

As shown in FIG. 7D, there is provided a first plurality of elongate cylindrical passages, ceiling chases 440, spaced apart at regular intervals across the entire distance between first and second transverse ceiling edges 408 and 410, and arranged in a first direction generally parallel to first and second transverse ceiling edges 408 and 410 and to each other. Each of such ceiling chases 440 spans the distance between the shoulder beams 435 located proximate to first and second longitudinal ceiling edges 406 and 416, respectively. There is also provided a second plurality of ceiling chases 440, spaced apart at regular intervals across the entire distance between first and second longitudinal edges 406 and 416, and arranged in a second direction approximately perpendicular to the first direction and generally parallel to first and second longitudinal ceiling edges 406 and 416 and to each other. Each of such ceiling chases 440 spans the distance between the shoulder beams 435 located proximate to first and second transverse ceiling edges 408 and 410, respectively. The first and second plurality of spaced-apart ceiling chases accordingly form a ceiling chase grid. The provision of ceiling chases 440 facilitates routing of utility lines (such as for electrical power, lighting control, HVAC, HVAC control, security systems, including energizing and communicating with smoke or heat sensors, etc.) to locations on ceiling component 400 distal from a wall component 200. As shown, the ceiling chase segments in ceiling portions 400a, 400b and 400c are aligned to communicate when ceiling portions 400b and 400c are deployed to form a complete ceiling component 400.

Each ceiling chase 219 preferably is provided with a diameter sufficient to permit the installation of utility lines; for example, approximately one to two inches (2.54 to 5.08 cm) in diameter. Ceiling chases 219 can be formed in ceiling foam panels 414 by use of a circular hot wire appropriately positioned and displaced into the foam panels below the surfaces of the panels, generally in the same manner described above to form wall chases 207 and 219.

Ceiling chases 219 communicate with utility service system 460 located in ceiling component 400, described below.

Utility Service System (460)

As shown in FIGS. 6A-7E, there are provided two embodiments of a utility service system 460 in ceiling component 400.

The purpose of utility service system 460 is to provide a recessed passageway in finished structure 150 through which utility lines can be conveniently routed and connected. In general terms, utility service system 460 comprises one or more passageways, preferably of closed loop form, located about the entirety of the periphery of ceiling component 400; i.e., approximately adjacent or proximate to the first and second longitudinal exterior ceiling edges 406 and 416, and approximately adjacent or proximate to the first and second transverse ceiling edges 408 and 410, of ceiling component 400. Thus the structure defining utility service system 460 is provided in each of ceiling portions 400a, 400b and 400c generally proximate to the shoulder beams 435 included in those ceiling portions.

Utility service system 460 is adapted to contain utility lines (such as for electrical power, lighting control, HVAC, HVAC control, security systems, including energizing and communicating with smoke or heat sensors, etc.). As shown, the segments of utility service system 460 in ceiling portions 400a, 400b and 400c are aligned to communicate with each other when the ceiling portions are deployed to form a complete ceiling component 400. In the event that there are used in any of ceiling portions 400a, 400b and 400c structural members such as joists 420 (as mentioned previously, a portion of a joist 420 is visible in FIG. 6D), and/or interior edge reinforcement (such as reinforcing boards 437), there can be provided passage holes 422 (visible in FIG. 6D) in the portions spanning utility service system 460 to facilitate free routing of utility lines through those joists and/or reinforcing boards 437 and about the entire circumference of utility service system 460.

The two embodiments for utility service system 460 described herein are built-up utility channel 461 and in situ utility conduits 471. While built-up utility channel 461 is depicted in a type 1 structure 151, and in situ utility conduits 471 are depicted in a type 2 structure 152, either of these utility systems 460 can be utilized in the other type of structure as well, or in any other structure fabricated in accordance with this disclosure.

Built-up Utility Channel (461)

As shown in FIGS. 6A-6E, built-up utility channel 461 is a three-sided cavity, formed in the underside of ceiling component 400, and having an exterior edge, an interior edge and a top. As indicated above, built-up utility channel 461 preferably forms a closed loop, located about the entirety of the periphery of ceiling component 400.

Referring particularly to FIG. 6C, the exterior edge of built-up utility channel 461 is defined by shoulder beam 435, the interior edge of channel 461 is defined by channel closure board 467 and the top of utility channel 461 is defined by channel top surface 462. Channel closure board 467 can be made for example from one or more of laminated strand lumber board, wooden board, C-channel extruded aluminum or steel, or the like, and channel top surface 462 can be made for example of magnesium oxide board having a thickness of approximately 0.5 inch (1.27 cm). It is preferred that the width of built-up utility channel 461 be sufficient to allow reasonable access for construction and service personnel.

At regular spaced-apart intervals along the inner face of each shoulder beam 435 in ceiling portions 400a, 400b and 400c, there are provided a first set of plural apertures, denominated horizontal channel connectors 438. Horizontal channel connectors 438 can either pass entirely through shoulder beam 435, or alternatively and preferably, terminate within shoulder beam 435 (as shown in FIG. 6C) to create a cavity in shoulder beam 435. As shown in FIG. 6C, there is additionally provided at spaced-apart intervals along the bottom face of each shoulder beam 435 a second set of plural apertures, denominated vertical channel connectors 439. Each vertical channel connector 439 opens into and communicates with a respective horizontal channel connector 438 to provide a passage through shoulder beam 435 from below its bottom face and out its inner face.

Vertical channel connectors 439 are positioned so as to align with through-holes 209 in the wall component 200 supporting the shoulder beam 435, so as to provide a passageway for routing utility lines from within utility channel 461 into wall chases 219 of wall component 200, and, as desired, further into floor chases 319 of floor component 300, described below. The horizontal channel connectors 438, the vertical channel connectors 439, the through-holes 209 and the wall chases 219 all can be spaced apart at uniform intervals, for example at approximately twenty-nine inch (73.7 cm) intervals.

Figure 6E:
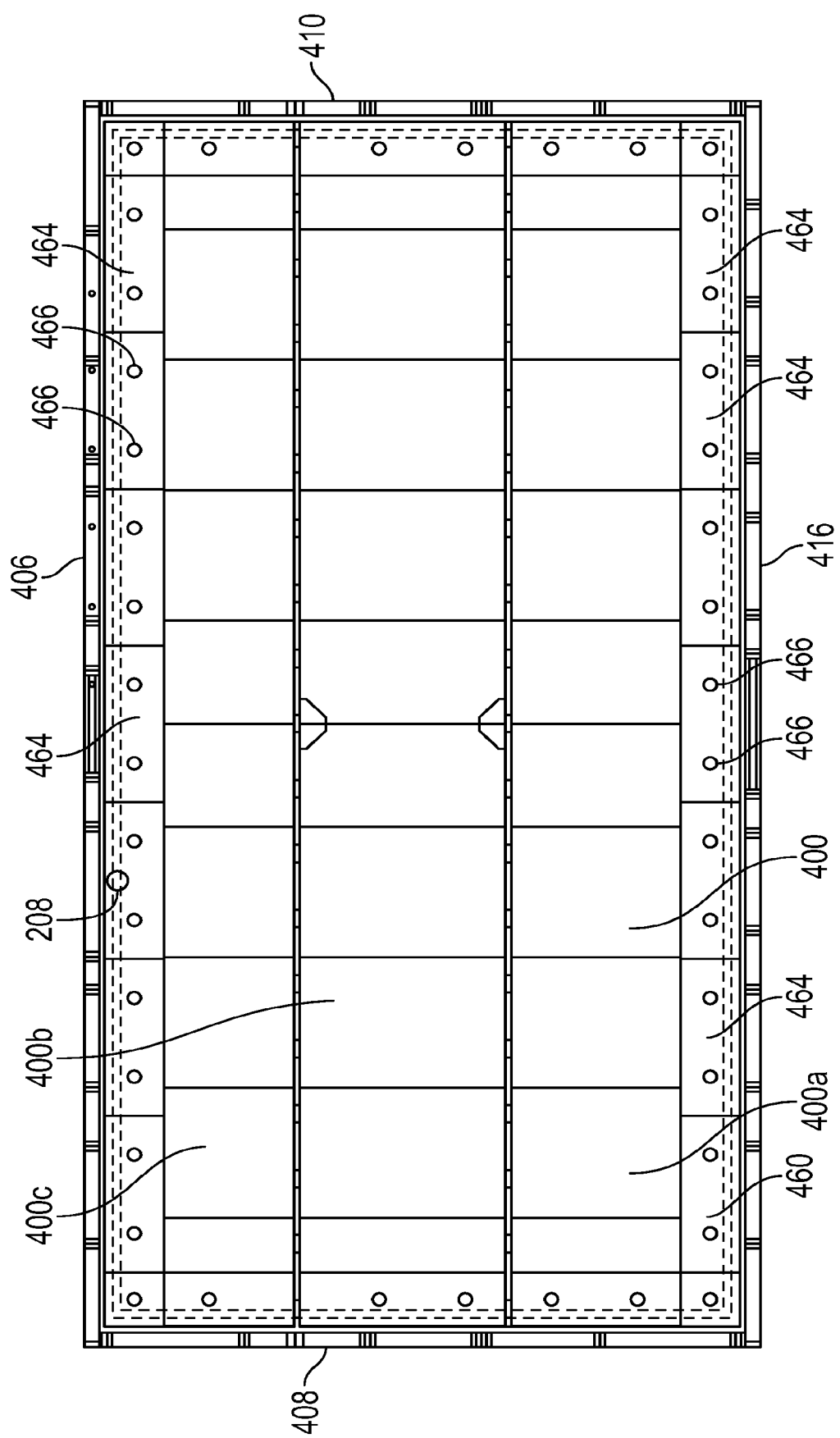
FIG. 6E is an underside plan view of a ceiling component of the present invention, which includes a built-up utility channel embodiment of the utility service system of the present inventions.

Built-up utility channel 461 can be provided with plural serially-abutting removable channel cover plates 464, shown in FIG. 6E, which preferably cover the entirety of built-up utility channel 461. Channel cover plates 464 conceal the utility lines contained therein, and can optionally include lighting accents to enhance the interior space, such as the multiple light sources 466 that are shown in FIG. 6E.

In Situ Utility Channels (471)

Utility service system 460 can also be formed in ceiling foam panels 414 in situ, as shown in FIGS. 7A-7E. Referring to FIG. 7A for example, there is shown in cross-section ceiling component 400 containing a plurality of ceiling foam panels 414a. As indicated in that figure, there are provided two in situ utility channels 471 in foam panel 414a, each of which is substantially circular in cross-section to define two closed-loop generally parallel cylindrical passageways which are located about the entirety of the periphery of ceiling component 400 proximate the shoulder beams 435 in ceiling component 400.

Utility channels 471 each can be formed by use of a circular hot wire appropriately positioned and displaced into the foam panels 414a below the surfaces of the panels, generally in the same manner described above in regard to the connecting and vertical wall chases 207 and 219. Each utility channel 471 should have a diameter sufficient to permit the installation of utility lines; for example, approximately four inches (10.16 cm) in diameter.

As exemplified by FIG. 7C, each ceiling chase 440 passes through all or substantially all of the entirety of ceiling component 400 between two opposing shoulder beams 435. Each ceiling chase 440 communicates with each of the two utility channels 471 at two points (one on each side of ceiling component 400 proximate those shoulder beams 435), thereby providing utility routing access between each ceiling chase 440 and utility channels 471. Proximate the periphery of ceiling component 400, each ceiling chase 440 intersects and communicates with a vertically-oriented cylindrical passage, ceiling chase connector 472, which in turn communicates with a respective wall chase 219 through a through-hole 209 in ceiling plate 240 of wall component 200. Although as depicted in FIG. 7C each ceiling chase connector 472 abuts, but is formed (in foam panels 414) outside the material of a shoulder beam 435, it can also be located within the material of shoulder beam 435, in the manner of horizontal and vertical channel connectors 438, 439 shown for example in FIGS. 6C and 6D, as required or as desired. The foregoing arrangement thus provides each utility channel 471 with utility routing access to the wall chases 219.

Figure 7E:
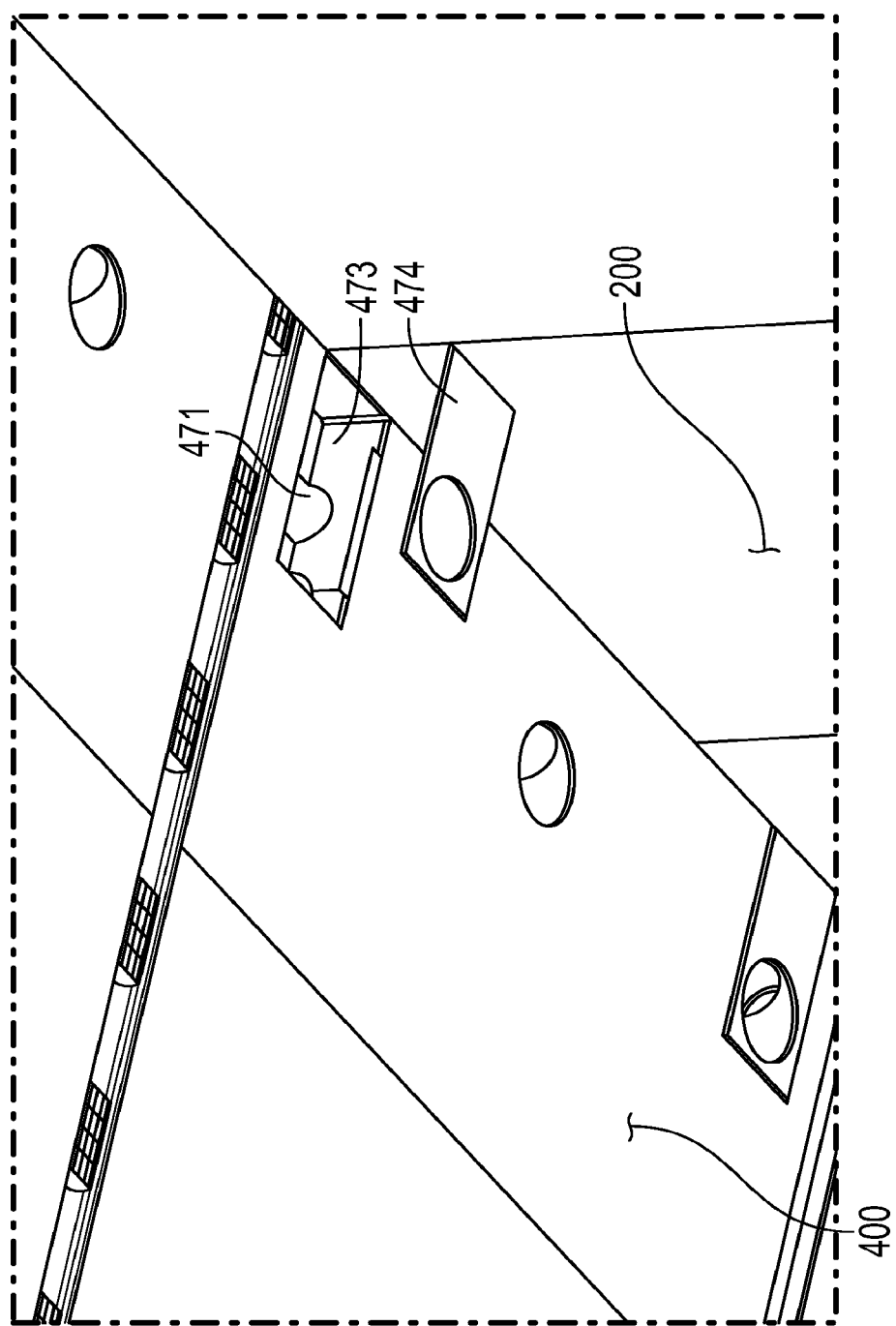
FIG. 7E is a perspective view of an in situ channels embodiment of the utility service system of the present inventions depicting a channel access plate.

As shown in FIGS. 7C-7E, there is provided a plurality of channel access apertures 473 proximate the intersection of each ceiling chase 440 and utility channels 471, for service access to the utility channels 471. It is preferred that the dimensions of channel access apertures 473 be sufficient to allow reasonable access for construction and service personnel; for example, each channel access aperture 473 can have a rectangular configuration, approximately 14.5 inches (36.8 cm) wide by 8.0 inches (20.3 cm) long. Each channel access aperture 473 can be covered by a removable channel access plate 474, shown in FIG. 7E.

Utility Service System Use

As an example of the utility lines that can be installed in utility service system 460, FIG. 6E depicts in schematic form a two-wire electrical loop 208 installed in built-up utility channel 461, and FIG. 6A depicts four pre-selected wall chases 219a, 219b, 219c and 219d in the wall components 200 of finished structure 150. One or more cutouts 276 are formed to communicate with wall chases 219a-d, junction boxes are placed in the cutouts 276 as appropriate and the chases are wired and connected to loop 208. Apertures for electrical outlets, switches, lighting and the like can be cut into and through interior sheathing layer 282, first structural layer 210, first woven fiber layer 213-1, and into foam panel 214 to form the cut-outs 276 to wall chases 219. In a comparable manner, like apertures for cut-outs can be formed in ceiling component 400 to communicate with ceiling chases 219. This arrangement provides access to electrical service at a great number of points across wall components 200 and ceiling component 400. The wiring and connection operations are performed preferably following delivery and deployment of structure 150, whereas the other described operations can be performed either before or after delivery, as is preferred.

Floor Component (300)

Typically, a finished structure 150 will utilize one floor component 300; thus floor component 300 generally is the full floor of finished structure 150. Floor component 300 has a generally rectangular perimeter. FIGS. 6A-6B and 7A-7B depict floor component 300 in accordance with the present inventions. The perimeter of floor component 300 is defined by first longitudinal floor edge 117, first transverse floor edge 120, second longitudinal floor edge 119 and second transverse floor edge 118. In particular, (a) first longitudinal floor edge 117, (b) first transverse floor edge 120, (c) second longitudinal floor edge 119 and (d) second transverse floor edge 118 generally coincide with (i.e., underlie) (w) first longitudinal edge 106, (x) first transverse edge 108, (y) second longitudinal edge 116 and (z) second transverse edge 110, respectively, of finished structure 150. FIGS. 6A and 6B depict the floor component 300 for a type 1 structure 151, and FIGS. 7A and 7B depict the floor component 300 for a type 2 structure 152. The basic structure of floor component 300 is the same for both type 1 structure 151 and type 2 structure 152, and is generally applicable to floor components 300 of structures 150 fabricated in accordance with this disclosure.

The length and width of floor component 300 can vary in accordance with design preference. In the particular embodiment of the type 1 structure 151 depicted in FIGS. 1A and 2A, where wall components 200a, 200b are vertically oriented, the length and width of ceiling component 400 approximates the length and width of ceiling component 400 for that type 1 structure. Likewise in the particular embodiment of the type 2 structure 152 depicted in FIGS. 1B and 2B, where wall components 200s are vertically oriented, the length and width of ceiling component 400 approximates the length and width of ceiling component 400 for that type 2 structure.

It is preferred that floor component 300 utilize one of the multi-laminate designs described above in regard to FIGS. 4A-4D, as described below.

The perimeter of each floor component 300 is generally provided with exterior edge reinforcement. As exterior edge reinforcement for the embodiments of floor component 300 shown in FIGS. 7A and 7B, a first footing beam 320 (visible edge-on in FIG. 7A) is positioned at the first longitudinal floor edge 117 of floor component 300, a second footing beam 320 (visible edge-on in FIG. 7B) is positioned at the second transverse floor edge 118 of floor component 300, a third footing beam 320 (visible edge-on in FIG. 7B) is positioned at the first transverse floor edge 120 of floor component 300, and a fourth footing beam 320 is positioned at the second longitudinal floor edge 119 of floor component 300 (visible edge-on in FIG. 7A). In the case floor component 300, the edge reinforcement provided by footing beams 320 assists in resisting vertical loads and transferring such loads to any ceiling component 400 thereunder and then to underlying wall components 200, and/or to the foundation of the finished structure 150, in addition to protecting the edges of foam panel material.

The exterior edge reinforcement provided by footing beams 420 of floor component 300 can be fabricated from one or more of laminated strand lumber board, wooden board, C-channel extruded aluminum or steel or the like. Alternatively, appropriate enclosure component perimeter structures of a type disclosed in U.S. Non-Provisional patent application Ser. No. 16/786,202 entitled "Enclosure Component Perimeter Structures," having the same inventors and filed on the same date as the subject application, can be employed in addition to or in substitution for exterior edge reinforcement of the type just described for floor component 300. The contents of that U.S. Non-Provisional patent application Ser. No. 16/786,202 entitled "Enclosure Component Perimeter Structures," having the same inventors and filed on the same date as the subject application, are incorporated by reference as if fully set forth herein, particularly including the enclosure component perimeter structures described for example at paragraphs 110-124 and in FIGS. 10-12 thereof. Notably, those enclosure component perimeter structures can also perform a sealing function, to inhibit water ingress and environmental exposure.

Floor Partitioning

The floor component 300 in type 1 structure 151 and in type 2 structure 152 comprises floor portion 300a and floor portion 300b. Each of the floor portions 300a and 300b is a planar generally rectangular structure, with floor portion 300a adjoining floor portion 300b, as exemplified by FIGS. 6A, 6B and 7A.

Floor Portion 300a. Floor portion 300a, shown in FIGS. 6A, 6B and 7A, is generally exemplary of the construction of floor portions 300a and 300b, and as depicted generally utilizes a laminate multi-layer design in accordance with the first or second embodiment thereof respectively illustrated in FIGS. 4A and 4B. As relevant here, floor portion 300a includes a first structural layer 210 of structural building panels 211, denominated floor bottom surface 304 and a second structural layer 215 of structural building panels 216, denominated floor top surface 302. Between floor surfaces 302 and 304 there are foam panels 214, denominated floor foam panels 314. Interior edge 301a of floor portion 300a abuts interior edge 301b of floor portion 300b, as shown in FIG. 7A. As interior edge reinforcement, a reinforcing board 307 is positioned adjacent interior edge 301a.

Floor Portion 300b. Floor portion 300b is shown for example in FIGS. 6A, 6B and 7A. It is the same in general design and construction as floor portion 300a. Interior edge 301b of floor portion 300b abuts interior edge 301a of floor portion 300a, as shown in FIG. 7A. As interior edge reinforcement, a reinforcing board 307 is positioned adjacent interior edge 301b.

Floor component 300 and its constituent elements are generally dimensioned in thickness and otherwise to accommodate the particular loads to which floor component 300 may be subject. A particular embodiment of floor component 300 for the type 2 structure 152 shown for example in FIGS. 7A and 7B can utilize the second multi-layer design embodiment (see FIG. 4B) with 0.25 inch (0.635 cm) thick MgO board for structural building panels 211 of first structural layer 210/floor bottom surface 304, and 0.5 inch (1.27 cm) thick MgO board for structural building panels 216 of second structural layer 211/floor top surface 302. Correspondingly in this particular embodiment, binding strips of 0.25 inch (0.635 cm) thick MgO board six inches (15.24 cm) wide are used to join together the structural building panels 211 of first structural layer 210/floor bottom surface 304, and binding strips of 0.5 inch (1.27 cm) thick MgO board six inches (15.24 cm) wide are used to join together the structural building panels 216 of second structural layer 211/floor top surface 302. The foam panels 214/floor foam panels 314 can be 11.25 inches (28.575 cm) thick, yielding a floor component 300 approximately 12 inches (30.48 cm) thick.

The floor portion 300b comprising floor component 300 can be folded to facilitate forming a compact shipping module. The type 1 structure 151 and the type 2 structure 152 each includes such a floor portion.

Referring to the type 1 structure 151 shown in FIG. 6B, floor portion 300a is fixed in position relative to first wall portions 200b-1 of short wall components 200b and relative to long wall component 200a-R, and is joined with hinge structures to floor portion 300b, so as to permit floor portion 300b to pivot through approximately ninety degrees (90°) of arc about a horizontal axis 305, located proximate floor top surface 302, between a folded position, where floor portion 300b is approximately vertically oriented as shown in FIG. 3A, and the fully unfolded position shown in FIGS. 6A and 6B.

Likewise referring to the type 2 structure 152 shown in FIG. 7A, floor portion 300a is fixed in position relative to first wall portion 200s-1, fourth wall portion 200s-4 and wall component 200s-R. Floor portion 300a is joined with hinge structures to floor portion 300b in the same manner as described above in connection with type 1 structure 151.

The hinge structures joining floor portions 300a and 300b can be surface mounted or recessed, and of a temporary or permanent nature. Suitable hinge structures can be fabricated for example of metal, plastic, leather, ferrous or non-ferrous material. An example of a suitable hinge structure and its associated members is shown in FIG. 8. In particular, a plurality of steel hinges 306, for example approximately three inches (7.62 cm) wide by approximately six inches (15.24 cm) long, are arranged in line along horizontal axis 305, as shown edge-on in FIG. 8. Such hinges are commercially available from McMaster-Carr, Douglasville, GA USA. The hinge structures joining floor portions 300a and 300b need not be double hinges, since they need to pivot only through approximately ninety degrees (90°) of arc, and thus the potential for interference crimping is less than in connection with the ceiling portions of ceiling component 400.

As shown in FIG. 8, the opposing leaves of hinges 306 are respectively secured to the interior edge reinforcement, reinforcing board 307, provided at each of interior edges 301a and 301b. Reinforcing boards 307 in FIG. 8 are made of laminated strand lumber. Each reinforcing board 307 is positioned against the exterior of the web of a C-channel track 308 (fabricated from cold formed steel), each of which in turn is secured to the respective abutting edges of floor portions 200a and 200b, as shown in FIG. 8.

Alternatively, suitable hinge structures for joining floor portions 300a and 300b are disclosed in U.S. Non-Provisional patent application Ser. No. 16/786,202 entitled "Enclosure Component Perimeter Structures," having the same inventors and filed on the same date as the subject application. The contents of that U.S. Non-Provisional patent application Ser. No. 16/786,202 entitled "Enclosure Component Perimeter Structures," having the same inventors and filed on the same date as the subject application, are incorporated by reference as if fully set forth herein, particularly including the hinge structures described for example at paragraphs 125-157 and depicted in FIGS. 13A-15 thereof, and more particularly the hinged structure described at paragraphs 125-135 and depicted in FIGS. 13A-F. These hinge structures can be utilized in addition to or in place of interior edge reinforcement, as described above, and can also perform a sealing function to inhibit water ingress and environmental exposure.

Baseboard and Perimeter Board

The exterior edges of floor component 300, or portions thereof, such as the exterior edge of floor portion 300b located along first longitudinal edge 106 of finished structure 150, can be provided with a baseboard 310. In the type 1 structure 151 shown for example in FIG. 3A, a baseboard 310 is shown edge-on secured to the exterior edge of floor portion 300b. Where baseboard 310 extends around the perimeter of floor component 300, it is termed perimeter board 312. The type 2 structure 152 shown for example in FIGS. 1B and 3B utilizes a perimeter board 312. It is preferred that the vertical dimension (height) of baseboard 310 (including perimeter board 312) be greater than the thickness of floor component 300.

Floor Chases

Optionally, the floor foam panels 314 in floor component 300 can be provided with floor chases 319.

Figure 7F:
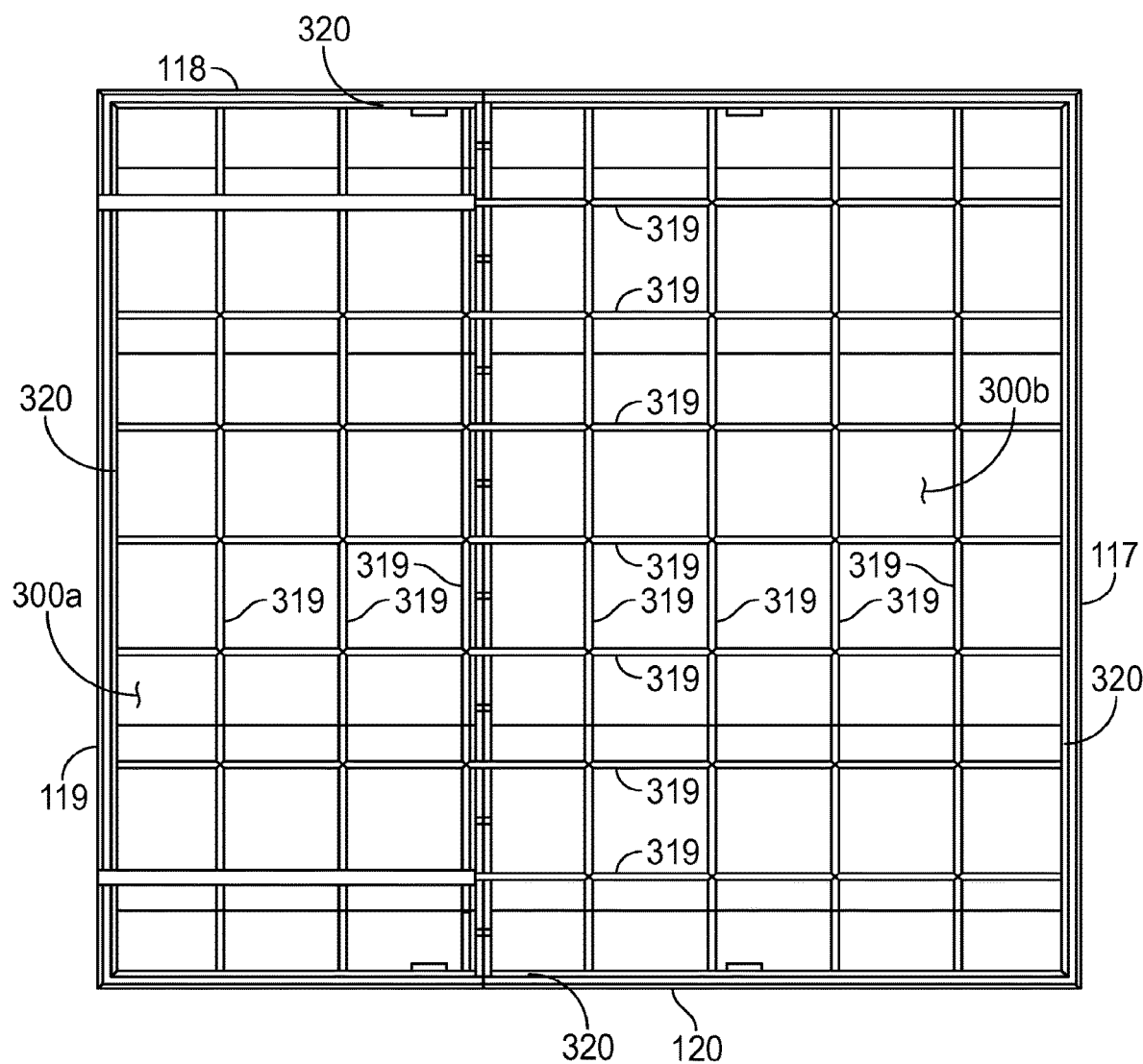
FIG. 7F is a cutaway plan view of a floor component that depicts the floor chases of the present inventions.

FIG. 7F provides a floor component 300 sectioned to reveal an exemplary floor chase arrangement. While shown in FIG. 7F for the floor component 300 of type 2 structure 152, floor chases 319 can also be utilized in the floor component 300 of a type 1 structure 151, or in the floor component 300 of any other structure 150 fabricated in accordance with this disclosure.

As shown in FIG. 7F, there is provided a first plurality of elongate cylindrical passages, floor chases 319, spaced apart at regular intervals across the entire distance between first and second transverse floor edges 120 and 118, and arranged in a first direction generally parallel to first and second transverse floor edges 120 and 118 and to each other. Each of such floor chases 319 spans the distance between the footing beams 320 located proximate to first and second longitudinal floor edges 117 and 119, respectively. There is also provided a second plurality of floor chases 319, spaced apart at regular intervals across the entire distance between first and second longitudinal floor edges 117 and 119, and arranged in a second direction approximately perpendicular to the first direction and generally parallel to first and second longitudinal floor edges 117 and 119 and to each other. Each of such floor chases 319 spans the distance between the footing beams 320 located proximate to first and second transverse floor edges 120 and 118, respectively. The first and second plurality of spaced-apart floor chases 319 accordingly form a floor chase grid. The provision of floor chases 319 facilitates routing of utility lines (such as for electrical power, lighting control, HVAC, HVAC control, security systems, etc.) to locations on floor component 300 distal from a wall component 200. The floor chase segments in the two floor portions of floor component 300 are aligned to communicate when floor portions 300a and 300b are fully deployed to form a complete floor component 300.

Each floor chase 319 preferably is provided with a diameter sufficient to permit the installation of utility lines; for example, approximately one to two inches (2.54 to 5.08 cm) in diameter. If it is intended for one or more of floor chases 319 to be used for gray or black water discharge, then those floor chases are preferably suitably sloped and of a diameter appropriate to accommodate the discharged gray or black water, such as greater than approximately four inches (10.16 cm), for example approximately six inches (15.24 cm). Floor chases 319 can be formed in the floor foam panels 314 by use of a circular hot wire appropriately positioned and displaced into the foam panels below the surfaces of the panels, generally in the same manner described above in regard to the wall chases.

Preferably, the floor chases 319 are positioned to be aligned and to communicate with the wall chases 219 in wall component 200. Thus for example, if wall chases 219 are spaced apart at approximately twenty-nine inch (73.7 cm) intervals, then the floor chases preferably are also spaced apart at approximately twenty-nine inch (73.7 cm) intervals. In the manner shown in FIGS. 7A-7B, each floor chase 319 intersects and communicates with a vertically oriented passage, floor chase connector 372, which in turn communicates with a respective wall chase 219 through a through-hole 291 in floor plate 220 of wall component 200. This arrangement thus provides each of the floor chases 319 with utility line routing access to a respective wall chase 219 and in turn, to utility service system 460 (in the particular embodiment shown, in situ channels 471) and ceiling chases 440. In a manner similar to that described above with regard to wall chases 219, apertures for cut-outs can be formed in floor component 300 to communicate with floor chases 319, thereby providing access to, for example, electrical service at a great number of locations across floor component 200.

Enclosure Component Relationships and Assembly for Transport

For ease of transport and maximum design flexibility, it is preferred that there be a specific dimensional relationship among enclosure components 155.

FIG. 2A shows a top schematic view of the type 1 structure 151 shown in FIG. 1A, and includes a geometrical orthogonal grid for clarity of explaining the preferred dimensional relationships among enclosure components 155. The basic length used for dimensioning is indicated as "E" in FIG. 2A; the orthogonal grid overlaid in FIG. 2A is 24E long and 12 E wide, and illustrates the relative dimensions of the components.

More particularly, in FIG. 2A the two long wall components 200a are approximately 24E long, and the two short wall components 200b are approximately 12E long. Each of ceiling portions 400a, 400b and 400c is 24E long and 4E wide. The two floor portions 300a and 300b of type 1 structure 151 are shown in FIGS. 2A and 3A. Each of floor components 300a and 300b is 24E long; whereas floor component 300a is approximately 4E wide and floor component 300b is approximately 8E wide.

The shipping module 100 for type 1 structure 151, shown edge-on in FIG. 3A, generally includes a fixed space portion 102 defined by ceiling component 400a, floor component 300a, long wall component 200a-R and two first wall portions 200b-1 of short wall components 200b. As shown in FIG. 2A, the remaining two portions of short wall components 200*b*, second wall portions 200*b*-2, are folded inward and positioned against fixed space portion 102 (identified in FIG. 2A as wall portion 200*b*-2*f* when so folded and positioned). The three ceiling portions 400*a*, 400*b* and 400*c* of type 1 structure 151 are shown deployed in FIG. 1A. FIG. 3A, the shipping module 100 for type 1 structure 151, depicts ceiling components 400*b* and 400*c* stacked on top of the ceiling component 400*a* that in part defines fixed space portion 102. Long wall component 200*a*-P, shown in FIGS. 2A and 3A, is pivotally secured to floor portion 300*b* at the location of horizontal axis 105, and is vertically positioned against the outside of second wall portions 200*b*-2. In turn, floor portion 300*b* is vertically positioned proximate to fixed space portion 102, with long wall component 200*a*-P pending (i.e., hanging) from floor portion 300*b* between floor portion 300*b* and second wall portions 200*b*-2.

Sizing the enclosure components 155 of type 1 structure 151 according to the dimensional relationships disclosed above yields a compact shipping module 100, as can be seen from the figures. Thus shipping module 100, when dimensioned according to the relationships disclosed herein using an "E" dimension (see FIG. 2A) of approximately 19.5 inches (49.5 cm), and when its components are stacked and positioned as shown in FIG. 3A, has an overall length of approximately 39 feet (11.89 meters), an overall width of approximately 8.5 feet (2.59 meters) and an overall height of approximately 12.7 feet (3.87 meters). These overall dimensions are approximately the same or less than a typical shipping container.

Similarly, FIG. 2B shows a top schematic view of the type 2 finished structure 152 shown in FIG. 1B, and includes a geometrical orthogonal grid for clarity of explaining the preferred dimensional relationships among its enclosure components 155. The basic length used for dimensioning is indicated as "E" in FIG. 2B; the orthogonal grid overlaid in FIG. 2B is approximately 8E long and 8E.

More particularly, in FIG. 2B the four wall components 200*s* are approximately 8E long, and each of ceiling portions 400*a*, 400*b* and 400*c* is approximately 8E long and 2.67E wide. The two floor portions 300*a* and 300*b* of finished structure 152 are shown in FIGS. 2B and 3B. Each of floor components 300*a* and 300*b* is 8H long; whereas floor component 300*a* is approximately 3E wide and floor component 300*b* is approximately 5E wide.

The shipping module 100 for type 2 structure 152, shown edge-on in FIG. 3B, also generally includes a fixed space portion 102 defined by ceiling component 400*a*, floor component 300*a*, wall component 200*s*-R, wall portion 200*s*-1 and wall portion 200*s*-4. As show in FIG. 2B, second wall portion 200*s*-2 is folded inward and positioned generally against fixed space portion 102, whereas third wall portion 200*s*-3 is folded outward and positioned generally against second wall portions 200*s*-2 (wall portions 200*s*-2 and 200*s*-3 are respectively identified in FIG. 2B as portions 200*s*-2*f* and 200*s*-3*f* when so folded and positioned); so as to form an accordion fold having as its elements fixed space portion 102, second wall portion 200*s*-2 and third wall portion 200*s*-3. Fifth wall portion 200*s*-5 is folded inward and positioned generally against fixed space portion 102 (identified in FIG. 2B as wall portion 200*s*-5*f* when so folded and positioned). The three ceiling components 400*a*, 400*b* and 400*c* are shown deployed in FIG. 1B. FIG. 3B, the shipping module 100 for type 2 structure 152, depicts ceiling components 400*b* and 400*c* stacked on top of the ceiling component 400*a* that in part defines fixed space portion 102. Wall component 200*s*-P, shown in FIGS. 2B and 3B, is pivotally secured to floor portion 300*b* at the location of axis 105, and is vertically positioned against the outside of wall portions 200*s*-3 and 200*s*-5. In turn, floor portion 300*b* is vertically positioned proximate to fixed space portion 102, with long wall component 200*s*-P pending from floor portion 300*b* between floor portion 300*b* and wall portions 200*s*-3 and 200*s*-5.

Sizing the enclosure components 155 of type 2 structure 152 according to the dimensional relationships disclosed above yields a compact shipping module 100, as can be seen from the figures. Thus shipping module 100 depicted in FIG. 3B, when dimensioned according to the relationships disclosed herein using an "E" dimension (see FIG. 2B) of approximately 29 inches (73.7 cm), and when its components are stacked and positioned as shown in FIG. 3B, has an overall length of approximately 19 feet (5.79 m), an overall width of approximately 8.5 feet (2.59 meters) and an overall height of approximately 12.7 feet (3.87 meters). These overall dimensions are less than a typical shipping container.

The geometrical orthogonal grid referred also provides beneficial reference points for placement of floor chases 319, wall chases 219 and ceiling chases 440. When such chases are placed for example at specific "E" intervals that coincide with the grid spacing being used, they are easily located during structure finishing.

It is preferred that the fixed space portion 102 be in a relatively finished state prior to positioning (folding) together all other of the wall, ceiling and floor portions as described above. That is, the fixed space portion 102 is preferably fitted during manufacture with all mechanical and other functionality that the structure 150 will require, such as kitchens, bathrooms, laundry rooms, HVAC closets, fireplaces, clothing closets, storage areas, corridors, etc. A temporary member 103 (shown in FIG. 3A) provides support during shipping of type 1 structure 151 and is removed after delivery (there is no comparable temporary member utilized for shipping type 2 structure 152). Preferably after fixed space portion 102 is finished to the desired state, the remaining components are folded and positioned against fixed space portion 102 as described above. The components, so folded and positioned, permit the builder, in effect, to erect finished structure 150 simply by "unfolding" (deploying) the positioned components of shipping module 100.

As exemplified by long wall component 200*a* in FIG. 5A, each of the wall, floor and ceiling components 200, 300 and 400, and/or the portions thereof, can be sheathed in protective film 177 during fabrication and prior to forming the shipping module 100. Alternatively or in addition, the entire shipping module 100 can be sheathed in a protective film. These protective films accordingly constitute a means for protecting the shipping module 100 and components 200, 300 and 400 during shipping. In addition to the protection they give to the module and its components, such protective films have the added benefit of increasing the resistance of the components to such flexural and torsional stresses as may occur during transport of the components. These protective films constitute further means for rigidifying wall component 200 to improve its robustness during transport and erection of the structure at the construction site. It is preferred that such protective films remain in place until after the shipping module 100 is at the construction site, and then removed as required to facilitate enclosure component deployment and finishing.

Shipping Module Transport

The shipping module is shipped to the building site by appropriate transport means. One such transport means is disclosed in U.S. Patent Application Publication No. US 2019/0100127 A1, filed Sep. 27, 2018, and in International Publication No. WO 2019/070485 A1; the contents of which are incorporated by reference as if fully set forth herein, particularly as found at paragraphs 0020-0035 and in FIGS. 1A-2D thereof. As an alternative transport means, shipping module 100 can be shipped to the building site by means of a conventional truck trailer or a low bed trailer (also referred to as a lowboy trailer).

Structure Deployment and Finishing

At the building site, shipping module 100 is positioned over its desired location, such as over a prepared foundation; for example, a poured concrete slab, a poured concrete or cinder block foundation, sleeper beams or concrete posts or columns. This can be accomplished by using a crane, either to lift shipping module 100 from its transport and move it to the desired location, or by positioning the transport means over the desired location, lifting shipping module 100, then moving the transport means from the desired location, and then lowering shipping module 100 to a rest state at the desired location. Particularly suitable equipment and techniques for facilitating the positioning of a shipping module 100 at the desired location are disclosed in U.S. Non-Provisional patent application Ser. No. 16/786,315 entitled "Equipment and Methods for Erecting a Transportable Foldable Building Structure," having the same inventors and filed on the same date as the subject application. The contents of that U.S. Non-Provisional patent application Ser. No. 16/786,315 entitled "Equipment and Methods for Erecting a Transportable Foldable Building Structure," having the same inventors and filed on the same date as the subject application, are incorporated by reference as if fully set forth herein, particularly including the equipment and techniques described for example at paragraphs 126-128 and in connection with FIGS. 11A and 11B thereof.

Following positioning of shipping module 100 at the building site, the appropriate portions of wall, floor and ceiling components 200, 300 and 400 are "unfolded" (i.e., deployed) according to the sequences described above to yield finished structure 150.

For type 1 structure 151, unfolding (enclosure component and component portion deployment) occurs in the following sequence: (1) floor portion 300b is pivotally rotated about horizontal axis 305 shown in FIG. 3A to an unfolded position, (2) wall component 200a-P is pivotally rotated about horizontal axis 105 shown in FIG. 3A to an unfolded position, (3) wall portions 200b-2 of short wall components 200b are pivotally rotated about vertical axes 191 shown in FIG. 2A to unfolded positions, and (4) ceiling portions 400b and 400c are pivotally rotated about horizontal axes 405a and 405b respectively to their unfolded positions.

For type 2 structure 152, unfolding occurs in the following sequence: (1) floor portion 300b is pivotally rotated about horizontal axis 305 shown in FIG. 3B to an unfolded position, (2) wall component 200s-P is pivotally rotated about horizontal axis 105 shown in FIG. 3B (behind perimeter board 312) to an unfolded position, (3) wall portions wall portions 200s-2, 200s-3 and 200s-5 are pivotally rotated about vertical axes 192, 193 and 194 respectively to unfolded positions, and (4) ceiling portions 400b and 400c are pivotally rotated about horizontal axes 405a and 405b respectively to unfolded positions. A mobile crane can be used to assist in the deployment of certain of the enclosure components 155, specifically ceiling portions 400b and 400c, floor portion 300b, as well as the wall component 200 pivotally secured to floor portion 300b (200a-P for type 1 structure 151, 200s-P for type 2 structure 152). Alternatively, particularly suitable equipment and techniques for facilitating the deployment of enclosure components 155 are disclosed in U.S. Non-Provisional patent application Ser. No. 16/786,315 entitled "Equipment and Methods for Erecting a Transportable Foldable Building Structure," having the same inventors and filed on the same date as the subject application. The contents of that U.S. Non-Provisional patent application Ser. No. 16/786,315 entitled "Equipment and Methods for Erecting a Transportable Foldable Building Structure," having the same inventors and filed on the same date as the subject application, are incorporated by reference as if fully set forth herein, particularly including the equipment and techniques described for example at paragraphs 132-145 and depicted in FIGS. 12A-14B thereof.

Notably, baseboard 310 in appropriate locations functions as a "stop" to arrest the unfolding of a wall component or a wall portion at its intended deployed position. Thus for example, baseboard 310 in FIG. 3A, depicting a type 1 structure 151, arrests the unfolding of the long wall 200a-P shown in the figure, when long wall 200a-P is fully deployed in its desired vertical position. Likewise, perimeter board 312 in FIG. 3B, depicting a type 2 structure 152, performs a similar function with respect to a wall 200s-P, and also with respect to wall portions 200s-2, 200s-3 and 200s-5. Further, baseboard 310 provides a structure for securing a deployed wall component in its deployed position; thus for example, baseboard 310 is provided in FIG. 6A with plural spaced-apart apertures 311 through which fasteners may be inserted to secure long wall 200a in place.

After deployment, the enclosure components 155 are secured together to form finished structure 150, shown in FIGS. 1A and 1B. If any temporary hinge mechanisms have been utilized, then these temporary hinge mechanisms can be removed if desired and the enclosure components 155 can be secured together. If certain of the enclosure component perimeter structures disclosed in U.S. Non-Provisional patent application Ser. No. 16/786,202 entitled "Enclosure Component Perimeter Structures," having the same inventors and filed on the same date as the subject application, have been utilized, specifically those described for example at paragraphs 121-157 and in FIGS. 12-15, then certain finishing operations preferably are performed in regard to such structures, as described therein. The contents of that U.S. Non-Provisional patent application Ser. No. 16/786,202 entitled "Enclosure Component Perimeter Structures," having the same inventors and filed on the same date as the subject application, are incorporated by reference as if fully set forth herein, particularly including the finishing operations performed in regard to enclosure component perimeter structures, described for example at paragraphs 179-182 and in FIGS. 13C, 13F, 14C, 14E, 15 and 17 thereof.

After deployment and securing of the enclosure components 155, one or more pre-selected chases located in wall components 200 (connecting and vertical wall chases 207 and 219), in floor component 300 (floor chases 319) and in ceiling component 400 (ceiling chases 440) can be wired and connected to the appropriate utility line in utility channel 460, such as electrical loop 208, as described above, and loop 208 in turn can be connected to the electric utility's service drop, thus energizing the electrical service of finished structure 150.

Prior to, during or following deployment and securing of the enclosure components 155, as desired, apertures 202, 204 for one or more doors and windows are cut at desired locations in the wall components 200, and appropriate door and window assemblies are positioned and fastened in the apertures 202, 204. Additional municipal hook-ups are made to water and sewer lines to complete structure 150, as relevant here.

Building Configuration Options

As discussed above, any number of structures 150 can be positioned together at the desired site, to yield a multitude of different structural configurations. Interior staircases for such multi-story structures can be provided during manufacture in fixed space portion 102, together with insertion of an appropriate access aperture in ceiling component 400, or can be added after erection. Likewise, a pitched roof and other architectural additions can be delivered separately from shipping module 100 or fabricated on-site, and positioned onto ceiling component 400 of finished structure 150.

Figure 10:
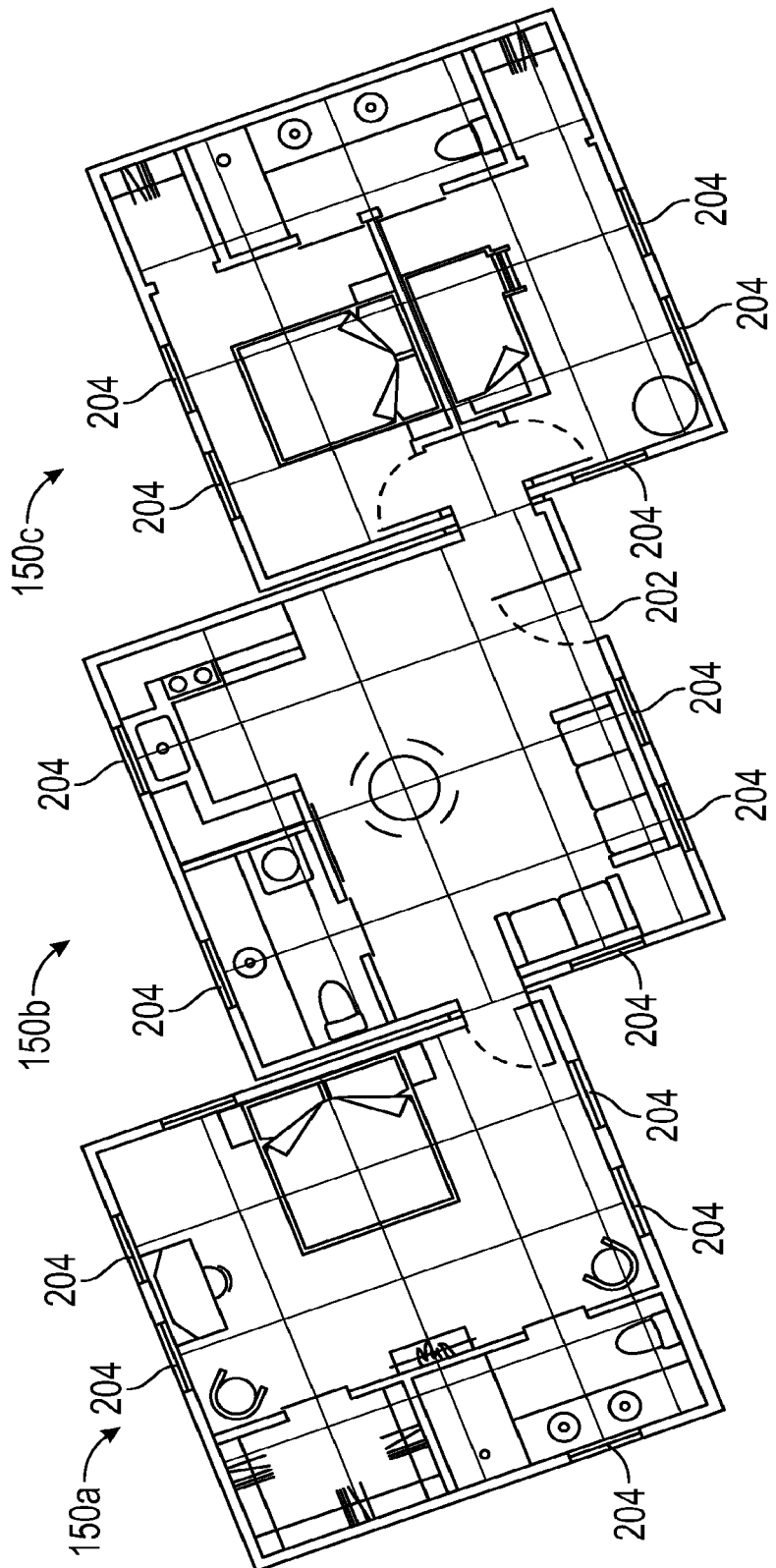
FIG. 10 depicts the layout of a three room structure fabricated in accordance with the present inventions.

For example, two or more finished structures 150 can be erected so that a wall component 200 of one structure is placed adjacent a wall component 200 of the other structure. The builder can then cut apertures in those juxtaposed regions to connect the two structures in accordance with the purchaser's design choices. As one example, FIG. 10 depicts the floor plan of three finished structures, 150a, 150b and 150c, each of a type 2 structure 152, arranged side-by-side to yield one housing unit with three rooms. The laminate multi-layer design of enclosure components 155 affords such location flexibility as to permit, in this particular instance, locating window apertures 204 in each wall component 200s, and thereby provide windows on all four sides of each room.

Figure 11:
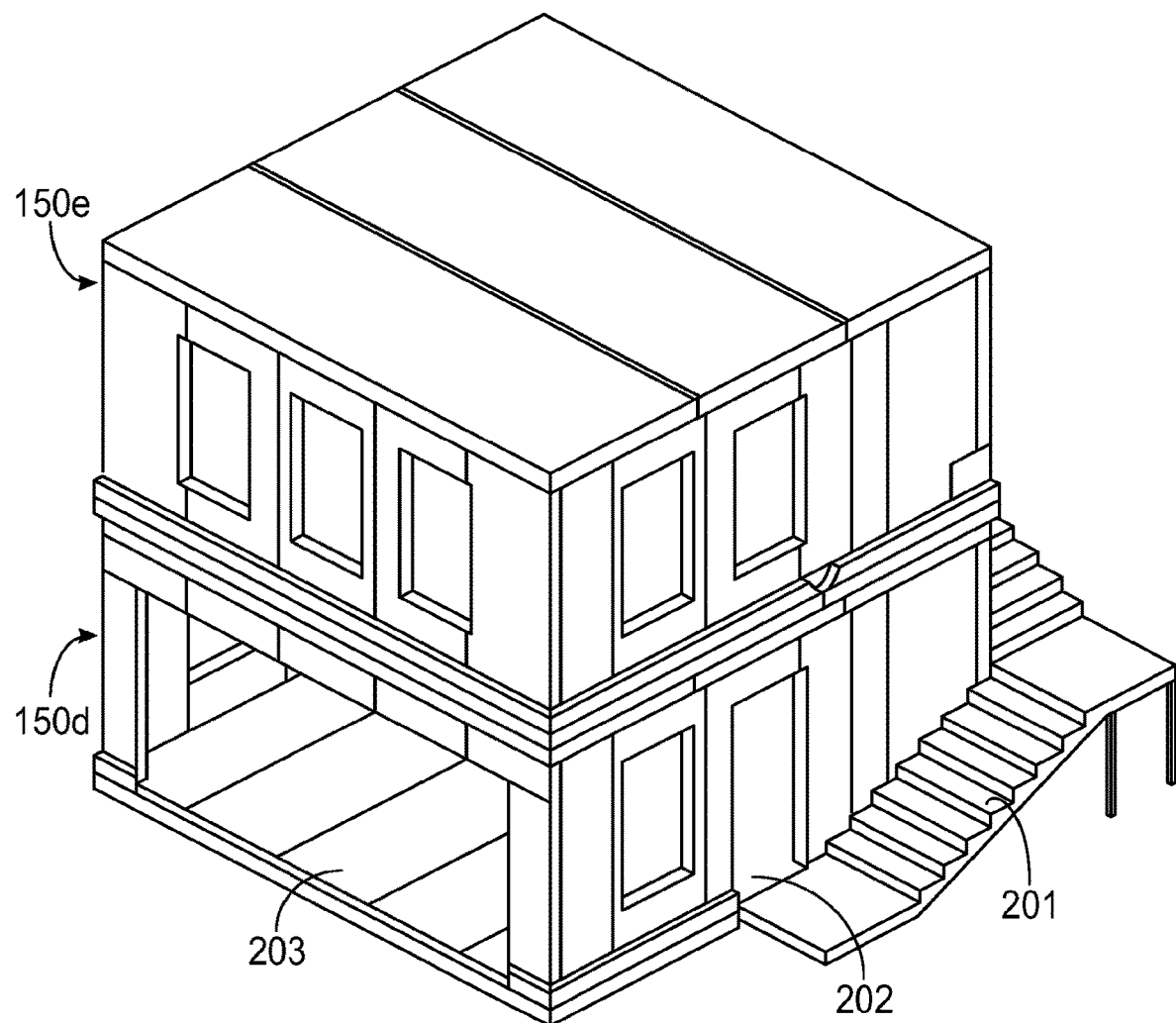
FIG. 11 is a perspective view of a two story structure fabricated in accordance with the present inventions.

Finished structures 150 can also be stacked, one on top of the other, to create multi-story structures. Using two type 2 structures 152, FIG. 11 depicts a finished structure 150e positioned on top of a finished structure 150d to yield a two story structure. The laminate multi-layer design of enclosure components 155 permits a wide variety of customization options. Thus as shown in FIG. 10, there is provided a garage aperture 203 in addition to door aperture 202 on the first level, as well as a door aperture 202 (not visible) on the second level, which is accessed via exterior stairway 201. Furring strips 418 can be provided on ceiling top surface 402 along the first and second longitudinal ceiling edges 406 and 416, along the second transverse and first transverse ceiling edges 408 and 410, and as desired spaced apart at select intervals within the perimeter of those edges. Such furring strips 418, shown in FIG. 6C, provide an air barrier between the levels of the multi-story structure. As necessary, means can be utilized to secure stacked finished structures 150 each to the other, such as by use of steel reinforcing plates fastened at spaced-apart locations to join an overlying floor component 300 to an underlying ceiling component 400.

Where four or more finished structures 150 are stacked in a 2×2 array, their baseboards 310 (shown in FIG. 6A) if utilized in appropriate locations will abut each other, thereby providing a space between the stacked finished structures 150. For example, baseboard 310 can be approximately two inches (5.08 cm) in thickness (the dimension parallel to the floor component 300). Such a thickness provides a space between adjacent finished structures 150 of approximately four inches (10.16 cm) in width, which can be utilized for running utility lines between floors, such as a plumbing stack (vertical main used for liquid waste water discharge) or electrical mains. Such utility lines can be accessed as desired by forming apertures in shoulder beams 435 at appropriate locations.

The foregoing detailed description is for illustration only and is not to be deemed as limiting the invention, which is defined in the appended claims.

What is claimed is:

1. A foldable building structure, comprising:
   a fixed space portion including a first floor portion, a first ceiling portion, a first wall portion rigidly secured to the first floor portion and the first ceiling portion;
   a second wall portion having first and second opposed edges which is pivotally secured at its first edge to the first wall portion at a first pivoting structure, and which is movable between a folded position that is proximate to the fixed space portion and a deployed position via the first pivoting structure;
   a third wall portion having first and second opposing edges which is pivotally secured at its first edge to the second edge of the second wall portion at a second pivoting structure, and is movable between a folded position that is proximate to the second wall portion and a deployed position via the second pivoting structure;
   the second wall portion and the third wall portion when in their deployed positions forming with the first wall portion a first wall component of the foldable building structure;
   wherein the second wall portion is capable of being moved between the folded position and the deployed position at the first pivoting structure without moving the third wall portion between the folded position and the deployed position at the second pivoting structure.

2. The foldable building structure of claim 1, wherein the fixed space portion further comprises a fourth wall portion in an opposing relationship with the first wall portion and rigidly secured to the first floor portion and the first ceiling portion.

3. The foldable building structure of claim 2, wherein the second edge of the second wall portion is oriented toward the fourth wall portion when the second wall portion is in its folded position.

4. The foldable building structure of claim 3, wherein the second edge of the third wall portion is oriented away from the fourth wall portion when the third wall portion is in its folded position.

5. The foldable building structure of claim 4, wherein the second wall portion and the third wall portion form an accordion fold having as its elements (a) the fixed space portion, (b) the second wall portion, and (c) the third wall portion, when both the second wall portion and the third wall portion are in their respective folded positions.

6. The foldable building structure of claim 2, further comprising a fifth wall portion having first and second opposing edges which are pivotally secured at its first edge to the fourth wall portion at a third pivoting structure, and which is movable between a folded position that is proximate to the fixed space portion and a deployed position via the third pivoting structure.

7. The foldable building structure of claim 6, wherein the fifth wall portion when in the deployed position forms with the fourth wall portion a second wall component of the building structure in an opposing relationship with the first wall component.

8. The foldable building structure of claim 6, further comprising a second floor portion having first and second opposing edges which is pivotally secured at its first edge to the first floor portion, and which is movable between a folded position that is proximate to the fixed space portion and a deployed position.

9. The foldable building structure of claim 8, wherein the second floor portion forms with the first floor portion a floor component of the building structure when in its deployed position.

10. The foldable building structure of claim 9, further comprising a third wall component having first and second edges in an opposing relationship, and third and four edges in an opposing relationship.

11. The foldable building structure of claim 10, wherein the third wall component is pivotally secured at its first edge to the second floor portion and being movable between a folded position, which is substantially adjacent and parallel to the second floor portion, and a deployed position, which is substantially perpendicular to the second floor portion.

12. The foldable building structure of claim 11, wherein the third edge of the third wall component is proximate to the second edge of the third wall portion and the fourth edge of the third wall component is proximate to the second edge of the fifth wall portion when the second wall portion, third wall portion, fifth wall portion, second floor portion and third wall component are each in its deployed position.

\* \* \* \* \*